(12) United States Patent
Matsumura et al.

(10) Patent No.: US 8,451,919 B2
(45) Date of Patent: May 28, 2013

(54) OFDM RECEPTION DEVICE, OFDM RECEPTION INTEGRATED CIRCUIT, OFDM RECEPTION METHOD, AND OFDM RECEPTION PROGRAM

(75) Inventors: Yoshinobu Matsumura, Osaka (JP); Tomohiro Kimura, Osaka (JP)

(73) Assignee: Panasonic Corporation, Osaka (JP)

(*) Notice: Subject to any disclaimer, the term of this patent is extended or adjusted under 35 U.S.C. 154(b) by 1104 days.

(21) Appl. No.: 12/438,051

(22) PCT Filed: Jan. 8, 2008

(86) PCT No.: PCT/JP2008/050080
§ 371 (c)(1),
(2), (4) Date: Feb. 19, 2009

(87) PCT Pub. No.: WO2008/084784
PCT Pub. Date: Jul. 17, 2008

(65) Prior Publication Data
US 2010/0166126 A1    Jul. 1, 2010

(30) Foreign Application Priority Data
Jan. 12, 2007  (JP) .................................. 2007-004152

(51) Int. Cl.
*H04K 1/10* (2006.01)
(52) U.S. Cl.
USPC ........................................................ 375/260
(58) Field of Classification Search
USPC ................. 375/146, 148, 232, 260, 316, 324, 375/350, 355
See application file for complete search history.

(56) References Cited

U.S. PATENT DOCUMENTS
2006/0262869 A1* 11/2006 Yoshida ......................... 375/260
2007/0211827 A1   9/2007 Baggen et al.

FOREIGN PATENT DOCUMENTS
| JP | 2004-266814 | 9/2004 |
| WO | 2005/117377 | 12/2005 |
| WO | 2005/117381 | 12/2005 |
| WO | 2007/046503 | 4/2007 |

OTHER PUBLICATIONS
International Search Report mailed Apr. 15, 2008 for International Application No. PCT/JP2008/050080.
Karsten Schmidt et al., "Low Complexity Inter-Carrier Interference Compensation for Mobile Reception of DVB-T", 9th International OFDM-Workshop Sep. 16, 2004, Dresden, pp. 1-5.

* cited by examiner

Primary Examiner — Sam K Ahn
Assistant Examiner — Shawkat M Ali
(74) Attorney, Agent, or Firm — Wenderoth, Lind & Ponack, L.L.P.

(57) ABSTRACT

An OFDM reception apparatus effectively suppresses a reduction in reception performance during high-speed mobile reception. The OFDM reception apparatus includes a transmission channel characteristic estimating unit for calculating a transmission channel characteristic value indicating phase and amplitude distortions in an OFDM signal for each sub-carrier, the phase and amplitude distortions occurring during propagation through a transmission channel, and calculating an n-th differentiation of the transmission channel characteristic value, and an interference component removing unit for using the transmission channel characteristic value and the n-th differentiation calculated for each of the sub-carriers by the transmission channel characteristic estimating unit, to remove an interference component between the sub-carriers from the OFDM signal.

6 Claims, 56 Drawing Sheets

FIG. 15

| USEFUL SYMBOL LENGTH | 1.008ms |
|---|---|
| NUMBER OF USEFUL CARRIERS | 5,617 (MODE 3) |
| GUARD INTERVAL RATIO | 1/8 |
| MODULATION METHOD | 64QAM |
| TRANSMISSION CHANNEL MODEL | DIRECT WAVES(Static)<br>+<br>5μs DELAYED WAVES (DOPPLER SHIFT: fD)<br>[POWER RATIO TO DIRECT WAVES: −10 dB] |

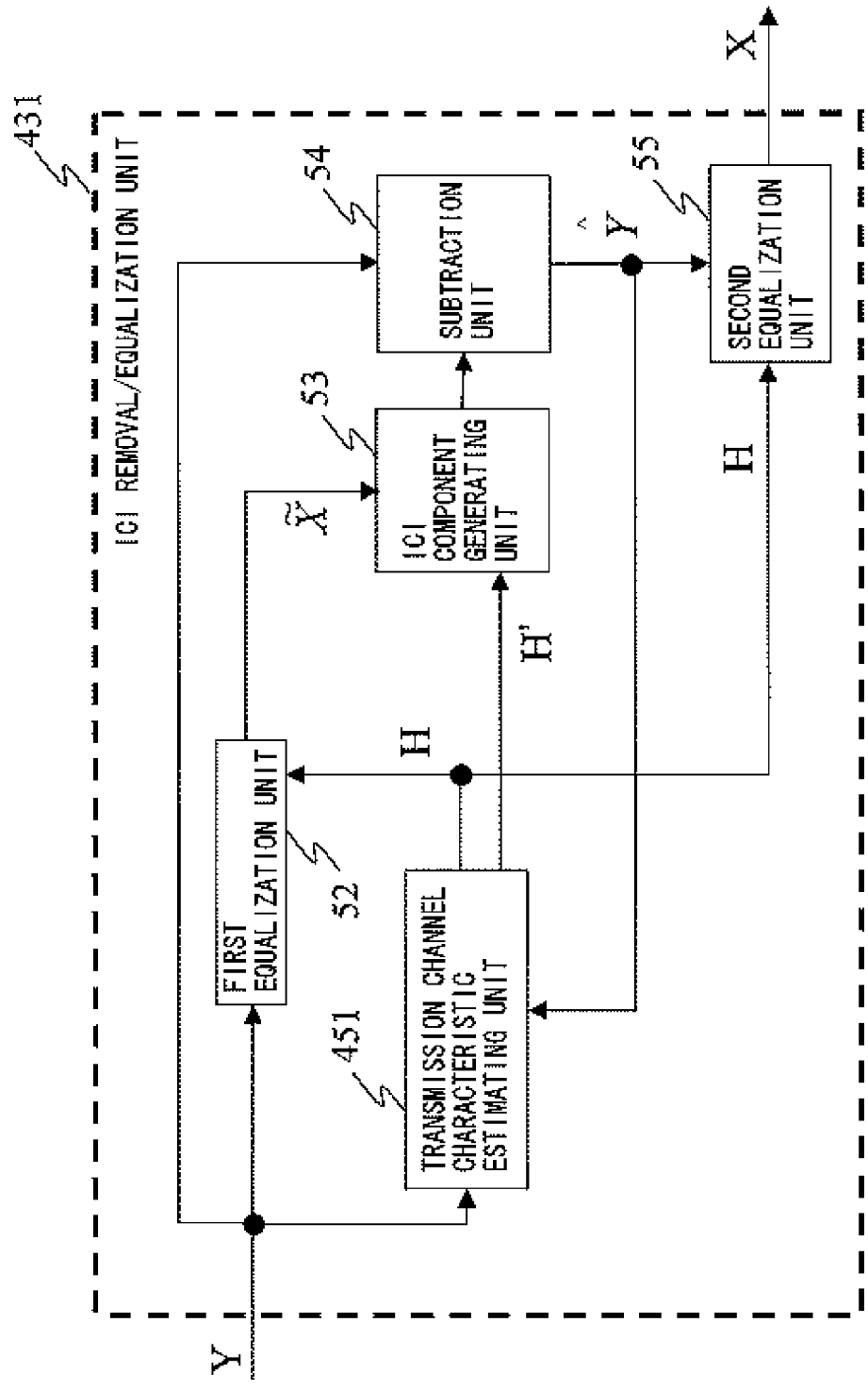
F I G. 4 2

OFDM RECEPTION DEVICE, OFDM RECEPTION INTEGRATED CIRCUIT, OFDM RECEPTION METHOD, AND OFDM RECEPTION PROGRAM

TECHNICAL FIELD

The present invention relates to an OFDM reception apparatus, an OFDM reception integrated circuit, an OFDM reception method and an OFDM reception program for performing mobile reception of digital communication/broadcasting, employing an OFDM multi-carrier transmission method.

BACKGROUND ART

At present, Orthogonal Frequency Division Multiplexing (OFDM) is widely employed as a transmission method in various digital communications standards (IEEE802.11a, etc.) for digital terrestrial broadcasting and the like. OFDM is a transmission method in which sub-carriers orthogonal to each other are used to frequency-multiplex a plurality of narrow-band digital modulated signals, with a high level of efficiency of use of frequency. Also in OFDM, each symbol duration includes a useful symbol duration and a guard interval. In each symbol, a portion of a signal in the useful symbol duration is copied into the guard interval. Thereby, OFDM is less affected by Inter-Symbol Interference (ISI) between symbols caused by multipath interference, and is highly resistant to multi path interference.

On the ether hand, OFDM signals have a longer length (duration) of a symbol than that of broad-band digital modulated signals. Therefore, OFDM is less resistant to changes in amplitude and phase in a multipath fading environment. Also, in a multipath fading environment during mobile reception, a change in frequency called Doppler spread occurs in addition to changes in amplitude and phase of a received signal caused by delay and dispersion due to multipath. In OFDM, the Doppler spread impairs the orthogonal relationship between individual sub-carriers, leading to interference between sub-carriers, and as a result, accurate demodulation becomes difficult to achieve.

The aforementioned interference between sub-carriers is called Inter-Carrier Interference (ICI). Suppression of a deterioration in reception performance due to ICI is largely desired for mobile communications employing a multi-carrier transmission method.

As an exemplary method for reducing the reception performance deterioration due to ICI, Non-Patent Document 1 described below (hereinafter simply referred to as Document 1) din closes an ICI suppressing method. FIG. 56 is a block diagram showing a configuration of an ICI removing unit 100 included in a conventional OFDM reception apparatus 1100 (not shown) described in Document 1. Note that parts other than the ICI removing unit 1000 of the conventional OFDM reception apparatus 1100 are commonly known and will not be described in detail. The conventional OFDM reception apparatus 1100 subjects a received signal to an FFT process using a Fast Fourier Transform (FFT) unit (not shown) before extracting data included in each sub-carrier. The conventional OFDM reception apparatus 1100 also removes an ICI component from the FFT-processed received signal using the ICI removing unit 1000.

Hereinafter, the ICI removing unit 1000 included in the conventional OFDM reception apparatus 1100 will be described. As shown in FIG. 56, the ICI removing unit 1000 comprises a transmission channel characteristic estimating unit 1001, a temporary equalization unit 1002, is transmission channel characteristic first-differentiation calculating unit 1003, a multiplication unit 1004, a subtraction unit 1005, and delay devices 1011 to 1013.

Here, the FFT-processed received signal is represented by Y[p+1] ([p+1] is a vector value, p is an integer, a number inside the brackets is a symbol number). Y[p+1] Is input to the delay device 1011 and the transmission channel characteristic estimating unit 1001. The delay device 1011 delays Y[p+1] by one symbol to output Y[p]. On the other hand, the transmission channel characteristic estimating unit 1001 uses Y[p+1] to estimate a transmission channel characteristic of each sub-carrier included in Y[p+1] to calculate H[p+1] (H[p+1] is a vector value, p is an integer, and a number inside the brackets is a symbol number). Here, H[p+1] is an estimate of the transmission channel characteristic that represents values indicating distortions in amplitude and phase of Y[p+1] caused by propagation through a transmission channel between a sender and a receiver. The delay device 1012 receives H[p+1] from the transmission channel characteristic estimating unit 1001, and delays H[p+1] by one symbol to output. H[p]. The temporary equalization unit 1002 divides Y[p] input from the delay device 1011 by H[p] input from the delay device 1012 (temporary equalization process) to output a temporary estimate $\tilde{X}[p]$ ($\tilde{X}[p]$ is a vector value, p is an integer, and a number inside the brackets is a symbol number) of a transmission signal. Note that the notation of $\tilde{X}[p]$ is slightly different from that shown in the drawings for the sake of convenience. The delay device 1013 receives H[p] from the delay device 1012, and delays H[p] by one symbol to output H[p−1].

The transmission channel characteristic first-differentiation calculating unit 1003 uses Expression 1 including H[p+1] input from the transmission channel characteristic estimating unit 1001, H[p−1] from the delay device 1013, N that is an FFT size, and Ng that is the product of N and a guard interval ratio, to calculate H'[p] that is the first differentiation of H[p] (H'[p] is a vector value, p is an integer, and a number inside the brackets is a symbol number).

$$H'[p] = \frac{H[p+1] - H[p-1]}{2(N + N_G)} \qquad (1)$$

In other words, the transmission channel characteristic first-differentiation calculating unit 1033 uses the transmission channel characteristic values H[p−1] and H[p+1] corresponding to symbol numbers before and after the symbol number p, so as to calculate the first differentiation H'[p] of H[p]. The multiplication unit 1004 uses $\tilde{X}[p]$ input from the temporary equalization unit 1002, H'[p] input from the transmission channel characteristic first-differentiation calculating unit 1003, and a fixed coefficient matrix (FFT leakage matrix) Ξ indicated by Expressions 3 and 4 to calculate an ICI component that is indicated in the second term on the right side of Expression 2.

$$\hat{Y}[p] = Y[p] - \Xi diag(H'[p])\tilde{X}[p] \qquad (2)$$

$$\Xi = \begin{pmatrix} 0 & \zeta_1 & \cdots & \zeta_{N-1} \\ \zeta_{-1} & 0 & \cdots & \zeta_{N-2} \\ \vdots & \vdots & \ddots & \vdots \\ \zeta_{1-N} & \zeta_{2-N} & \cdots & 0 \end{pmatrix} \qquad (3)$$

-continued $$\zeta_n = -\frac{1}{2} - \frac{j}{2\tan(\pi n/N)} \quad (4)$$

The subtraction unit 1005 uses Expression 2 in which the ICI component input from the multiplication unit 1004 is subtracted from Y[p] input from the delay device 1011, to calculate a vector Y´[p] that is a received signal excluding the component (Y´[p] is a vector value, p is an integer, and a number inside the brackets is a symbol number). Note that the notation of Y´[p] is slightly different from that shown in the drawings for the sake of convenience.

The aforementioned technique of Document 1 has a feature that H'[p] of the symbol number p that is used to calculate an ICI component (the second term on the right side of Expression 2) included in Y[p] is obtained by a difference operation of the transmission channel characteristic values H[p−1] and H[p+1] of symbol numbers before and after the symbol number p (see Expression 1).

Non-Patent Document 1: Low Complexity Inter-Carrier Interference Compensation for Mobile Reception of DVB-T [9th International OFDM—Workshop 2004, Dresden] (P 72-76, FIG. 4)

DISCLOSURE OF THE INVENTION

Problems to be Solved by the Invention

The aforementioned conventional technique of Document 1 has the following problem. As has already been described, in the conventional technique of Document 1, the first differentiation H'[p] of the transmission channel characteristic value H[p] is calculated using the difference between the transmission channel characteristic values (H[p−1] and H[p+1]) of symbols before and after the symbol Y[p] from which ICI is to be removed (see Expression 1). In other words, in the conventional technique of Document 1, the first differentiation H'[p] of H[p] is obtained by calculating the difference between transmission channel characteristic values H using a length of two symbols (period, of time) that is a time interval from the (p+1)-th symbol to the (p−1)-th symbol. Here, the frequency of changes in transmission channel characteristic value H due to multipath fading significantly increases with an increase in moving speed of a reception apparatus. Therefore, in the conventional technique of Document 1 in which the difference between transmission channel characteristic values H is calculated using a period of time of as long as the two-symbol length to obtain H', the accuracy of H' deteriorates since the sampling interval is large. Particularly in high-speed mobile reception, the accuracy of H' significantly deteriorates. Therefore, the accuracy of the ICI component (the second term on the right side of Expression 2) deteriorates, so that the removal of the ICI component becomes insufficient. As a result, the conventional technique of Document 1 disadvantageously has a low level of mobile reception performance, which further deteriorates during high-speed mobile reception.

Therefore, an object of the present invention is to provide an OFDM reception apparatus capable of stable and high-speed mobile reception by suppressing a reduction in mobile reception performance, particularly of suppressing a reduction in reception performance during high-speed mobile reception.

Solution to the Problems

The present invention is directed to an OFDM reception apparatus for receiving an OFDM signal including a plurality of sub-carriers arranged in a symbol direction and a carrier direction, via a transmission channel. To achieve the object, the OFDM reception device of the present invention includes an orthogonal transform unit for performing orthogonal transform with respect to the received OFDM signal from a time domain into a frequency domain, to generate an OFDM signal in the frequency domain, a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers, and an in component removing unit for using the transmission channel characteristic value and the n-th differentiation calculated for each of the sub-carriers by the first transmission channel characteristic estimating unit, to remove an interference component between the sub-carriers adjacent to each other in the symbol direction or the carrier direction, from the OFDM signal generated by the orthogonal transform unit. The first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing so intervals each smaller than a two-symbol interval of the transmission channel characteristic values obtained by the oversampling to calculate the n-th differentiations.

Also, preferably, the interference component removing unit removes an ICI component that is an interference component between the subcarriers adjacent to each other in the carrier direction.

Also, preferably, the first, transmission channel characteristic estimating unit calculates a first differentiation of the transmission channel characteristic value calculated for each of the sub-carriers.

Also, preferably, the first differentiation of the transmission channel characteristic value calculated for each of the sub-carriers by the first transmission channel characteristic estimating unit, is calculated by a difference operation using two of the transmission channel characteristic values obtained by the oversampling.

Also, preferably, the interference component removing unit includes a first equalization unit for dividing the OFDM signal generated by the orthogonal transform unit by the transmission channel characteristic value calculated for each of the subcarriers by the first transmission channel characteristic estimating unit, to remove a portion of the phase and amplitude distortions, thereby calculating a temporarily equalized OFDM signal, an ICI component generating unit for using the temporarily equalized OFDM signal and the n-th differentiations calculated by the first transmission channel characteristic estimating unit, to generate the ICI component, and a first, subtraction unit for subtracting the ICI component from the OFDM signal generated by the orthogonal transform unit, to calculate an OFDM signal excluding the ICI component.

Also, preferably, the interference component removing unit further includes a second transmission channel characteristic estimating unit for calculating a transmission channel characteristic value of the OFDM signal excluding the ICI component for each of the sub-carriers, and a second equalization unit for dividing the OFDM signal excluding the ICI component by the transmission channel characteristic values calculated by the second transmission channel characteristic estimating unit, to remove phase and amplitude distortions of the OFDM signal excluding the ICI component.

Also, preferably, the interference component removing unit further includes a second equalization unit for dividing the OFDM signal excluding the ICI component by the transmission channel characteristic value calculated for each of the sub-carriers by the first transmission channel characteristic estimating unit, to remove phase and amplitude distortions of the OFDM signal excluding the ICI component.

Also, preferably, the interference component removing unit includes an ICI component generating unit for generating the ICI component, a subtraction unit for subtracting and removing the ICI component generated by the ICI component, generating unit from the OFDM signal generated by the orthogonal transform unit, and an equalization unit for dividing an output signal of the subtraction unit by the transmission channel characteristic value calculated for each of the sub-carriers by the first transmission channel characteristic estimating unit, to remove phase and amplitude distortions of the output signal of the subtraction unit. The ICI component generating unit uses an output signal of the equalization unit and the n-th differentiations calculated by the first transmission channel characteristic estimating unit, to generate the ICI component having improved accuracy.

Also, preferably, the interference component removing unit includes an inverse matrix operating unit for calculating an inverse matrix of a matrix composed of a fixed coefficient matrix $\Xi$, the transmission channel characteristic value calculated for each of the sub-carriers by the first transmission channel characteristic estimating unit, and the n-th differentiations of the transmission channel characteristic values, and an equalization unit for using the inverse matrix calculated by the inverse matrix operating unit, to remove the ICI component and the phase and amplitude distortions from the OFDM signal generated by the orthogonal transform unit.

Also, preferably, the first transmission channel characteristic estimating unit includes an SP extracting unit for extracting SP signals included in the plurality of sub-carriers from the OFDM signal generated by the orthogonal transform unit, an SP generating unit for generating SP signals, a division unit for dividing the SP signals extracted by the SP extracting unit by the SP signals generated by the SP generating unit, to calculate a transmission channel characteristic value of the OFDM signal generated by the orthogonal transform unit for each SP signal, an interpolation unit for performing an interpolation process using the transmission channel characteristic value calculated for each SP signal by the division unit, to calculate a transmission channel characteristic value of the OFDM signal generated by the orthogonal transform unit for each of the sub-carriers, an intra-symbol oversampling unit for performing a filtering process in the symbol direction with respect to the transmission channel characteristic value calculated for each of the sub-carriers by the interpolation unit, to perform oversampling at intervals each smaller than a one-symbol interval, and a subtraction unit for performing a subtraction process using transmission channel characteristic values obtained by the oversampling, to calculate the n-th differentiation of the transmission channel characteristic value calculated for each of the sub-carriers by the interpolation unit.

Also, the first transmission channel characteristic estimating unit includes an SP extracting unit for extracting SP signals included in the plurality of sub-carriers from the OFDM signal generated by the orthogonal transform unit, an SP generating unit for generating SP signals, a division unit for dividing the SP signals extracted by the SP extracting unit by the SF signals generated by the SP generating unit, to calculate a transmission channel characteristic value of the OFDM signal generated by the orthogonal transform unit for each SP signal, an interpolation unit for performing an interpolation process using the transmission channel characteristic value calculated for each SP signal by the division unit, to calculate a transmission channel characteristic value of the OFDM signal generated by the orthogonal transform unit for each of the sub-carriers, an intra-symbol oversampling unit for performing a filtering process in the symbol direction with respect to the transmission channel characteristic value calculated for each of the sub-carriers by the division unit, to perform oversampling at intervals each smaller than a one-symbol interval, and a subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals, and a carrier interpolation unit for performing an interpolation process in the carrier direction using the n-th differentiations of the transmission channel characteristic values calculated by the subtraction unit, to calculate the n-th differentiation of the transmission channel characteristic value of the OFDM signal generated by the orthogonal transform unit for each of the sub-carriers.

Also, preferably, the first transmission channel characteristic estimating unit includes an SP extracting unit for extracting SP signals included in the plurality of sub-carriers from the OFDM signal generated by the orthogonal transform unit, an SP generating unit for generating SP signals, a division unit for dividing the SP signals extracted by the SP extracting unit by the SP signals generated by the SP generating unit, to calculate a transmission channel characteristic value of the OFDM signal generated by the orthogonal transform unit fox each SP signal, an intra-symbol oversampling unit for performing a filtering process in the symbol direction with respect to the transmission channel characteristic value calculated for each SP signal by the division unit, to perform oversampling at intervals each smaller than a one-symbol interval, a subtraction unit for performing a subtraction process using transmission channel characteristic values obtained by the over sampling, to calculate n-th differentiations of transmission channel characteristic values of sub-carriers included in sub-carrier sequences arranged in the symbol direction including SP signals, a carrier interpolation unit for performing an interpolation process in the carrier direction using the n-th differentiations of the transmission channel characteristic values calculated by the subtraction unit, to calculate the n-th differentiation of the transmission channel characteristic value of the OFDM signal generated by the orthogonal transform unit for each of the sub-carriers, and an interpolation unit for performing an interpolation process in the carrier direction using the transmission channel characteristic values obtained by the oversampling, to calculate a transmission channel characteristic value of the OFDM signal generated by the orthogonal transform unit for each of the sub-carriers.

Also, preferably, the first transmission channel characteristic estimating unit further includes an H' calculating unit for per to difference operation process using the transmission channel characteristic value calculated for each of the sub-carriers by the interpolation unit, to calculate so n-th differentiation of the transmission channel characteristic value for each of the sub-carriers, a comparison/determination unit for comparing speed information indicating moving speed of the OFDM reception apparatus with a predetermined threshold, to determine the moving speed, and a selector for no and outputting one of the n-th differentiations calculated by the H' calculating unit and the n-th differentiation calculated by the subtraction unit, based on a result of the determination by the comparison/determination unit.

Also, preferably, the first transmission channel characteristic estimating unit further includes an H' calculating unit for performing a difference operation process using the transmission channel characteristic value calculated for each of the sub-carriers by the interpolation unit, to calculate an n-th differentiation of the transmission channel characteristic value for each of the sub-carriers, a comparison/determination unit for comparing speed information indicating moving speed of the OFDM reception apparatus with as predetermined threshold, to determine the moving speed, and a selector for selecting and outputting one of the n-th differentiations calculated by the H' calculating unit and the n-th differentiations calculated by the carrier interpolation unit, based on a result of the determination by the comparison/determination unit.

Also, preferably, the first transmission channel characteristic estimating unit further includes an H' calculating unit for performing a difference operation process using the transmission channel characteristic value calculated for each of the sub-carriers by the interpolation unit, to calculate an n-th differentiation of the transmission channel characteristic value for each of the sub-carriers, a comparison/determination unit for comparing speed information indicating moving speed of the OFDM reception apparatus with a predetermined threshold, to determine the moving speed, and a selector for selecting and outputting one of the n-th differentiations calculated by the H' calculating unit and the n-th differentiations calculated by the carrier interpolation unit, based on a result of the determination by the comparison/determination unit.

Also, preferably, the first transmission channel characteristic estimating unit includes a first SP extracting unit for extracting SP signals included in the plurality of sub-carriers from the OFDM signal generated by the orthogonal transform unit, a first SP generating unit for generating SP signals, a first division unit for dividing the SP signals extracted by the first SP extracting unit by the SP signals generated by the first SP generating unit, to calculate a transmission channel characteristic value of the OFDM signal generated by the orthogonal transform unit for each SP signal, a second SP extracting unit for extracting SP signals from the OFDM signal excluding the ICI component, a second SP generating unit for generating SP signals, a second division unit for dividing the SP signals extracted by the second SP extracting unit by the SP signals generated by the second SP generating unit, to calculate a transmission channel characteristic value of the OFDM signal excluding the ICI component for each SP signal, an interpolation unit for performing an interpolation process using a portion of the transmission channel characteristic values calculated for the SP signals by the first division unit, and the transmission channel characteristic values for the SP signals calculated by the second division unit, to calculate a transmission channel, characteristic value of the OFDM signal generated by the orthogonal transform unit for each of the sub-carriers, an intra-symbol oversampling unit for performing a filtering process in the symbol direction with respect to the transmission channel characteristic value calculated for each of the sub-carriers by the interpolation unit, to perform oversampling at intervals each smaller than a one-symbol interval, and a second subtraction unit for performing a subtraction process using transmission channel characteristic values obtained by the oversampling, to calculate the n-th differentiation of the transmission channel characteristic value calculated for each of the sub-carriers by the interpolation unit.

Also, preferably, the first transmission channel characteristic estimating unit includes a first SP extracting unit for extracting SP signals included in the plurality of sub-carriers from the OFDM signal generated by the orthogonal transform unit, a first SP generating unit for generating SP signals, a first division unit for dividing the SP signals extracted by the first SP extracting unit by the SP signals generated by the first SP generating unit, to calculate a transmission channel characteristic value of the OFDM signal generated by the orthogonal transform unit for each SP signal, a second SP extracting unit for extracting SP signals from the OFDM signal excluding the ICI component, a second SP generating unit for generating SF signals, a second division unit for dividing the SP signals extracted by the second SP extracting unit by the SP signals generated by the second SP generating unit, to calculate a transmission channel characteristic value of the OFDM signal excluding the ICI component for each SP signal, an interpolation unit for performing an interpolation process using a portion of the transmission channel characteristic values calculated for the SP signals by the firs division unit, and the transmission channel characteristic values for the SP signals calculated by the second division unit, to calculate a transmission channel characteristic value of the OFDM signal generated by orthogonal transform unit for each of the sub-carriers, an intra-symbol oversampling unit for replacing a portion of the transmission channel characteristic values calculated for the SP signals by the first division unit, with the transmission channel characteristic values for the SP signals calculated by the second division unit, and performing a filtering process in the symbol direction, to perform oversampling at intervals each smaller than a one-symbol interval, a second subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals, and a carrier interpolation unit for performing an interpolation process in the carrier direction using the n-th differentiations of the transmission channel characteristic values calculated by the second subtraction unit, to calculate the n-th differentiation of the transmission channel characteristic value of the OFDM signal generated by the orthogonal transform unit for each of the sub-carriers.

Also, preferably, the first transmission channel characteristic estimating unit includes a first SP extracting unit for extracting OP signals included in the plurality of sub-carriers from the OFDM signal generated by the orthogonal transform unit, a first SP generating unit for generating SP signals, a first division unit for dividing the SP signals extracted by the first SP extracting unit by the SP signals generated by the first SP generating unit, to calculate a transmission channel characteristic value of the OFDM signal generated by the orthogonal transform unit for each SP signal, a second SP extracting unit for extracting SP signals from the OFDM signal excluding the ICI component, a second SP generating unit for generating SP signals, a second division unit for dividing the SP signals extracted by the second SP extracting unit by the SP signals generated by the second SP generating unit, to calculate a transmission channel characteristic value of the OFDM signal excluding the ICI component for each SP signal, an intra-symbol oversampling unit for replacing a portion of the transmission channel characteristic values calculated for the SP signals by the first division unit, with the transmission channel characteristic values for the SP signals calculated by the second division unit, and performing a filtering process in the symbol direction, to perform oversampling at intervals each smaller than a one-symbol interval, a second subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals, a carrier interpolation unit for performing an interpolation process in the carrier direction using the n-th differentiations of the transmission channel characteristic values calculated by the second subtraction unit, to calculate the n-th differentiation of the transmission channel characteristic value of the OFDM signal generated by the orthogonal transform unit for each of the sub-carriers, and an interpolation unit for performing an interpolation process in the carrier direction using the transmission channel characteristic values obtained by the oversampling, to calculate the transmission channel characteristic value of the OFDM signal generated by the orthogonal transform unit for each of the sub-carriers.

Also, preferably, the first transmission channel characteristic estimating unit further includes an H' calculating unit for performing a difference operation process using the transmission channel characteristic value calculated for each of the sub-carriers by the interpolation unit, to calculate an n-th differentiation of the transmission channel characteristic value for each of the sub-carriers, a comparison/determination unit for comparing speed information indicating moving speed of the OFDM reception apparatus with a predetermined threshold, to determine the moving speed, and a selector for selecting and outputting one of the n-th differentiations calculated by the H' calculating unit and the n-th differentiations calculated by the subtraction unit, based on a result of the determination by the comparison/determination unit.

Also, preferably, the first transmission channel characteristic estimating unit further includes an H' calculating unit for performing a difference operation process using the transmission channel characteristic value calculated for each of the sub-carriers by the interpolation unit, to calculate an n-th differentiation of the transmission channel characteristic value for each of the sub-carriers, a comparison/determination unit for comparing speed information indicating moving speed of the OFDM reception apparatus with a predetermined threshold, to determine the moving speed, and a selector for selecting and outputting one of the n-th differentiations calculated by the H' calculating unit and the n-th differentiations calculated by the carrier interpolation unit, based on a result of the determination by the comparison/determination unit.

Also, preferably, the first transmission channel characteristic estimating unit further includes an H' calculating unit for performing a difference operation process using the transmission channel characteristic value calculated for each of the sub-carriers by the interpolation unit, to calculate an n-th differentiation of the transmission channel characteristic value for each of the sub-carriers, a comparison/determination unit for comparing speed information indicating moving speed of the OFDM reception apparatus with a predetermined threshold, to determine the moving speed, and a selector for selecting and outputting one of the n-th differentiations calculated by the H' calculating unit and the n-th differentiations calculated by the carrier interpolation unit, based on a result of the determination by the comparison/determination unit.

The present invention is also directed to an integrated circuit for use in an OFDM reception apparatus for receiving an OFDM signal including a plurality of sub-carriers arranged in a symbol direction and a carrier direction, via a transmission channel. To achieve the object, the circuit includes an orthogonal transform unit for performing orthogonal transform with respect to the received OFDM signal from a time domain into a frequency domain, to generate an OFDM signal in the frequency domain, a first transmission channel characteristic estimating unit for calculating a transmission channel characteristic value indicating phase and amplitude distortions in the OFDM signal generated by orthogonal transform unit for each of the sub-carriers, the phase and amplitude distortions occur ring during propagation through the transmission channel, and calculating an n-th (n is a natural, number) differentiation of the transmission channel characteristic value for each of the sub-carriers, and an interference component removing unit for using the transmission channel characteristic value and the n-th differentiation calculated for each of the sub-carriers by the first transmission channel characteristic estimating unit, to remove an interference component between the sub-carriers adjacent to each other in the symbol direction or the carrier direction, from the OFDM signal generated by the orthogonal transform unit. The first transmission channel characteristic estimating unit performs a filtering process in the symbol direction with respect to the transmission channel characteristic value calculated for each of the sub-carriers to perform oversampling at intervals each smaller than a one-symbol inter and uses transmission channel characteristic values existing in intervals each smaller than a two-symbol interval of the transmission channel characteristic values obtained by the oversampling to calculate the n-th differentiations.

The present invention is also directed to an OFDM reception method for receiving an OFDM signal including is plurality of sub-carriers arranged in a symbol direction and a carrier direction, via a transmission channel. To achieve the object, the method includes the steps of performing orthogonal transform with respect to the received OFDM signal from a time domain into a frequency domain, to generate an OFDM signal in the frequency domain, calculating a transmission channel characteristic value indicating phase and amplitude distortions in the OFDM signal in the frequency domain for each of the sub-carriers, the phase and amplitude distortions occurring during propagation through the transmission channel, and calculating an n-th (n is a natural number) differentiation of the transmission channel characteristic value for each of the sub-carriers, and using the calculated transmission channel characteristic value and n-th differentiation for each of the sub-carriers, to remove an interference component between the sub-carriers adjacent to each other in the symbol direction or the carrier direction, from the OFDM signal in the frequency domain. In the calculating the transmission channel characteristic value and the n-th differentiation, a filtering process is performed in the symbol direction with respect, to the transmission channel characteristic values of the sub-carriers to perform oversampling at intervals each smaller than a one-symbol interval, and transmission channel characteristic values existing in intervals each smaller than a two-symbol interval of the transmission channel characteristic values obtained by the oversampling are used to calculate the n-th differentiations.

The present invention is also directed to a program executable by a computer that receives an OFDM signal including a plurality of sub-carriers arranged in a symbol direction and a carrier direction, via a transmission channel. To achieve the object, the program causes the computer to execute the steps of performing orthogonal transform with respect to the received OFDM signal from a time domain into a frequency domain, to generate an OFDM signal in the frequency domain, calculating a transmission channel characteristic value indicating phase and amplitude distortions in the OFDM signal in the frequency domain for each of the sub-carriers, the phase and amplitude distortions occurring during propagation through the transmission channel, and calculating an n-th (n is a natural number) differentiation of the transmission channel characteristic value for each of the sub-carriers, and using the calculated transmission channel characteristic value and n-th differentiation for each of the sub-carriers, to remove an interference component between the sub-carriers adjacent to each other in the symbol direction or the carrier direction, from the OFDM signal in the frequency domain. In the calculating the transmission channel characteristic value and the n-th differentiation, a filtering process is performed in the symbol direction with respect to the transmission channel characteristic values of the sub-carriers perform oversampling at intervals each smaller than a one-symbol interval, and transmission channel characteristic values existing in intervals each smaller than a two-symbol interval of the transmission channel characteristic values obtained by the oversampling are used to calculate the n-th differentiations.

Effect of the Invention

As described above, according to the present invention, a reduction in mobile reception per can be suppressed. Particularly, a reduction in reception performance during high-speed mobile reception can be effectively suppressed. Thereby, an OFDM reception apparatus capable of stable and high-speed mobile reception can be provided.

BRIEF DESCRIPTION OF THE DRAWINGS

FIG. 15 is a diagram showing parameters used only in ISDB-T.

FIG. 42 is a block diagram showing an exemplary configuration of an ICI removal/equalization unit 431.

DESCRIPTION OF THE REFERENCE CHARACTERS

| | |
|---|---|
| 1 | antenna |
| 2 | tuner |
| 3 | error correcting unit |
| 4 | decoding unit |
| 5 | display unit |
| 11 to 15 | demodulation unit |
| 21 | A/D conversion unit |
| 22 | orthogonal demodulation unit |
| 23 | orthogonal transform unit |
| 24 | symbol synchronizing unit |
| 31 to 34, 56, 131, 231, 331, 431 | ICI removal/equalization unit |
| 51, 151, 153, 251, 252, 351, 451 to 453, 453-1, 454 to 458, 1001 | transmission channel characteristic estimating unit |
| 52, 55, 57, 59 | equalization unit |
| 53 | ICI component generating unit |
| 54, 66, 1005 | subtraction unit |
| 58 | inverse matrix operating unit |
| 61, 461 | SP generating unit |
| 62, 71, 72, 462 | SP extracting unit |
| 63, 73, 463 | division unit |
| 64, 74, 92, 93, 93-1, 94 | interpolation unit |
| 65, 165 | intra-symbol oversampling unit |
| 68, 168 | intra-symbol oversampling/subtraction unit |
| 91, 1004 | multiplication unit |
| 101 to 10i, 111 | first to i-th H' calculating unit |
| 103, 105 | selector |
| 104, 106 | comparison/determination unit |
| 471 | ISI removing/equalizing unit |
| 100, 200, 300, 400, 500 | OFDM reception apparatus |
| 1000 | ICI removing unit |
| 1002 | temporary equalization unit |
| 1003 | transmission channel characteristic first-differentiation calculating unit |
| 1011 to 1013 | delay device |
| 1100 | OFDM reception apparatus |

BEST MODE FOR CARRYING OUT THE INVENTION

The present invention particularly has a feature that an oversampling process is performed during a process of calculating first differentiations H' of transmission channel characteristic values H, thereby increasing the accuracy of the first differentiations H'. Hereinafter, embodiments of the present invention will be described with reference to, for example, ISDB-T, which is the domestic standards for digital terrestrial broadcasting in Japan.

First Embodiment

Figure 1:
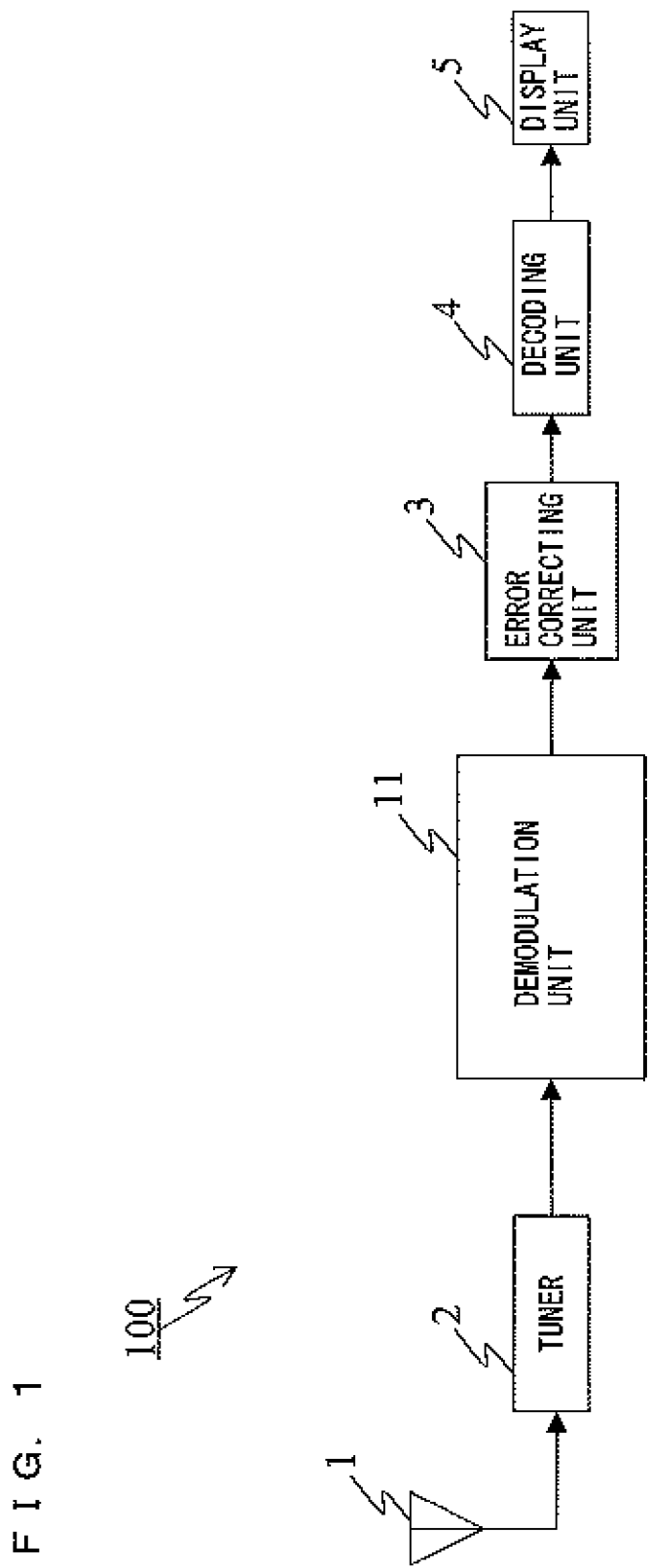
FIG. 1 is a block diagram showing an exemplary configuration of an OFDM reception apparatus 100 according to a first embodiment that removes Inter-Carrier interference (ICI).

FIG. 1 is a block diagram showing an exemplary configuration of an OFDM reception apparatus 100 according to a first embodiment that removes Inter-Carrier Interference (ICI). As shown in FIG. 1, the OFDM reception apparatus 100 comprises an antenna 1 for receiving broadcast waves, a tuner 2 for selecting a received signal on a desired reception channel from the broadcast waves received by the antenna 1, a demodulation unit 11 for demodulating the received signal selected by the tuner 2, an error correcting unit 3 for performing error correction with respect to an output signal of the demodulation unit 11, a decoding unit 4 for decoding a signal compressed by MPEG (Moving Picture Experts Group)-2 or the like that is obtained by error correction in the error correcting unit 3, and a display unit 5 for outputting audio/video decoded by the decoding unit 4.

Figure 2:
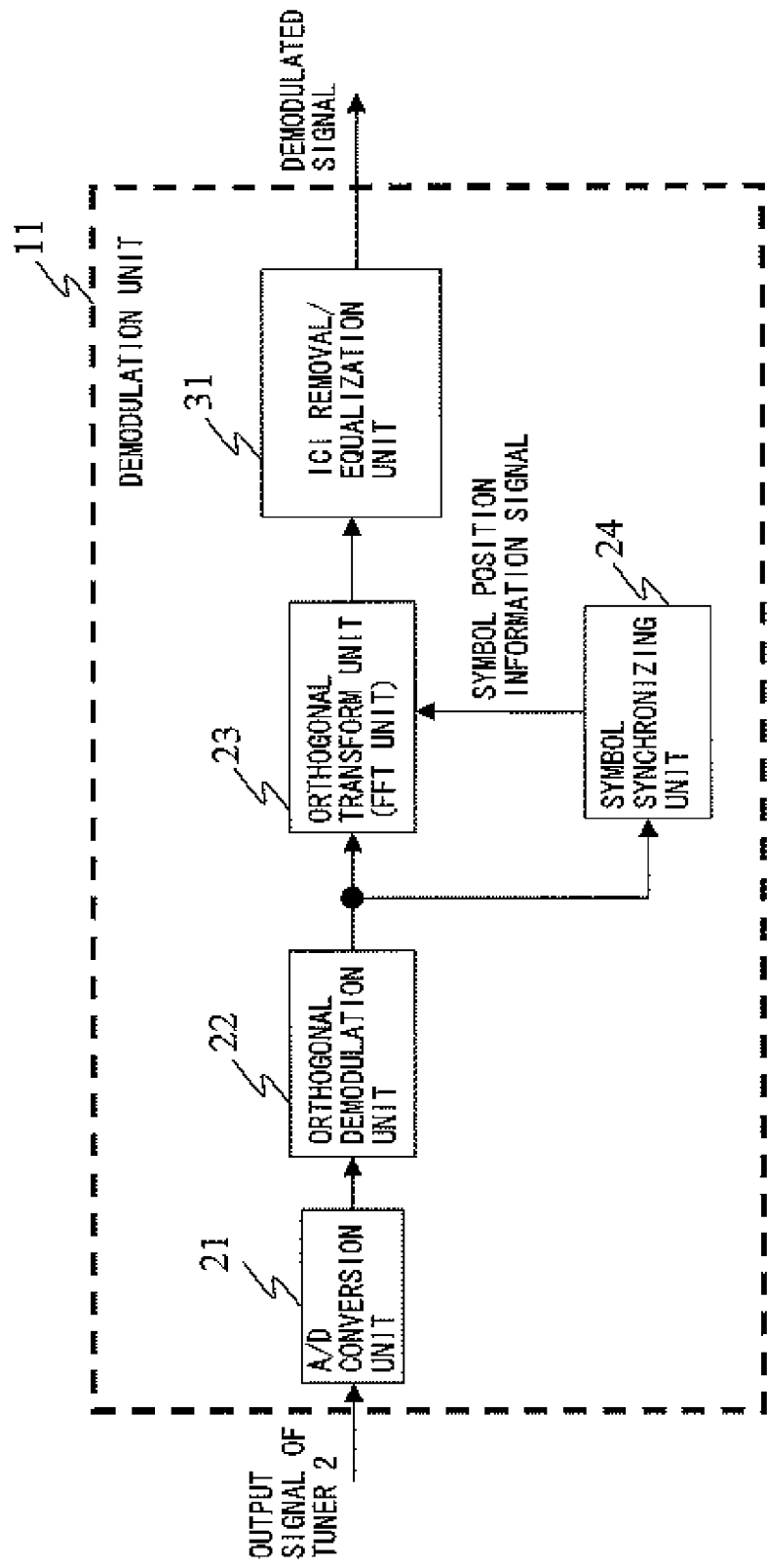
FIG. 2 is a block diagram showing an exemplary configuration of a demodulation unit 11 included in the OFDM reception apparatus 100 of the first embodiment.

FIG. 2 is a block diagram showing an exemplary configuration of the demodulation unit 11 included in the OFDM reception apparatus 100 of the first embodiment. As shown in FIG. 2, the demodulation unit 11 includes an analog-to-digital conversion unit (hereinafter referred to as an A/D conversion unit) 21, an orthogonal demodulation unit 22, an orthogonal transform unit 23, a symbol synchronizing unit 24, an ICI removal/equalization unit 31. The A/D conversion unit 21 converts an output signal of the tuner 2 (see FIG. 1) from an analog signal to a digital signal. The orthogonal demodulation unit 22 performs orthogonal demodulation with respect to the digital signal output from the A/D conversion unit 21 thereby converting the digital signal into a complex baseband signal. The symbol synchronizing unit 24 uses the complex baseband signal output from the orthogonal demodulation unit 22 to perform synchronization of OFDM symbol intervals and generate a symbol position information signal. The orthogonal transform unit 23 uses the symbol position information signal generated by the symbol synchronizing unit 24 to perform orthogonal transform with respect to the complex baseband signal output from the orthogonal demodulation unit 22. Note that the orthogonal transform unit 23 performs orthogonal transform using Fourier transform cosine transform, wavelet transform, Hadamard transform or the like. Hereinafter, as an example, it is assumed that the orthogonal transform unit 23 performs orthogonal transform using Fourier transform. Therefore, as an example, hereinafter, the orthogonal transform unit 23 is referred to as an FFT unit 23. The FFT unit 23 converts the complex baseband signal output from the orthogonal demodulation unit 22, from a signal in the time domain into a signal in the frequency domain. The ICI removal/equalization unit 31 performs an ICI removal/equalization process with respect to an output signal of the FFT unit 23.

Figure 3:
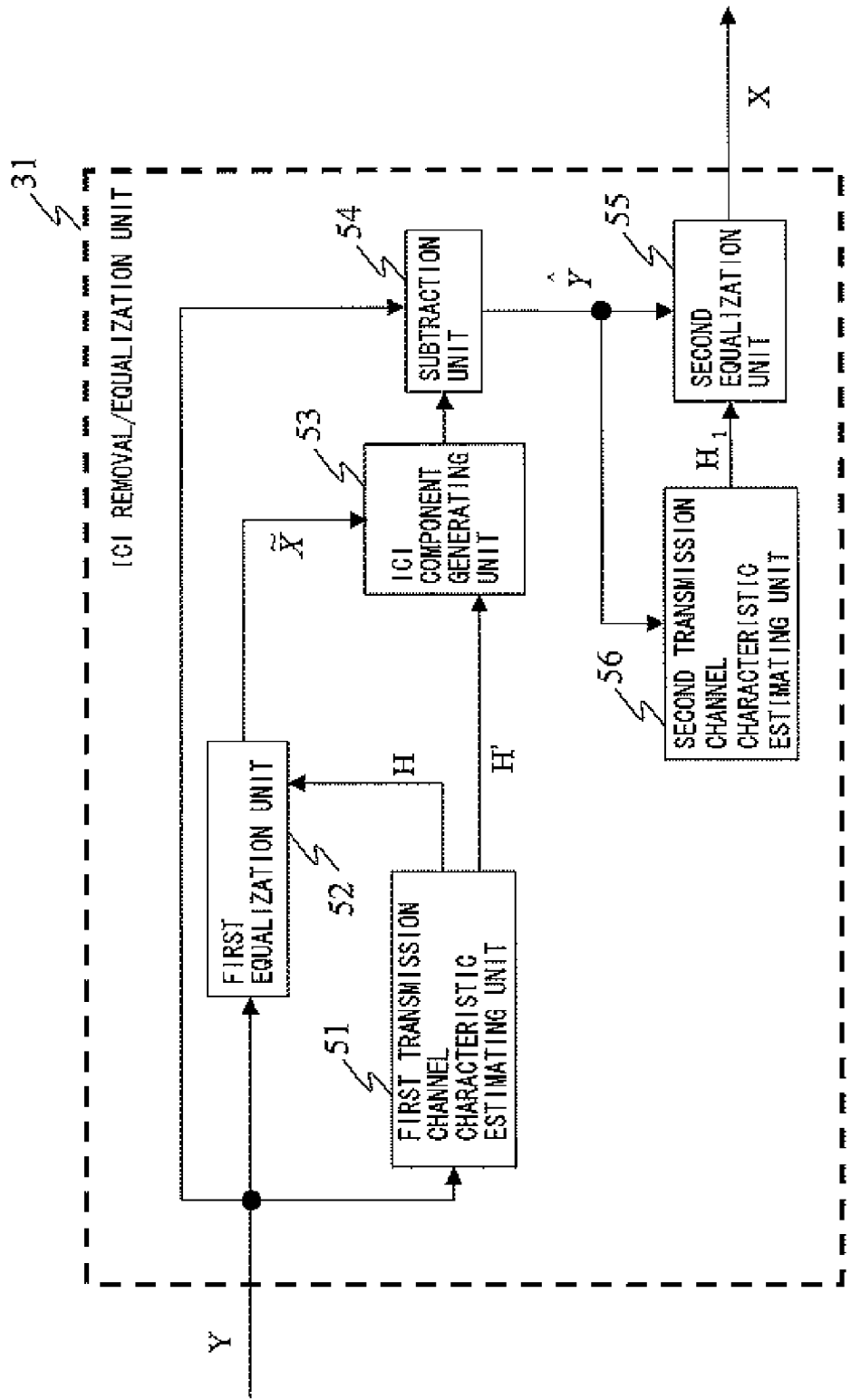
FIG. 3 is a block diagram showing an exemplary configuration of an ICI removal/equalization unit 31 included in the OFDM reception apparatus 100 of the first embodiment.

FIG. 3 is a block diagram showing an exemplary configurations of the ICI removal/equalization unit 31 included in the OFDM reception apparatus 100 of the first embodiment. As shown in FIG. 3, the ICI removal/equalization unit 31 has a first transmission channel characteristic estimating unit 51, a first equalization unit 52, an ICI component generating 53, a subtraction unit 54, a second transmission channel characteristic estimating unit 56, and a second equalization unit 55. The first transmission channel characteristic estimating unit 51 uses a signal Y obtained by Fourier transform performed by the FFT unit 23 (see FIG. 2) to calculate transmission channel characteristic values H, and first differentiations H' of the transmission channel characteristic values H. Here, a transmission channel characteristic value H represents values indicating distortions (hereinafter referred to as propagation distortions) in amplitude and phase of the received signal Y that occur during propagation through a transmission channel existing between a sender and a receiver. The first equalization unit 52 divides the signal Y input from the FFT unit 23 the transmission channel characteristic values H input from the first transmission channel characteristic estimating unit 51 to remove the propagation distortions included in the signal Y. Thereby, the first equalization unit 52 generates a signal $\hat{X}$ that is an estimate of a transmission signal X of a transmission apparatus (not shown).

Figure 4:
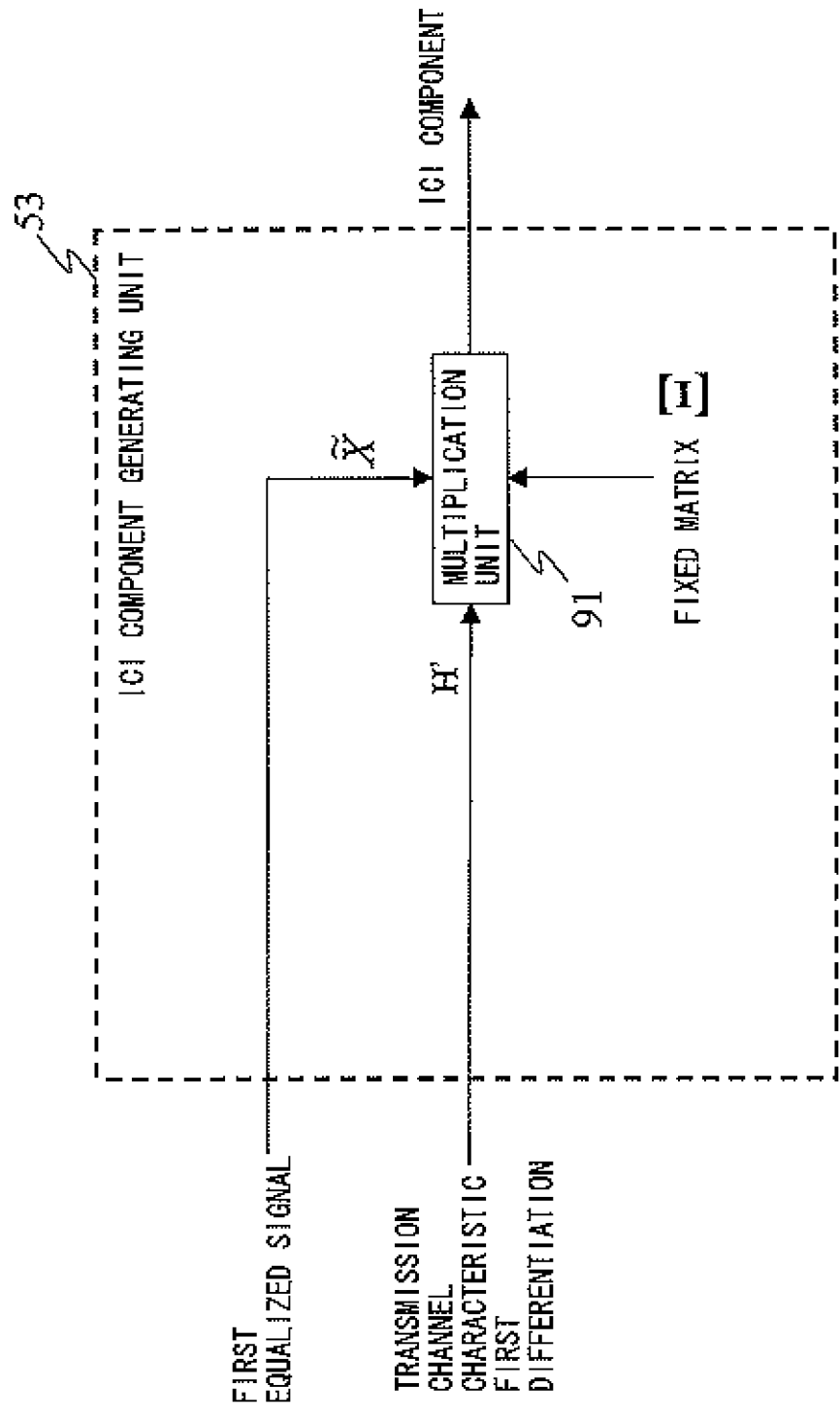
FIG. 4 is a diagram showing an exemplary configuration of an ICI removal/equalization unit 53 included in the OFDM reception apparatus 100 of the first embodiment.

FIG. 4 is a diagram showing an exemplary configuration of the ICI component generating unit 53 included in the OFDM reception apparatus 100 of the first embodiment. As shown in FIG. 4, the ICI component generating unit 53 has a multiplication unit 91. The multiplication unit 91 generates an ICI component in a symbol having a symbol number p (p is an integer) by performing an operation indicated by the second term on the right side of Expression 2 using an estimate signal $\hat{X}$[p] (a number inside the brackets indicates a symbol number), the first differentiation H'[p] of a transmission channel characteristic value H[p], and the fixed coefficient matrix $\Xi$. Note that, as has already been described regarding the conventional art, the fixed coefficient matrix $\Xi$ is represented by Expressions 3 and 4.

The subtraction unit 54 performs the operation of Expression 2 in which the ICI component input from the ICI component generating unit 53 is subtracted from the signal Y input from the FFT unit 23. Thereby, the subtraction unit 54 calculates a signal $\hat{Y}$ that is obtained by removing the ICI component from the signal Y. By the process described above, the ICI component is removed.

The second transmission channel characteristic estimating unit 56 uses the signal $\hat{Y}$ input from the subtraction unit 54 to calculate transmission channel characteristic values $H_1$. The second equalization unit 55 divides the signal $\hat{Y}$ input from the subtraction unit 54 by the transmission channel characteristic values $H_1$ input from the second transmission channel characteristic estimating unit 56, to remove propagation distortions included in the signal. $\hat{Y}$. Thereby, the second equalization unit 55 demodulates the transmission signal X of a transmission apparatus (not shown). The transmission signal X is output to the error correcting unit 3 (see FIG. 1). Note that the signal Y, the transmission channel characteristic values H, the first differentiations H' of the transmission channel characteristic values H, the signal $\hat{X}$, the signal $\hat{Y}$, the transmission channel characteristic values $H_1$, and the signal X each have values represented by a vector.

Figure 56:
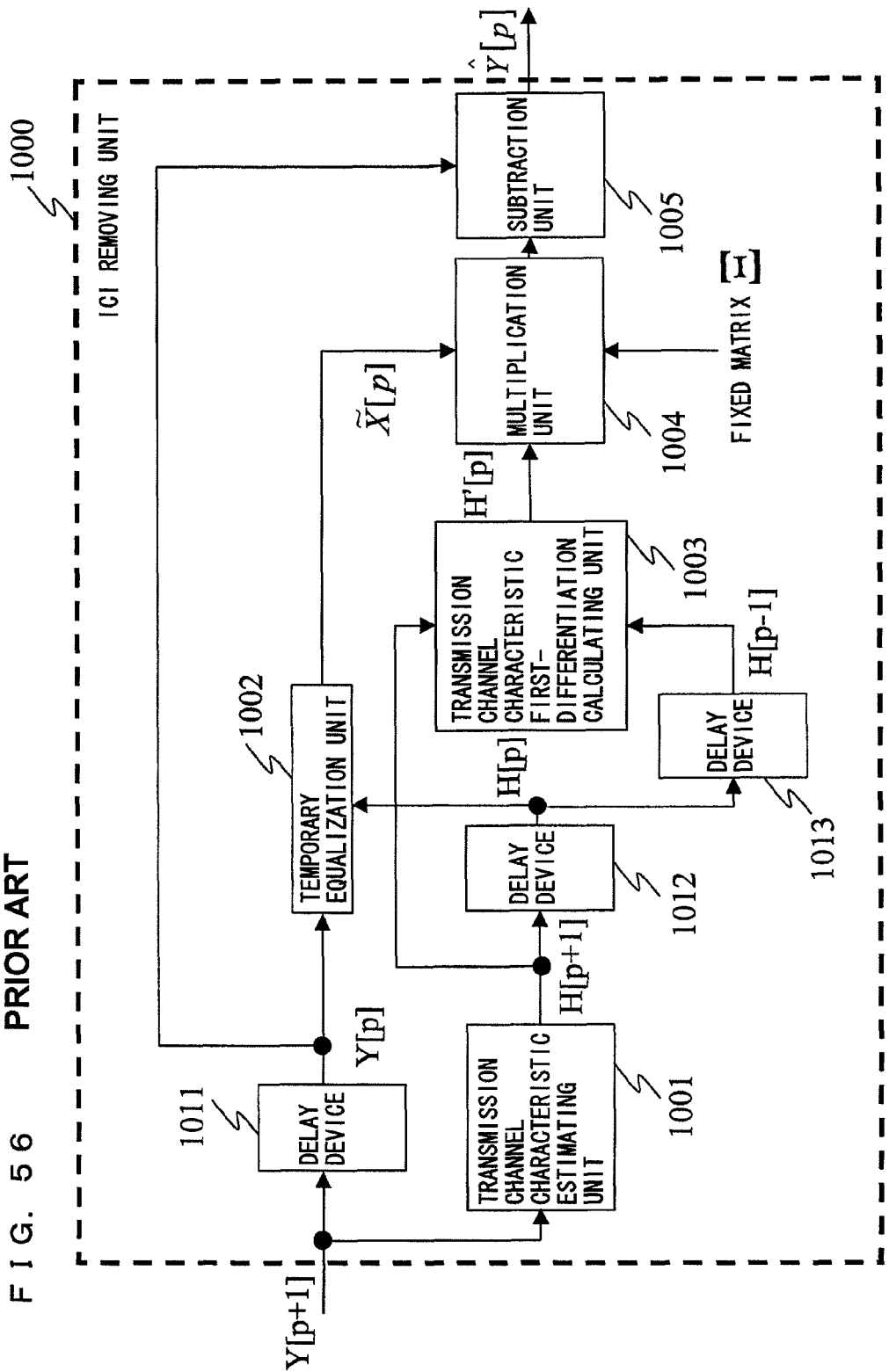
FIG. 56 is a block diagram showing a configuration of an ICI removing unit 1000 included in conventional OFDM reception apparatus 1100 described in Document 1.

Here, a correspondence relationship between the parts of the ICI removal/equalization unit 31 of the first embodiment and the parts of the conventional ICI removing unit of FIG. 56, will be briefly described. The first transmission channel characteristic estimating unit 51 of FIG. 3 corresponds to the transmission channel characteristic estimating unit 1001 and the transmission channel characteristic first-differentiation calculating unit 1003 of FIG. 56. The first equalization unit 52 of FIG. 3 corresponds to the temporary equalization unit 1002 of FIG. 56. The ICI component generating unit 53 of FIG. 3 corresponds to the multiplication unit 1004 of FIG. 56. The subtraction unit 54 of FIG. 3 corresponds to the subtraction unit 1005 of FIG. 56. Note that the second transmission channel characteristic estimating unit 56 and the second equalization unit 55 of FIG. 3 correspond to a configuration (not shown) provided after the configuration of FIG. 56.

Figure 5:
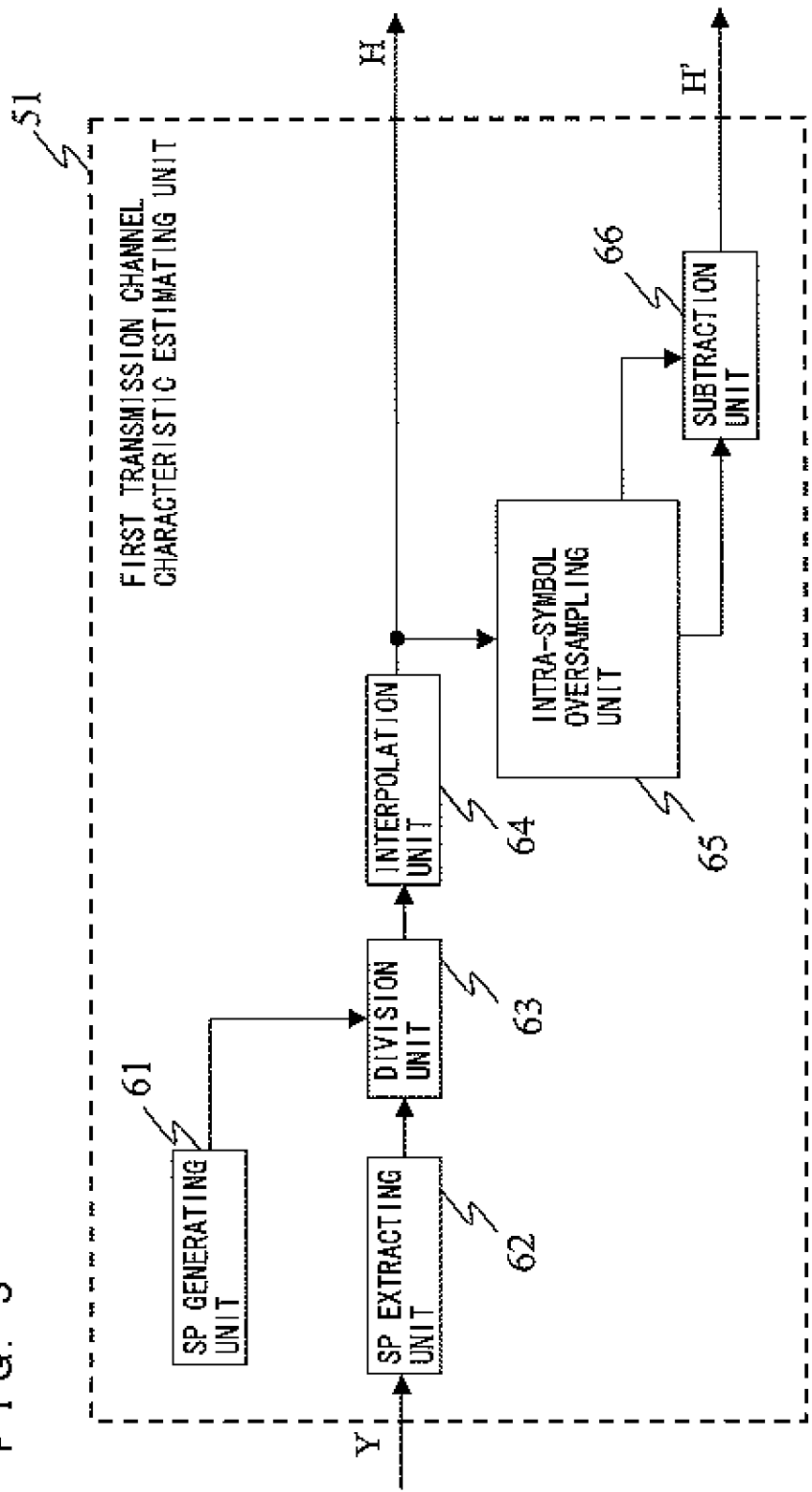
FIG. 5 is block diagram showing an exemplary configuration of a first transmission channel characteristic estimating unit 51.

FIG. 5 is a block diagram showing an exemplary configurations of the first transmission channel characteristic estimating unit 51. As shown in FIG. 5, the first transmission channel characteristic estimating unit 51 has an SP generating unit 61, an SP extracting unit 62, a division unit 63, an interpolation unit 64, an intra-symbol oversampling unit 65, and a subtraction unit 66.

Figure 6:
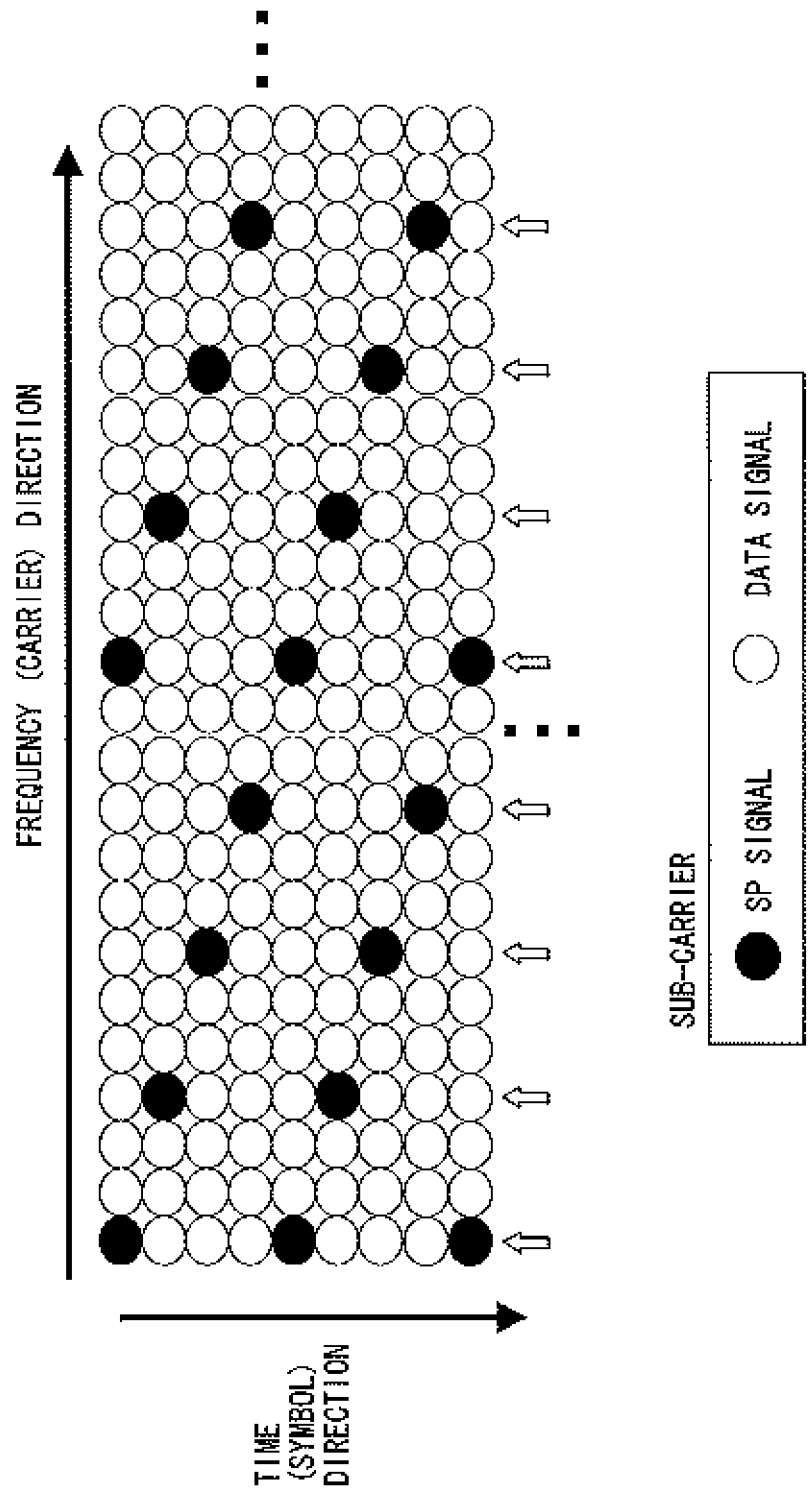
FIG. 6 is a diagram showing an arrangement of signals in ISDB-T.

FIG. 6 is a diagram showing an arrangement of signals in ISDB-T. As shown in FIG. 6, in ISDB-T, Scattered Pilot (SP) signals are regularly inserted between data signals including transmission data on the sender's side. The SP extracting unit 62 extracts SP signals included in the Fourier-transformed signal Y. The SP generating unit 61 generates SP signals. The division unit 63 divides the SP signals extracted by the SP extracting unit 62 by the SP signals generated by the SP generating unit 61. Thereby, the division unit 63 calculates transmission channel characteristic values at the positions of the SP signals in the signal Y. The interpolation unit 64 performs an interpolation process using the transmission channel characteristic values at the SP signal positions obtained by the division unit 63, to calculate transmission channel characteristic, values at the positions of data signals. Thereby, the interpolation unit 64 calculates transmission channel characteristic values H corresponding to all signal positions. The transmission channel characteristic values H calculated by the interpolation unit 64 are input to the first equalization unit 52 (see FIG. 3) and the intra-symbol oversampling unit 65.

Figure 7:
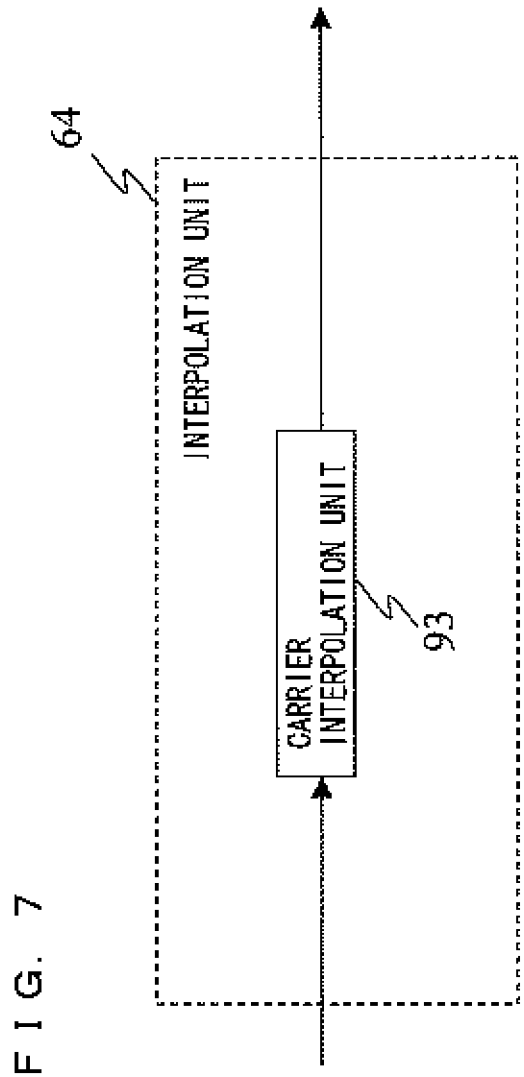
FIG. 7 is a diagram showing an exemplary configuration of an interpolation unit 64.
Figure 8:
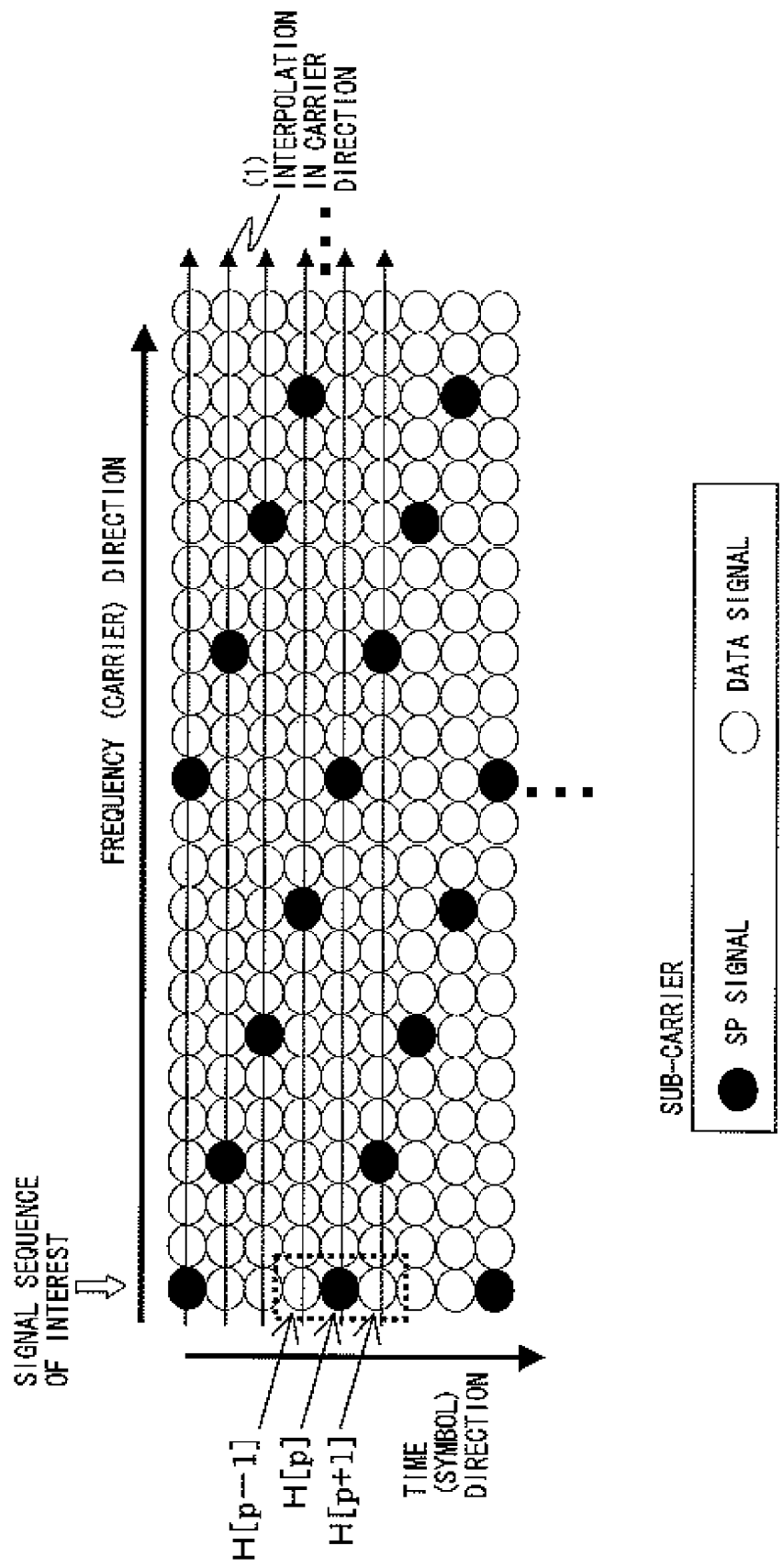
FIG. 8 is a diagram showing an interpolation method for performing interpolation only in a carrier direction.
Figure 9:
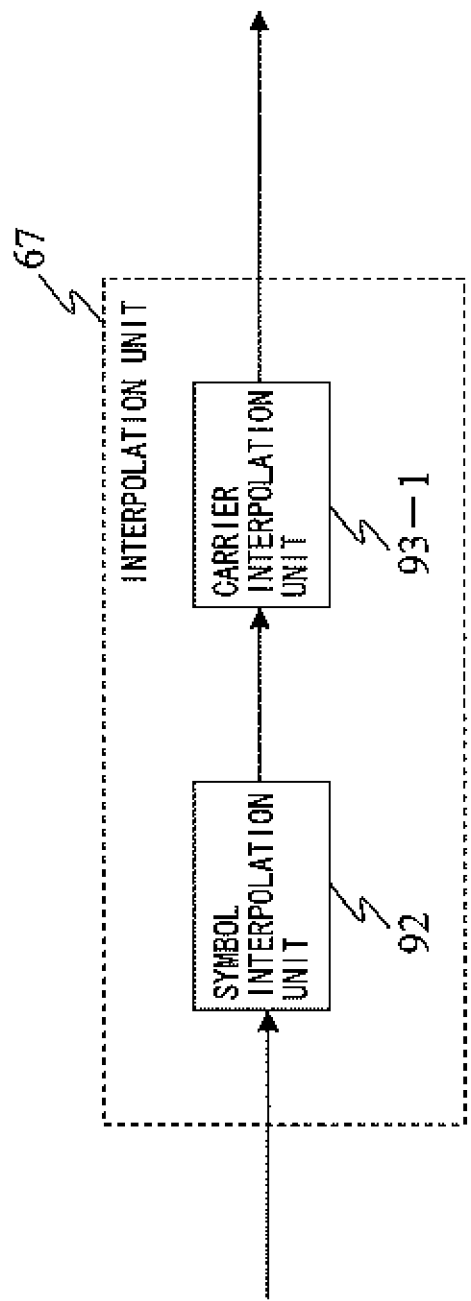
FIG. 9 is a diagram showing an exemplary configuration of an interpolation unit 67.
Figure 10:
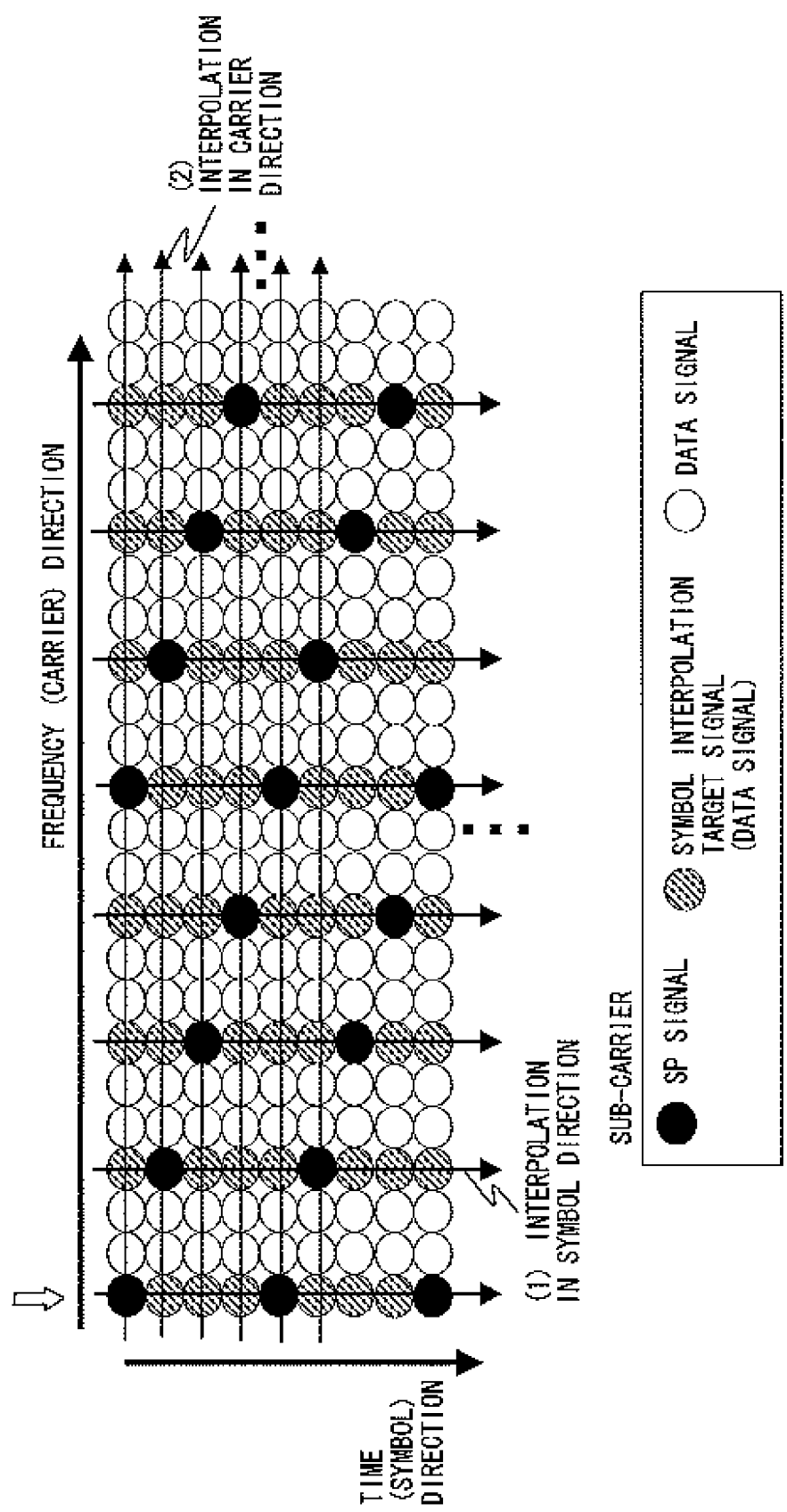
FIG. 10 is a diagram showing an interpolation method for performing interpolation in a symbol direction before performing interpolation in the carrier direction.

FIG. 7 is a diagram showing an exemplary configuration of the interpolation unit 64. FIG. 5 is a diagram showing an interpolation method for performing interpolation only in a carrier direction. As shown in FIG. 7 the interpolation unit 64 includes a carrier interpolation unit 93. As shown in FIG. 6, the carrier interpolation unit 93 uses the transmission channel characteristic values at the SP signal positions obtained by the division unit 63 to perform interpolation only in the carrier direction, thereby calculating transmission channel characteristic values at all data signal positions, i.e., transmission channel characteristic values H. In this manner, the interpolation unit 64 calculates the transmission channel characteristic values H. Note that, instead of the interpolation unit 54 of FIG. 7, an interpolation unit 67 of FIG. 9 may be used. As shown in FIG. 9, the interpolation unit 67 includes a symbol interpolation unit 92 and a carrier interpolation unit 93-1. FIG. 10 is a diagram showing an interpolation method for performing interpolation in a symbol direction before performing interpolation in the carrier direction. As shown in FIG. 10, the symbol interpolation unit 92 uses the transmission channel characteristic values at the SP signal positions obtained by the division unit 63 to perform interpolation in the symbol direction. Thereafter, the carrier interpolation unit 93-1 uses the transmission channel characteristic values obtained by interpolation in the symbol direction to perform interpolation in the carrier direction. Thereby, the interpolation unit 67 calculates transmission channel characteristic values at all data signal positions (sub-carrier positions), i.e., transmission channel characteristic values H. Note that interpolation performed by the interpolation unit 64 and the interpolation unit 67 is preferably not linear interpolation. Although a general interpolation method has been described above with reference to FIGS. 8 and 10, other interpolation methods may be used.

Figure 11:
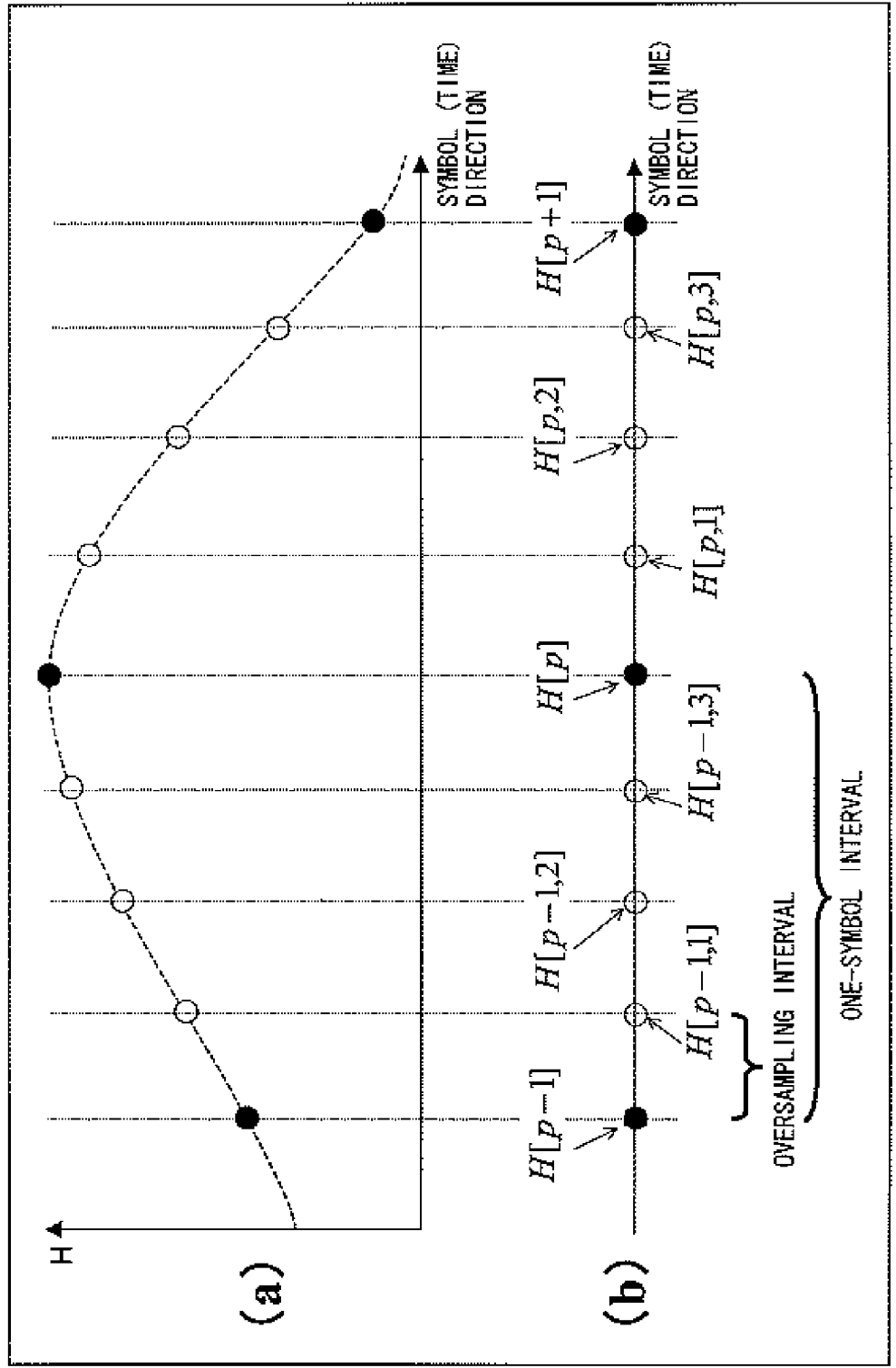
FIG. 11 is a diagram for describing an oversampling process performed by an intra-symbol, oversampling unit 65.

FIG. 11 is a diagram for describing the oversampling process performed by the intra-symbol oversampling unit 65 (see FIG. 5). FIG. 11(a) shows changes in the transmission channel characteristic values H in the symbol (time) direction. FIG. 11(b) shows over sampling intervals of the transmission channel characteristic values H in the symbol (time) direction. Hereinafter, an operation of the intra-symbol oversampling unit 65 that is a characteristic feature of the OFDM reception apparatus 100 of the first embodiment will be described with reference to FIGS. 11 and 8. As an example, a case where the first differentiation H'[p] of a transmission channel characteristic value H[p] (p is an integer, a number inside the brackets is a symbol number) at a middle SP signal position of a signal sequence (hereinafter referred to as a signal sequence of interest) indicated by an open arrow in FIG. 8 is calculated, will be described. H[p−1], H[p] and H[p+1] indicated by closed circles in FIG. 11 correspond to H[p−1], H[p] and H[p+1] at three signal positions surrounded by a dashed line in FIG. 8. As shown in FIG. 11(a), the intra-symbol oversampling unit 65 performs filtering with respect to the transmission channel characteristic values H input from the interpolation unit 64 to smoothly interpolate the transmission channel characteristic values H (H[p−1], H[p] and H[p+1], etc.). Thereby, as shown in FIGS. 11(a) and 11(b), the transmission channel characteristic values H are oversampled at intervals each of which is smaller than a one-symbol interval in the symbol direction. Thereby, the intra-symbol oversampling unit 65 calculates transmission channel characteristic values H[p−1, 1], H[p−1, 2], H[p−1, 3], H[p, 1], H[p, 2] and H[p, 3] indicated by open circles in FIG. 11. Note that, in FIG. 11, as an example, the intra-symbol oversampling unit 65 performs oversampling at sampling intervals each of which is ¼ of the one-symbol interval.

The subtraction unit 66 uses the transmission channel characteristic value N[p−1, 3] and H[p, 1] input from the intra-symbol oversampling unit 65 to perform an operation indicated by Expression 5. Thereby, the subtraction unit 66 calculates the first differentiation. H'[p] of the transmission channel characteristic value H[p] at the signal position of interest (the middle SP signal position in the signal sequence of interest of FIG. 8). As has already been described, the calculated H'[p] is input to the ICI component generating unit 53 (see FIG. 3).

$$H'[p] = 2\frac{H[p, 1] - H[p-1, 3]}{(N + N_G)} \quad (5)$$

Figure 12:
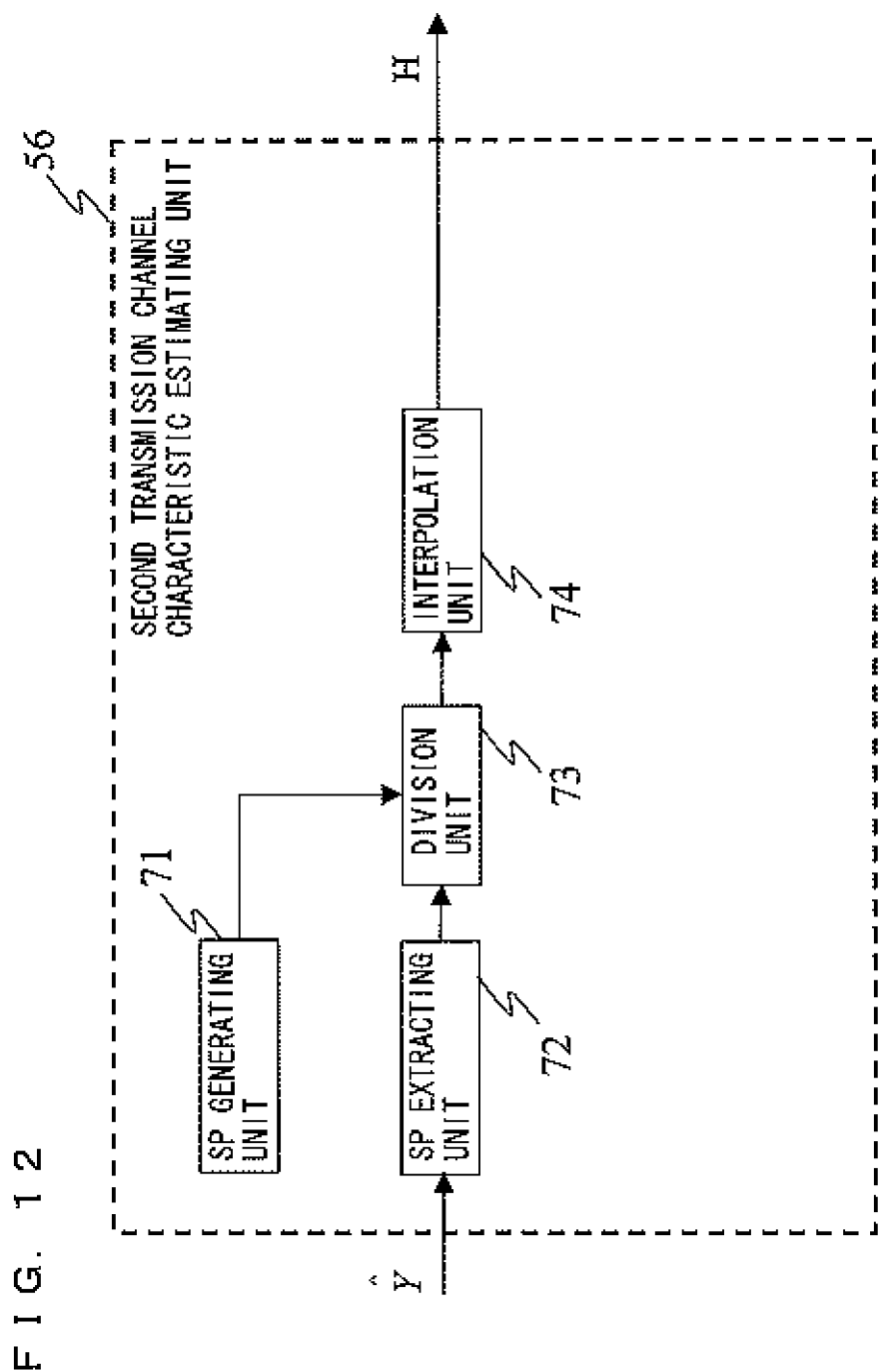
FIG. 12 is a block diagram showing an exemplary configuration of a second transmission channel characteristic estimating unit 56.

Here, a configuration of the second transmission channel characteristic estimating unit 56 will be briefly described. FIG. 12 is a block diagram showing an exemplary configuration of the second transmission channel characteristic estimating unit 56. As shown in FIG. 12, the second transmission channel characteristic estimating unit 56 has an SP generating unit 71, an SP extracting unit 72, a division unit 73, and an interpolation unit 74. Operations of the SP generating unit 71, the SP extracting unit 72, the division unit 73 and the interpolation unit 74 of the second transmission channel characteristic estimating unit 56 are similar to those of the SP generating unit 61, the SP extracting unit 62, the division unit 63 and the interpolation unit 64 of the first transmission channel characteristic estimating unit 51, respectively, and will not be described.

Figure 13:
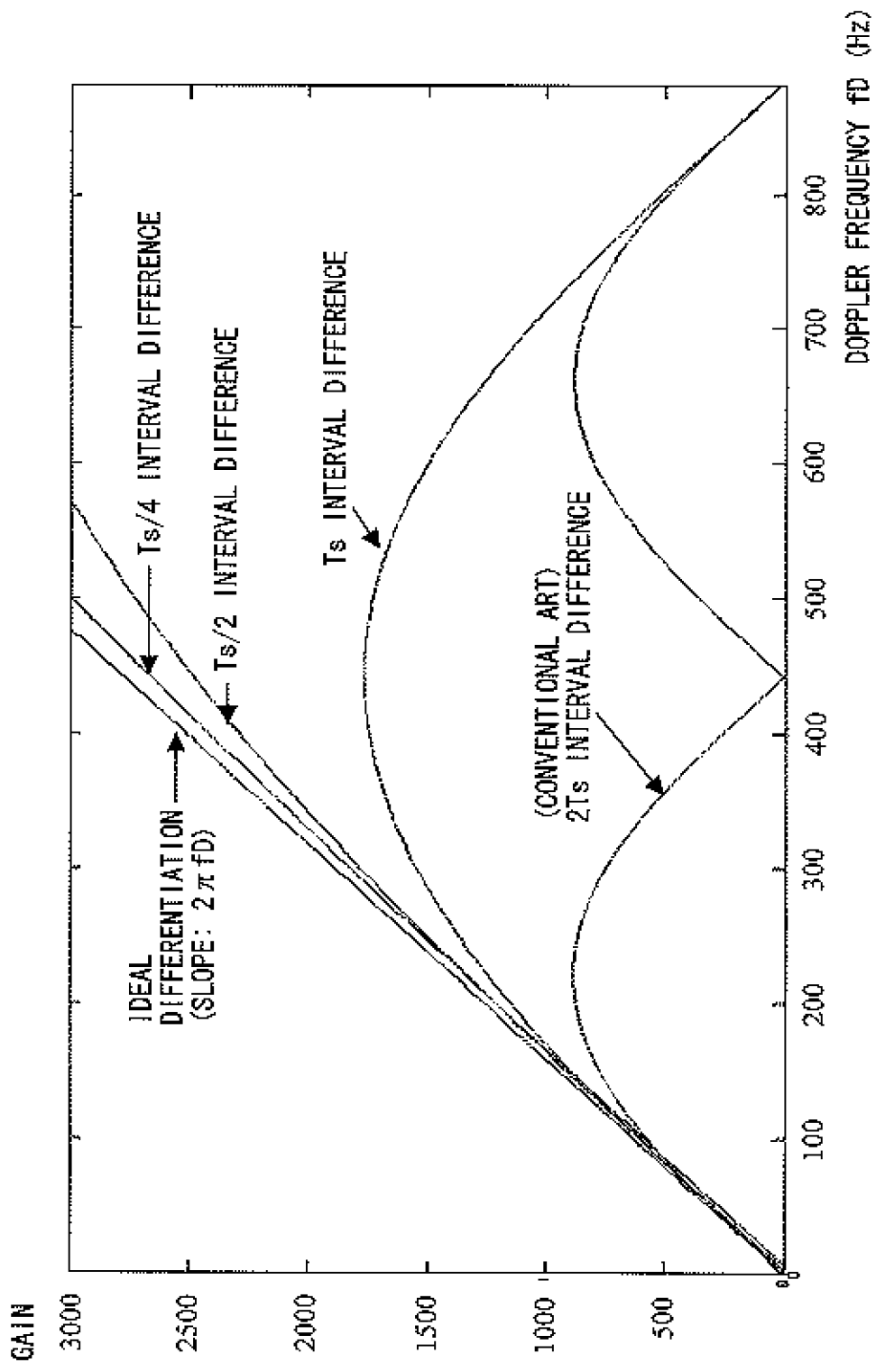
FIG. 13 is a diagram for describing an effect of the OFDM reception apparatus 100 of the first embodiment.

Hereinafter, an effect of the OFDM reception apparatus 100 of the first embodiment will be described with reference to FIGS. 13 and 14. FIG. 13 shows frequency characteristics of a differentiation filter that performs a difference operation of calculating the first differentiation H'[p] of the transmission channel characteristic value H[p] (see Expressions 1 and 5) when the difference operation is considered as a differentiation filtering process. In FIG. 13, the horizontal axis represents Doppler frequencies indicating frequency amounts by which frequencies are shifted by the Doppler effect, and the vertical axis represents gains of the differentiation filter. Also, the one-symbol length (a period of time) of an OFDM signal is represented by Ts. In this case, the difference operation of Expression 1 performed by the conventional ICI removing unit 1000 (see FIG. 56) is a difference operation for transmission channel characteristic values at two-symbol intervals (see Expression 1). Therefore, differentiation filter characteristics performed by the conventional ICI removing unit 1000 are denoted by 2Ts interval difference in FIG. 13. Also, differentiation filter characteristics when over sampling is performed at intervals each of which is ¼ of the one-symbol interval as described in the first embodiment (see FIG. 11) are denoted by Ts/2 interval difference. Also differentiation filter characteristics when oversampling is performed at intervals each of which is ½ of the one-symbol interval are denoted by Ts interval difference. Differentiation filter characteristics when oversampling is performed at intervals each of which is ⅛ of the one-symbol interval are denoted by Ts/4 interval difference. Also, FIG. 13 shows the frequency characteristics of an ideal differentiation filter. Also, the symbol frequency is about 880 Hz.

As can be seen from FIG. 13, the differentiation filter characteristics of the 2Ts interval, difference of the conventional art substantially agree with the ideal differentiation filter characteristics within the Doppler frequency range of 0 to 100 Hz, and gradually depart from the ideal differentiation filter characteristics when the Doppler frequency exceeds 100 Hz. Specifically, in the case of the 2Ts interval difference of the conventional art, when the Doppler frequency exceeds 100 Hz, appropriate derivative approximation cannot be achieved, so that the accuracy of the first differentiations H' of the transmission channel characteristic values H deteriorates. In addition, if the moving speed of a reception apparatus increases, a large Doppler frequency emerges. Therefore, as the moving speed increases, the accuracy of the first differentiations H' of the transmission channel characteristic values H further deteriorates.

In contrast, as can be seen from FIG. 13, the differentiation filter characteristics of the Ts/2 interval difference described in the first embodiment (see FIG. 11 and Expression 5) are significantly closer to the ideal differentiation filter characteristics than the differentiation filter characteristics of the 2Ts interval difference of the conventional art are. In this manner as the number of samples during oversampling is increased (the sampling interval is decreased), differentiation filter characteristics close, to the ideal differentiation filter characteristics can be obtained at higher Doppler frequencies as shown in FIG. 13. Therefore, the OFDM reception apparatus 100 of the first embodiment can calculate the differentiations H' of the transmission channel characteristic values H with high accuracy even during high-speed reception in which higher Doppler frequencies exist.

Figure 14:
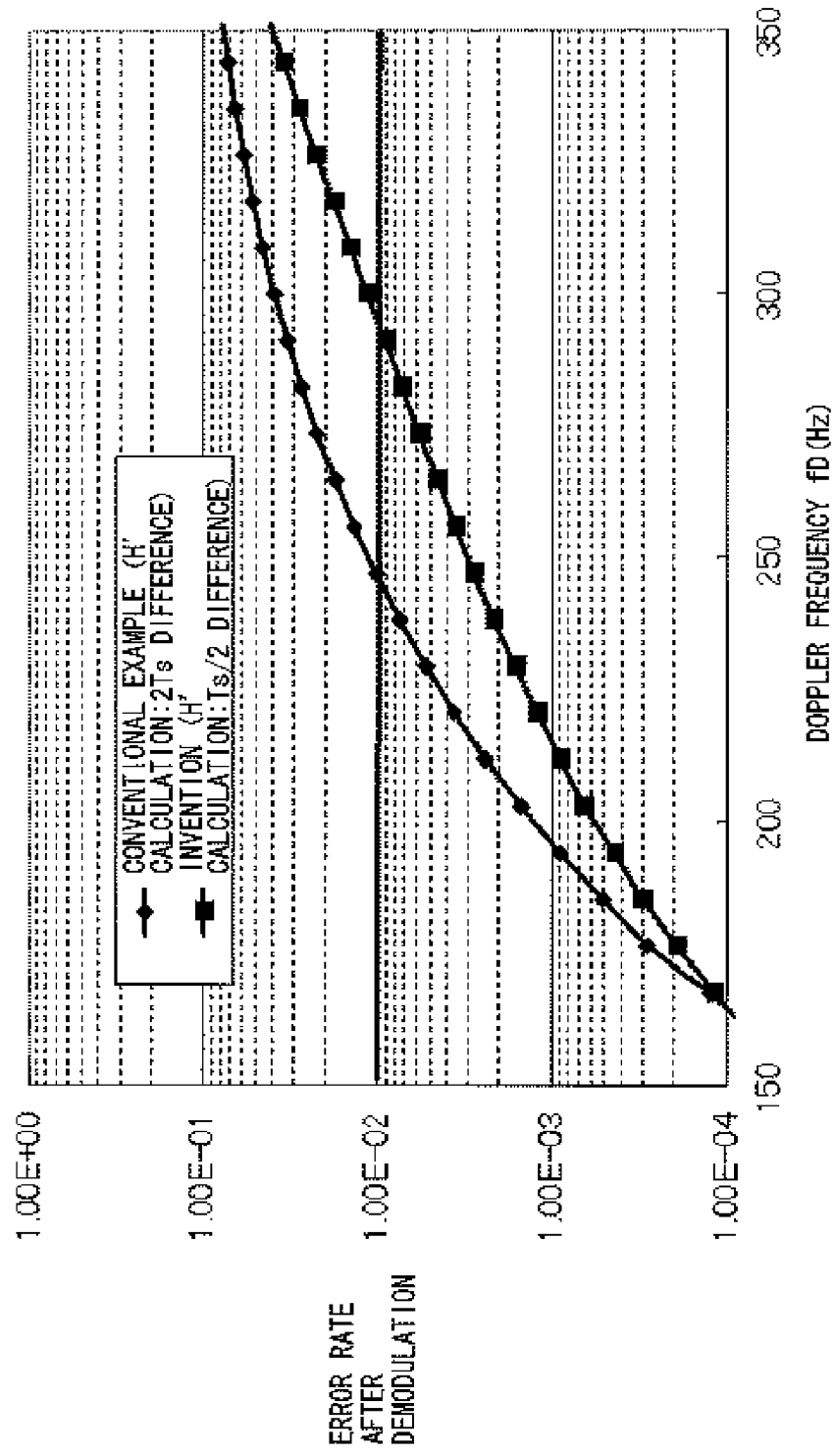
FIG. 14 is a diagram for describing an effect of the OFDM reception apparatus 100 of the first embodiment.

FIG. 14 shows the result of examination by simulation of mobile reception performance when the OFDM reception apparatus 100 of the first embodiment and the OFDM reception apparatus 1100 included in the conventional ICI removing unit 1000. Note that a transmission format used includes parameters of FIG. 15 that are used only in ISDB-T. Also, as shown in FIG. 15, a transmission channel model used is an addition of static direct waves, and delayed waves having a delay time of 5 μs (power ratio to the direct waves=−dB) with a Doppler shift of fD (Hz), for the sake of simplicity. Also, the horizontal axis represents Doppler frequencies fD (Hz), and the vertical axis represents bit error rates after demodulation and before error correction. Also, when a bit error rate after demodulation is $1 \times 10^{-2}$ or less, it is assumed that the disturbance of an image or audio is not recognized, when viewing or listening, due to the effect of error correction. When evaluation is performed using the maximum value of fD (limit fD) that allows a post-demodulation bit error rate of $1 \times 10^{-2}$ or less, the limit fD in the present invention (Ts/2 interval difference) is a little less than 300 Hz, while the limit fD in the conventional example (2Ts interval difference) is a little less than 250 Hz, as can be seen from FIG. 14. In this manner, the OFDM reception apparatus 100 of the first embodiment has a higher mobile reception limit speed and a higher level of mobile reception performance than those of the OFDM reception apparatus 1100 comprising the conventional ICI removing unit 1000.

As described above, the OFDM reception apparatus 100 of the first embodiment obtains transmission channel characteristic values by oversampling within symbols, and uses the obtained transmission channel characteristic values to calculate the first differentiations H' of the obtained transmission channel characteristic values. Thereby, the OFDM reception apparatus 100 of the first embodiment can calculate the first differentiations H' of the transmission channel characteristic values H with higher accuracy than that of the conventional OFDM reception apparatus 1100 during high-speed mobile reception, thereby making it possible to calculate the ICI component with high accuracy. As a result, the OFDM reception apparatus 100 of the first embodiment can remove ICI more effectively than the conventional OFDM reception apparatus 1100, thereby making it possible to achieve stable high-speed mobile reception.

Figure 16:
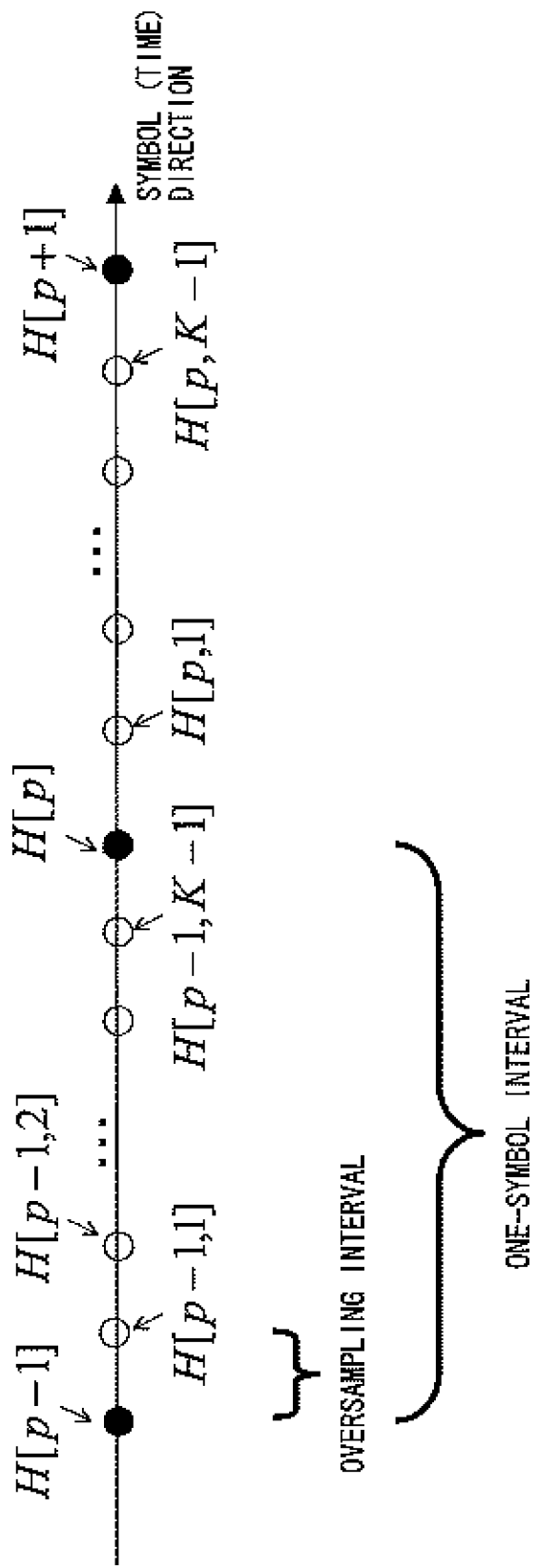
FIG. 16 is a diagram when oversampling is per formed at intervals each of which is 1/K (K is a positive integer) of a one-symbol interval (Ts).

Although it has been described above that oversampling is performed at intervals each of which is ¼ of the one-symbol interval (Ts) and derivative approximation is per formed using the Ts/2 interval difference (see FIG. 11 and Expression 5), the oversampling interval is not limited to this. For example, as shown in FIG. 16, oversampling may be performed at intervals each of which 1/K of the one-symbol interval (Ts) (K is a positive integer). In this case, the first differentiation H'[p] of the transmission channel characteristic value H[p] is calculated by Expression 6.

$$H'[p] = \frac{H[p, 1] - H[p-1, K-1]}{2(N + N_G)} K \quad (6)$$

It has also been described above that, in the process of calculating the first differentiations H' of the transmission channel characteristic values H, the transmission channel characteristic values H are oversampled before the difference operation is performed by the subtraction unit 66. Alternatively, the oversampling process and the difference operation process may be performed simultaneously. This is because the oversampling process and the difference operation process can each be achieved by using a filter, and therefore, if both the filters are connected in cascade, both the filters cart be integrated into a single filter. In this case, the first transmission channel characteristic estimating unit 51 of FIG. 5 has, for example, a configuration shown in FIG. 17, includes an intra-symbol oversampling/subtraction unit 68 instead of the intra-symbol oversampling unit 65 and the subtraction unit 66. Thereby, the circuit scale can be reduced.

Although it has also been described above that a difference between transmission channel characteristic values at two points is used in derivative approximation of calculating the first differentiation H' of a transmission channel characteristic value H, the present invention is not limited to this. Any differentiation process may be used. For example, a derivative approximation process employing transmission channel characteristic values at four points may be performed as shown in Expression 7. Alternatively, a derivative approximation process employing transmission channel characteristic values at four or more points may be performed.

$$H'[p] = \frac{H[p-1, K-2] - 8H[p-1, K-1] + 8H[p, 1] - 8H[p, 2]}{24(N + N_G)} K \quad (7)$$

Also in this case, the oversampling process and the difference operation process may be simultaneously performed as described above with reference to FIG. 17.

Figure 18:
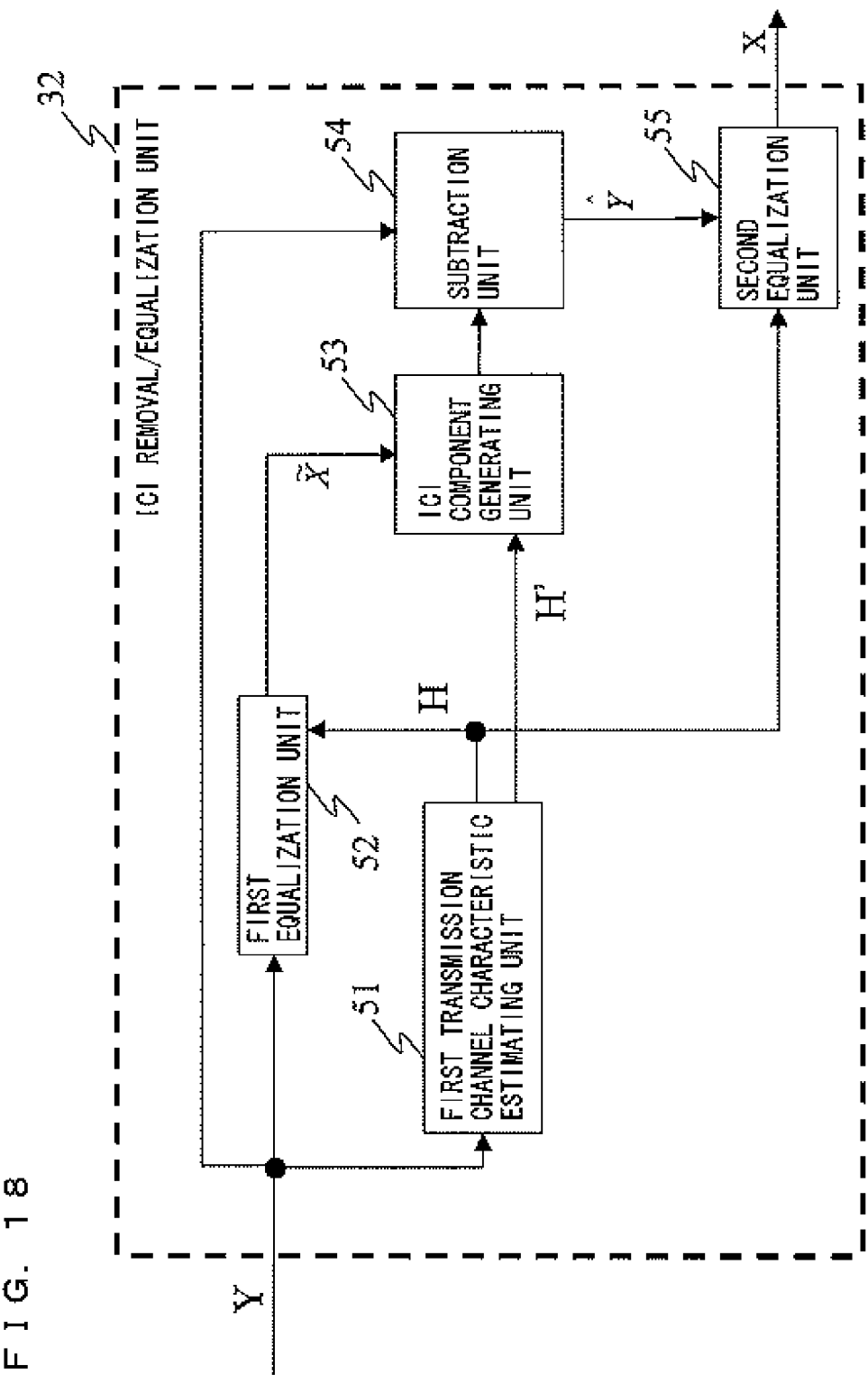
FIG. 18 is a diagram showing a configuration of an ICI removal/equalization unit 32.

Also, the configuration of the ICI removal/equalization unit 31 of FIG. 3 may be replaced with the configuration of an ICI removal/equalization unit 32 shown in FIG. 18, for example. In this case, as shown in FIG. 15, in the ICI removal/equalization unit 32, the second transmission channel characteristic estimating unit 56 of FIG. 3 is removed, and the second equalization unit 55 performs an equalization process using the transmission channel characteristic values H input from the first transmission channel characteristic estimating unit 51, instead of the transmission channel characteristic values $H_1$. Thereby the circuit scale can be reduced.

Figure 19:
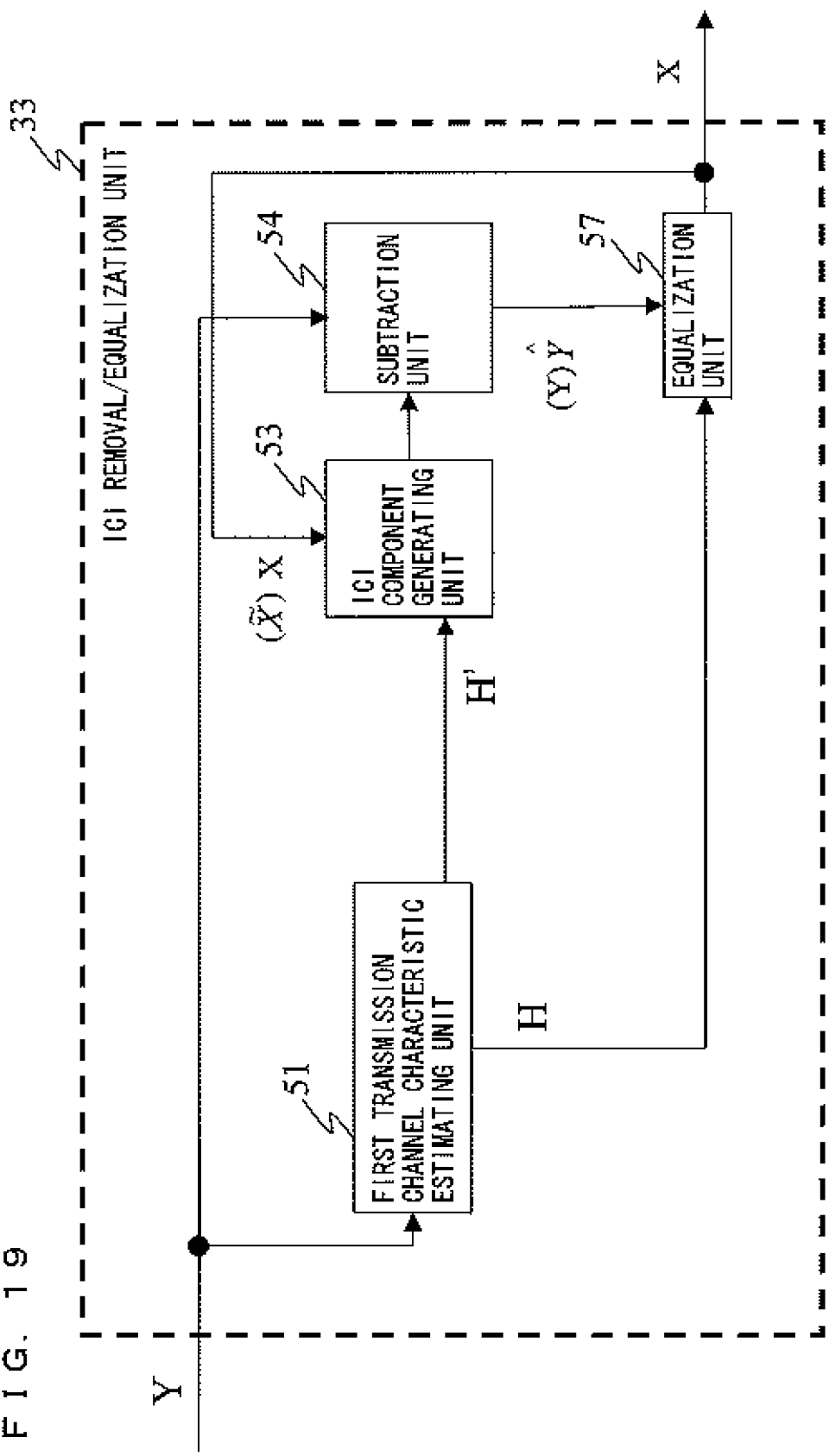
FIG. 19 is a diagram showing a configuration of an ICI removal/equalization unit 33.

Moreover, the configuration of the ICI removal/equalization unit 32 of FIG. 18 may be replaced with the configuration of an ICI removal/equalization unit 33 shown in FIG. 19, for example. In this case, as shown in FIG. 19, the ICI removal/equalization unit 33 comprises an equalization unit 57 instead of the first equalization unit 52 and the second equalization unit 55 of FIG. 18. Initially, the equalization unit 57 uses the signal Y including the ICI component input through the subtraction unit 54 and the transmission channel characteristic values H input from the first transmission channel characteristic estimating unit 51, to generate a signal X^ that is an estimate of the transmission signal X of a transmission apparatus (not shown), as in the first equalization unit 52 of FIG. 18. The ICI component generating unit 53 uses the generated X^, and the first differentiations H' of the transmission channel characteristic values H input from the first transmission channel characteristic estimating unit 51, to calculate the ICI component. The subtraction unit 54 accumulates the signal Y that has already been received, and removes the ICI component from the accumulated signal Y to calculate the signal Y˘. Next, the equalization unit 57 uses the signal Y˘ it that has been obtained by removing the ICI component using the subtraction unit 54, and the transmission channel characteristic values H that have already been received from the first transmission channel characteristic estimating unit 51, to remove propagation distortions included in the signal Y˘ to calculate the transmission signal X of a transmission apparatus, as in the second equalization unit 55 of FIG. 17. The signal X calculated by the equalization unit 57 is input back to the ICI component generating unit 53, and is then used for calculation of the ICI component. Thus, by repeatedly performing the feedback process during a symbol duration, the ICI removal/equalization unit 33 can further improve the accuracy of ICI component removal while reducing the circuit scale.

Figure 20:
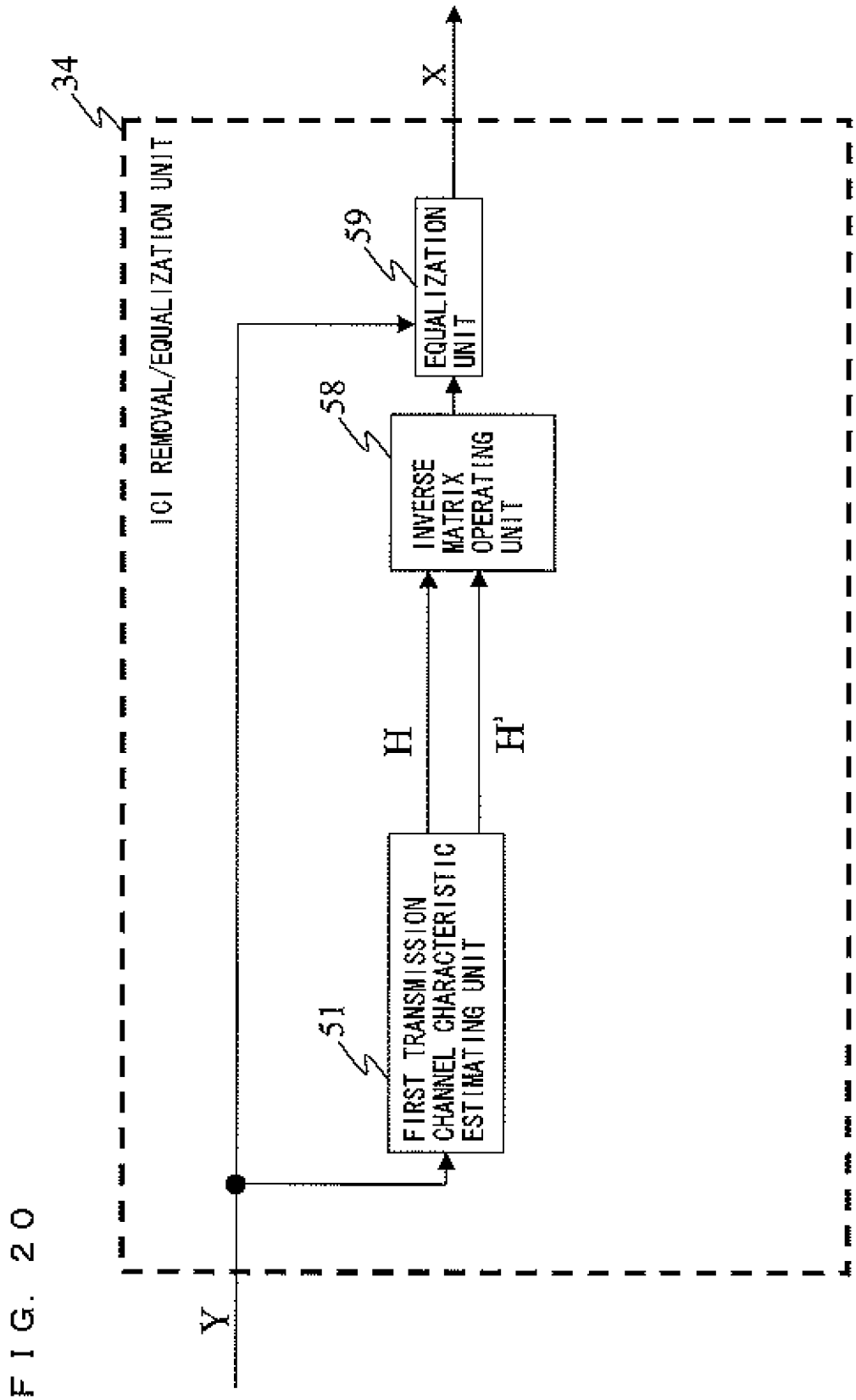
FIG. 20 is a diagram showing a configuration of an ICI removal/equalization unit 34.

Also, without using the signal X^ obtained by the equalization process, an inverse matrix Ψ shown in Expressions 8 and 9 may be used to perform an ICI removal/equalization process, thereby directly calculating the transmission signal X, i.e., the configuration of an ICI removal/equalization unit 34 shown in FIG. 20 may be used.

$$\Psi=(\text{diag}(H[p])-\Xi\text{diag}(H'[p]))^{-1} \quad (8)$$

$$X[p]=\Psi Y[p] \quad (9)$$

Here, it will be described how Expressions 8 and 9 are derived. Initially, in Expression 2, since temporary equalization (the process of the first equalization unit 52 of FIG. 3) is not performed, X˘[p] is denoted as X[p], and also, Y˘[p] after removal of ICI is replaced with diag(H[p])X[p]. Thereby, Expression 10 is obtained.

$$\text{diag}(H[p])X[p]=Y[p]-\Xi\text{diag}(H'[p])X[p] \quad (10)$$

In Expression 10, the second term on the right site is moved to the left side, which is then factored with the common factor X[p] outside the brackets, so that Expression 11 is obtained.

$$(\text{diag}(H[p])+\Xi\text{diag}(H'[p]))X[p]=Y[p] \quad (11)$$

By representing the inverse matrix of components inside the brackets by Ψ as shown in Expression 8 and multiplying Expression 11 by Ψ on both sides (Ψ is put ahead of each side), Expression 9 is obtained. As shown in FIG. 20, the ICI removal/equalization unit 54 includes a first transmission channel characteristic estimating unit 51, an inverse matrix operating unit 58, and an equalization unit 59. The first transmission channel characteristic estimating unit 51 has the same configuration as that of the first transmission channel characteristic estimating unit 51 of FIG. 3. The inverse matrix operating unit 58 uses the transmission channel characteristic value H[p] and the first differentiation H'[p] input from the first transmission channel characteristic estimating unit 51, and the fixed coefficient matrix Ξ of Expression 3, to calculate Ψ of Expression 8. The equalization unit 59 multiplies Ψ input from the inverse matrix operating unit 58 by the signal Y, simultaneously perform the ICI component removing process and the equalization process, thereby calculating the transmission signal X.

Second Embodiment

As is different from the first embodiment, a second embodiment has a feature that an over sampling process is performed using an output signal (transmission channel characteristic values at SP signal positions) of a division unit. Hereinafter, the second embodiment will be described in detail.

Figure 21:
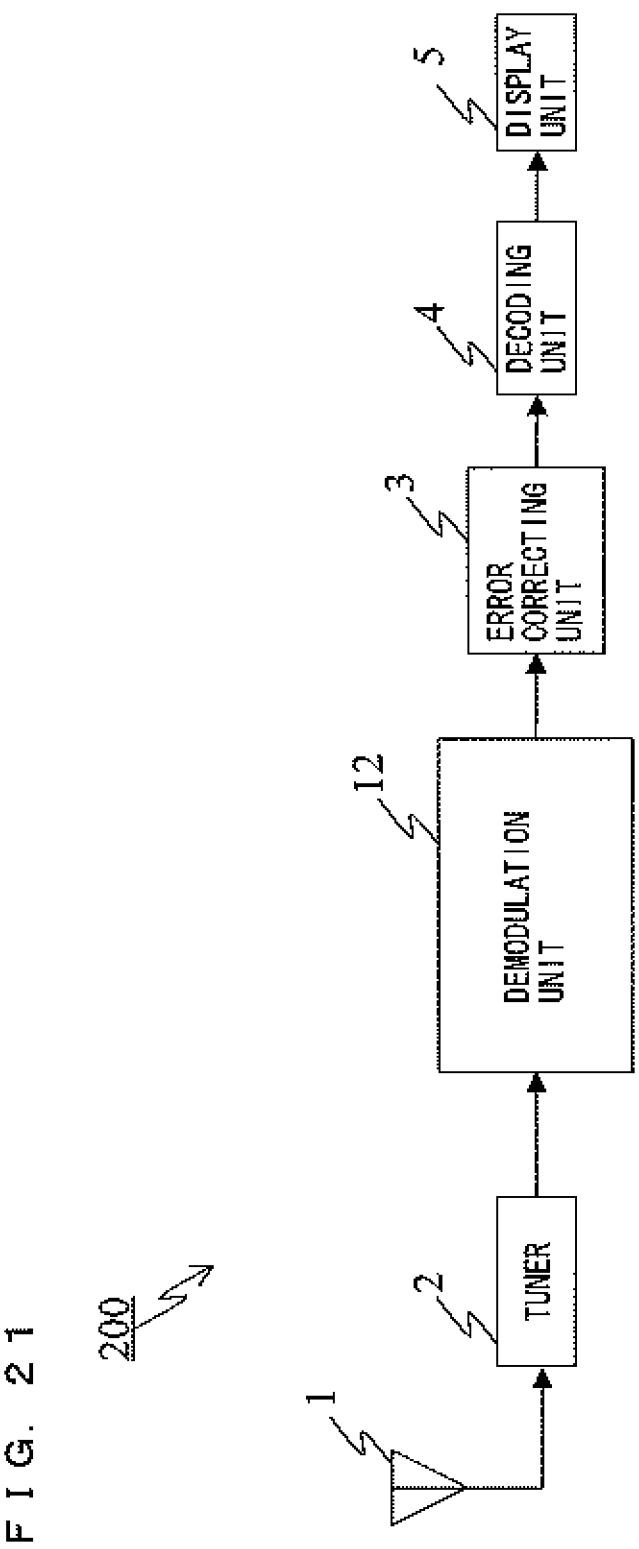
FIG. 21 is a block diagram showing an exemplary configuration of an OFDM reception apparatus 200 according to a second embodiment.
Figure 22:
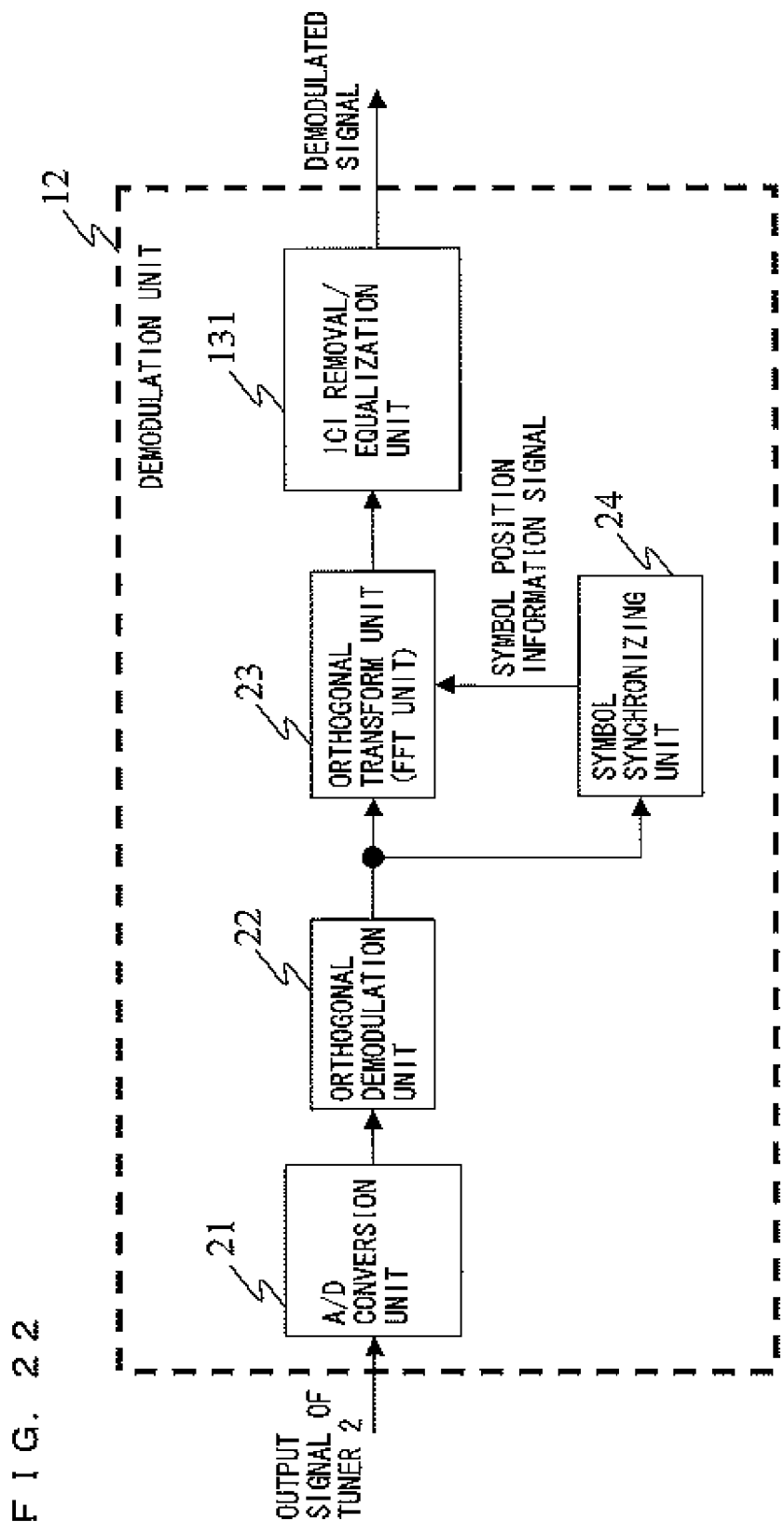
FIG. 22 is a block diagram showing an exemplary configuration of a demodulation unit 12.
Figure 23:
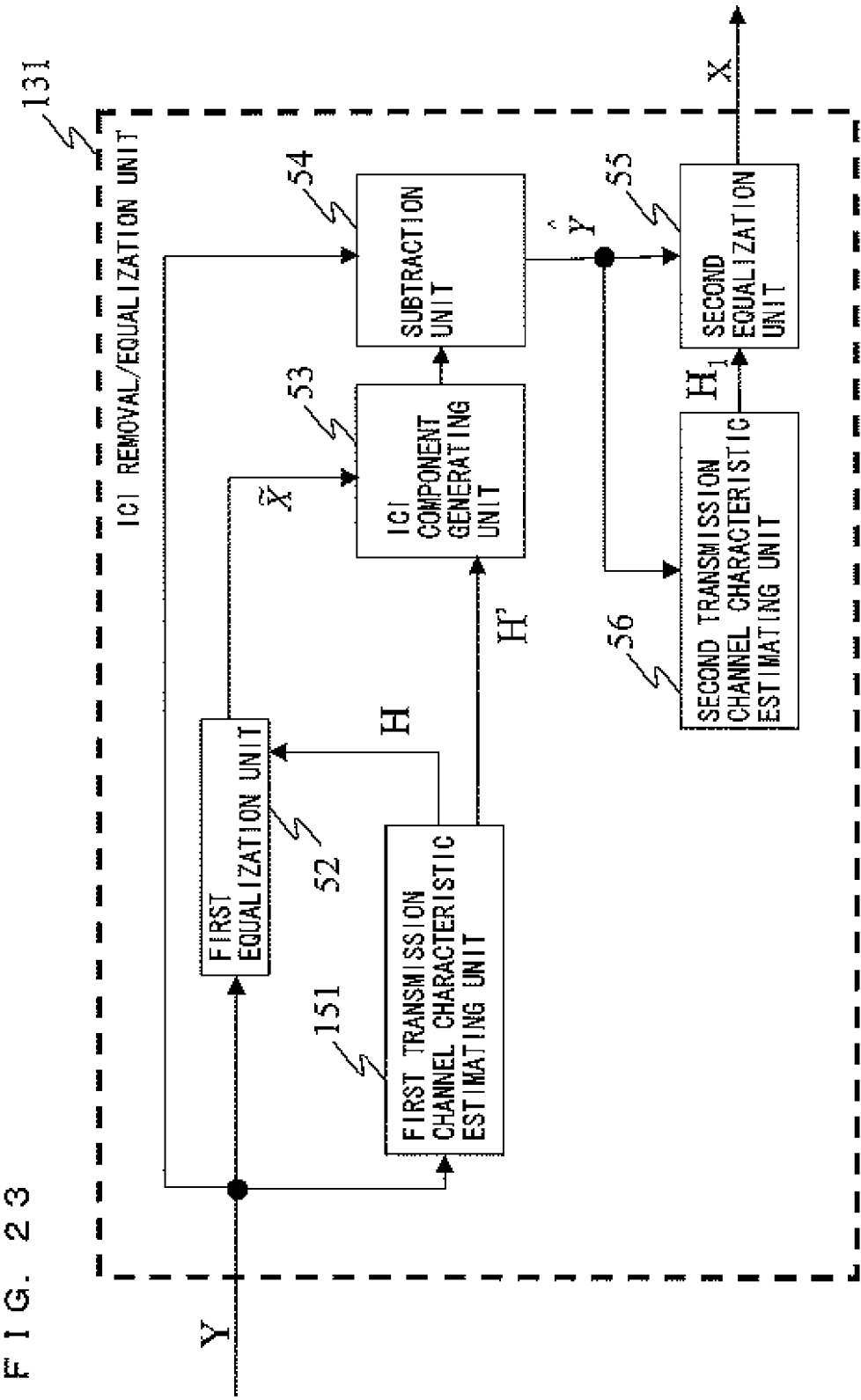
FIG. 23 is a block diagram showing an exemplary configuration of an ICI removal/equalization unit 131.
Figure 24:
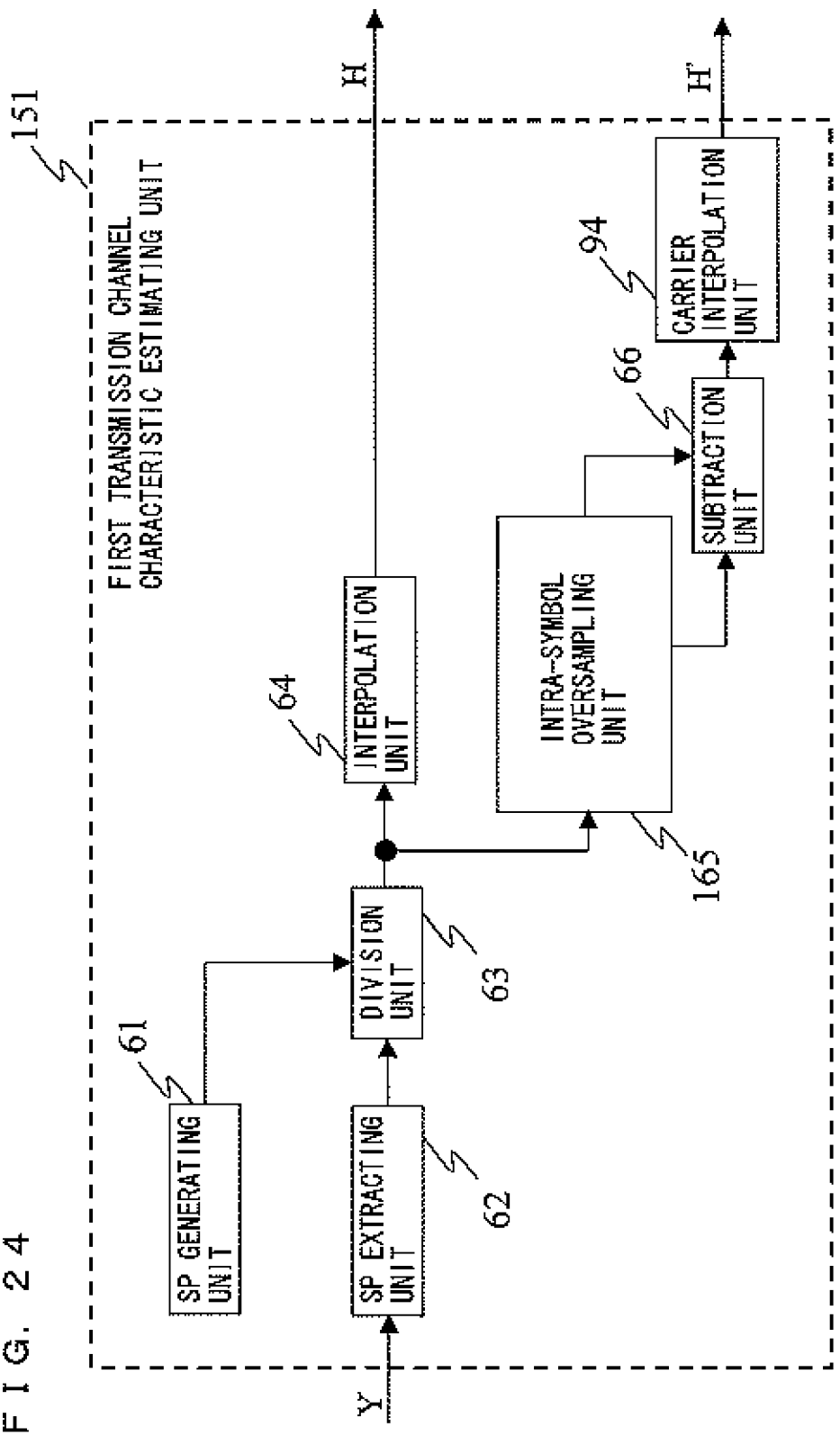
FIG. 24 is a block diagram showing an exemplary configuration of a first transmission channel characteristic estimating unit 151.

FIG. 21 is a block diagram showing an exemplary configuration of an OFDM reception apparatus 200 according to the second embodiment. The OFDM reception apparatus 200 of the second embodiment has the same configuration as that of the OFDM reception apparatus 100 of the first embodiment (see FIG. 1), except that the demodulation unit 11 is replaced with a demodulation unit 12. FIG. 22 is a block diagram showing an exemplary configuration of the demodulation unit 12. The demodulation unit 12 has the same configuration as that of the demodulation unit 11 of the first embodiment (see FIG. 2), except that the ICI removal/equalization unit 31 is replaced with an ICI removal/equalization unit 131. FIG. 23 is a block diagram showing an exemplary configuration of the ICI removal/equalization unit 131. The ICI removal/equalization unit 131 has the same configuration as that of the ICI removal/equalization unit 31 of the first embodiment, except that the first transmission channel characteristic estimating unit 51 is replaced, with a first transmission channel characteristic estimating unit 151. FIG. 24 is a block diagram showing an exemplary configuration of the first transmission channel characteristic estimating unit 151. The first transmission channel characteristic estimating unit 151 has the same configuration or that of the first transmission channel characteristic estimating unit 51 of the first embodiment (see FIG. 5), except that the intra-symbol oversampling unit 65 is replaced with an intra-symbol oversampling unit 165, and a carrier interpolation unit 94 is added. Note that, as described in the first embodiment, the interpolation unit 64 may be replaced with the interpolation unit 67 (see FIG. 10). Also, in FIGS. 21 to 24, parts similar to those of FIGS. 1 to 3 and 5 are indicated by similar reference numerals and will not be described.

As shown in FIG. 24, theta-symbol oversampling unit 165 performs a filtering process with respect to transmission channel characteristic values at SP positions input from the division unit 63, to smoothly interpolate the transmission channel characteristic values at the SP positions. Thereby, transmission channel characteristic values are oversampled at intervals each of which is smaller than the one-symbol interval in the symbol direction. Thereby, the intro-symbol oversampling unit 165 can obtain transmission channel characteristic values at intervals each of which is smaller than the one-symbol interval, from signal sequences or in the symbol (time) direction, in which SP signals are inserted (see the signal sequences indicated by the open arrows in FIG. 6). Hereinafter, as an example, a case where the intra-symbol oversampling unit 165 performs oversampling at intervals each of which is ¼ of the one-symbol interval, will be described (see FIG. 11). In this case, the subtraction unit 66 performs the difference operation of Expression 5 to calculate the first differentiations of transmission channel characteristic values for the signal sequences arranged in the symbol (time) direction in which SP signals are inserted. The carrier interpolation unit 94 uses the first-differentiation values input from the subtraction unit 66 to perform an interpolation process in the carrier (frequency) direction, thereby calculating the first differentiations H' of the transmission channel characteristic values H of all signal positions (see FIG. 6).

With the configuration described above, the OFDM reception apparatus 200 of the second embodiment can obtain an effect similar to that of the OFDM reception apparatus 100 of the first embodiment. Moreover, when the first transmission channel characteristic estimating unit 151 includes the interpolation unit 67 (see FIG. 10) instead of the interpolation unit 64, the symbol interpolation unit 92 and the intra-symbol oversampling unit 165 can share a common symbol delay memory for use in the filtering process in the symbol direction. In addition, the OFDM reception apparatus 200 of the second embodiment performs oversampling and then a difference operation using sample points within symbols as with OFDM reception apparatus 100 of the first embodiment, so that the symbol delay device of the conventional art in FIG. 56 is not required. Therefore, the OFDM reception apparatus 200 of the second embodiment can reduce the circuit scale to a further extent than that of the OFDM reception apparatus 100 of the first embodiment.

Note that, also in the second embodiment as in the first embodiment, the oversampling interval is not limited to ¼ of the one-symbol interval. For example, as shown in FIG. 16, oversampling may be performed at intervals each of which is 1/K of the one-symbol interval. In this case, the first differentiation H'[p] of the transmission channel characteristic value H[p] is calculated by using Expression 6.

Figure 17:
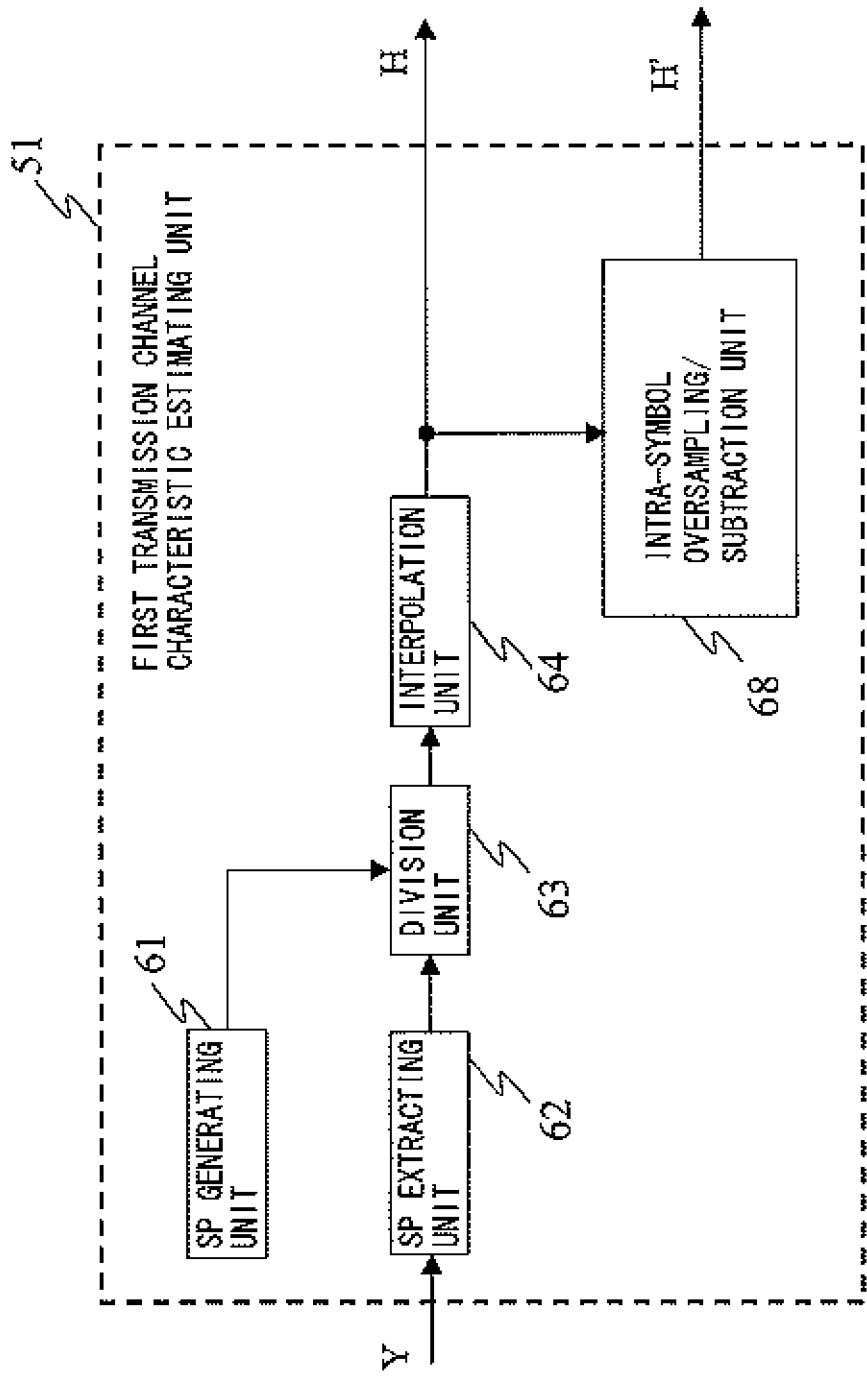
FIG. 17 is a diagram showing another configuration of the first transmission channel characteristic estimating unit 51.
Figure 25:
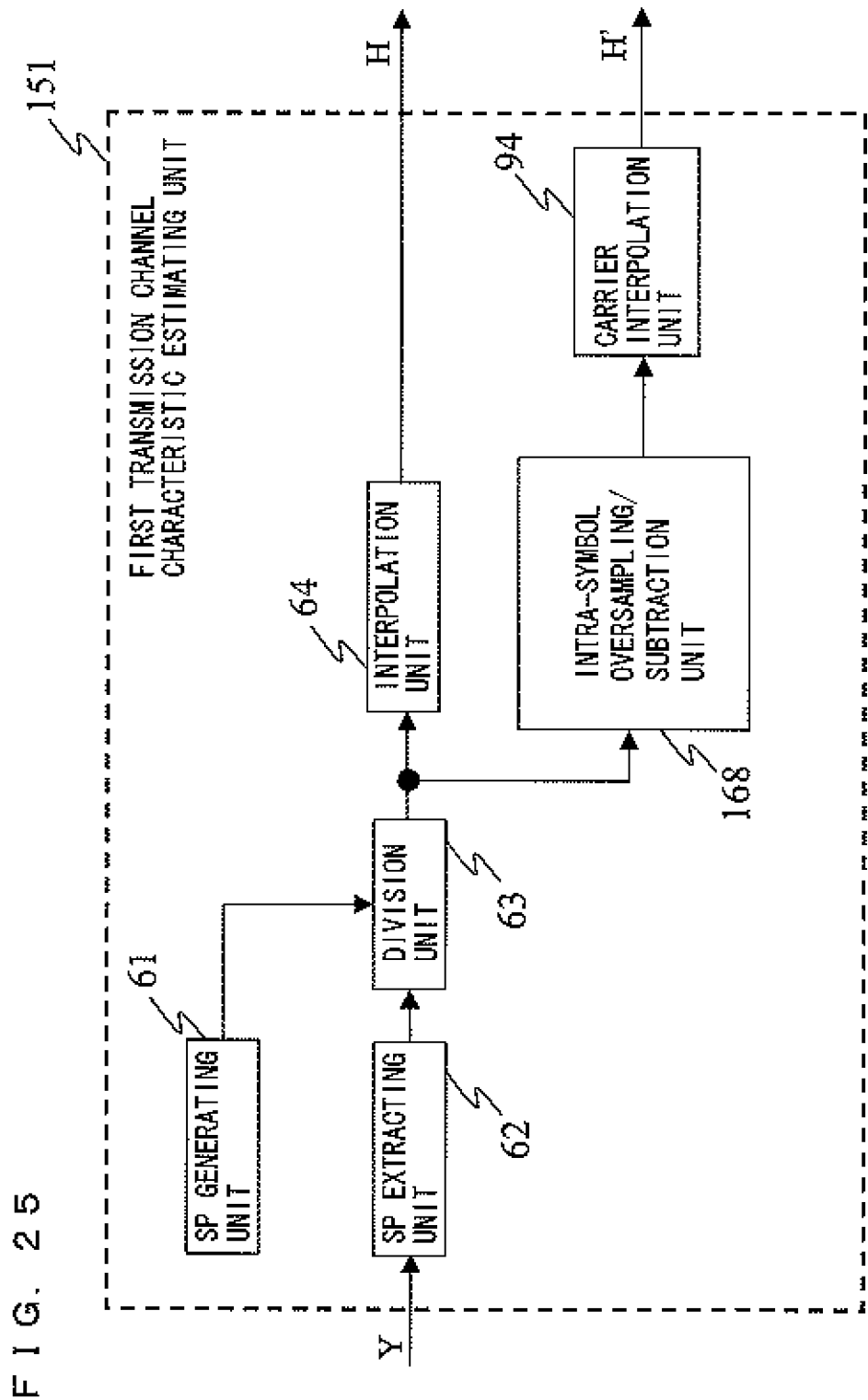
FIG. 25 is a block diagram showing another exemplary configuration of the first transmission channel characteristic estimating unit 151.

Also, as described in the first embodiment with reference to FIG. 17, the intra-symbol oversampling unit 165 and the subtraction unit 66 may be integrated into an intra-symbol oversampling/subtraction unit 168 as shown in FIG. 25.

Also in the second embodiment, as in the first embodiment, derivative approximation of calculating the first differentiations H' of the transmission channel characteristic values H is not limited to the use of a difference between transmission channel characteristic values at two points. For example, a derivative approximation process employing transmission channel characteristic values at four points may be performed as shown in Expression 7. Alternatively, a derivative approximation process employing transmission channel characteristic values at four or more points may be performed. Also in this case, the oversampling process and the difference operation process may be simultaneously performed as described with reference to FIG. 25.

Figure 26:
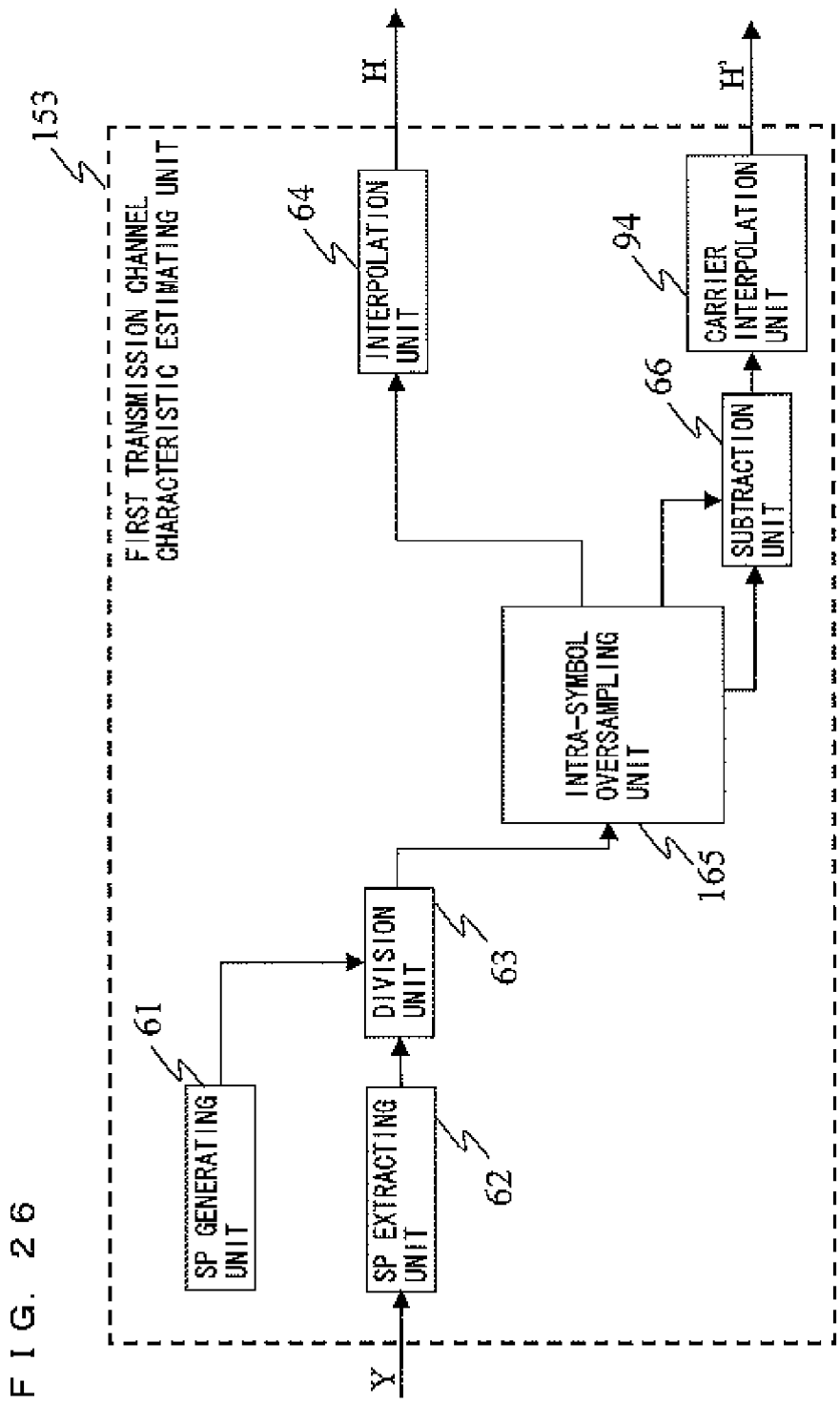
FIG. 26 is a block diagram showing an exemplary configuration of a first transmission channel characteristic estimating units 153.

Also as shown in FIG. 26, the interpolation unit 64 (see FIG. 7) may not receive an output signal of the division unit 63, and may receive the transmission channel characteristic values at the signal positions included in the signal sequences indicated by the open arrows in FIG. 6, from the intra-symbol oversampling unit 165. In this case, the interpolation unit 64 use the input transmission channel characteristic values to perform an interpolation process in the carrier direction, thereby calculating the transmission channel characteristic values H at all the signal positions. With such a configuration, a first transmission channel characteristic estimating unit 153 shown in FIG. 26 can calculate the transmission channel characteristic values H with high accuracy without comprising the interpolation unit 67 including the symbol interpolation unit 92 and the carrier interpolation unit 93-1 (see FIG. 9).

Also, the configuration of the ICI removal/equalization unit of the second embodiment is not limited to that of the ICI removal/equalization unit 131 of FIG. 23. For example, the configuration of the ICI removal/equalization unit of the second embodiment may be that of the removal/equalization unit 32, 33 or 34 of the first embodiment of FIGS. 18 to 20, in which the first transmission channel characteristic estimating unit 51 is replaced with the first transmission channel characteristic estimating unit 151 or 153 (see FIGS. 24 to 26).

Third Embodiment

As is different from the first embodiment, a third embodiment has a particular feature that the first differentiations H' of the transmission channel characteristic values H for use in ICI component generation are switched, depending on speed information. Hereinafter, the third embodiment will be described in detail.

Figure 27:
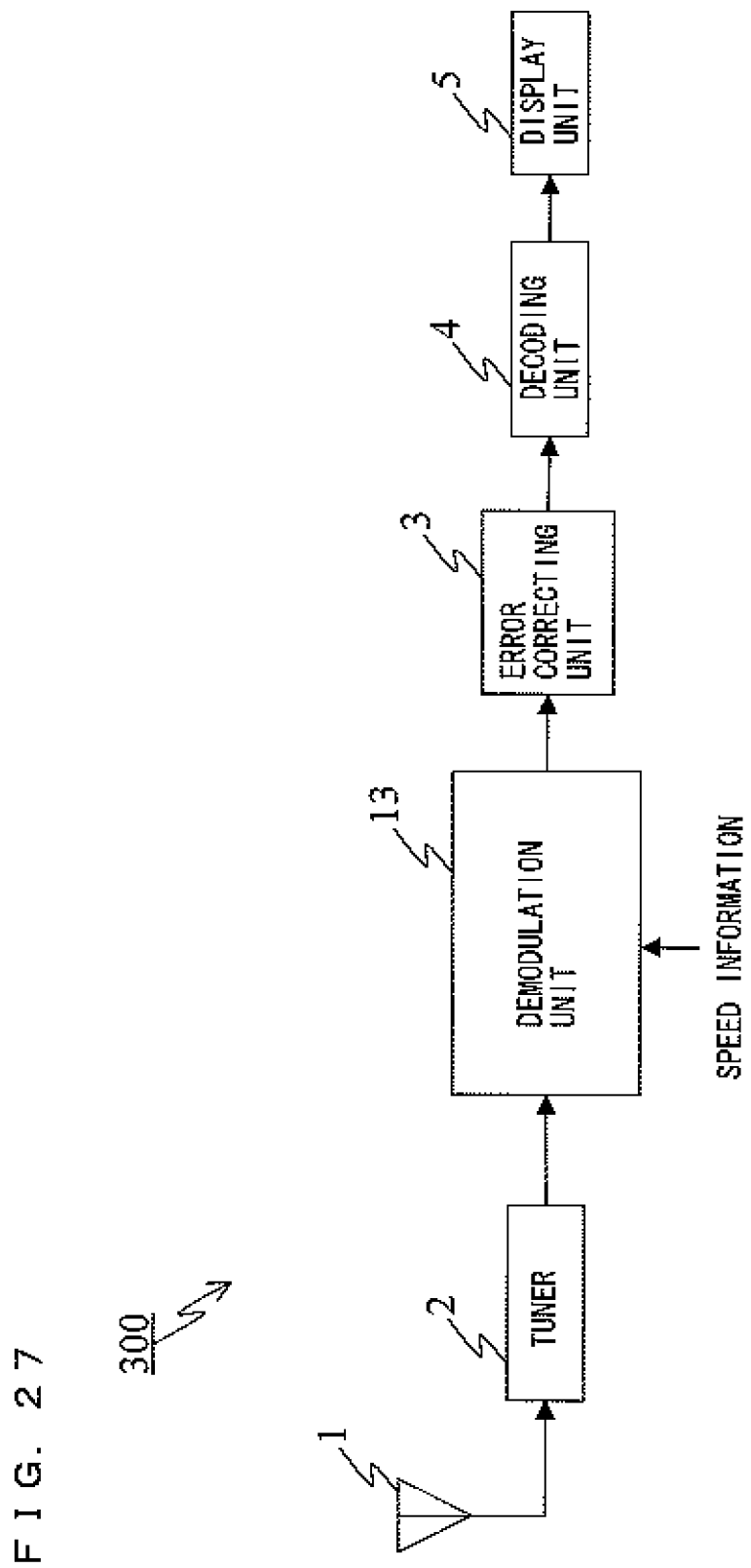
FIG. 27 is a block diagram showing an exemplary configurations of an OFDM reception apparatus 300 according to a third embodiment.
Figure 28:
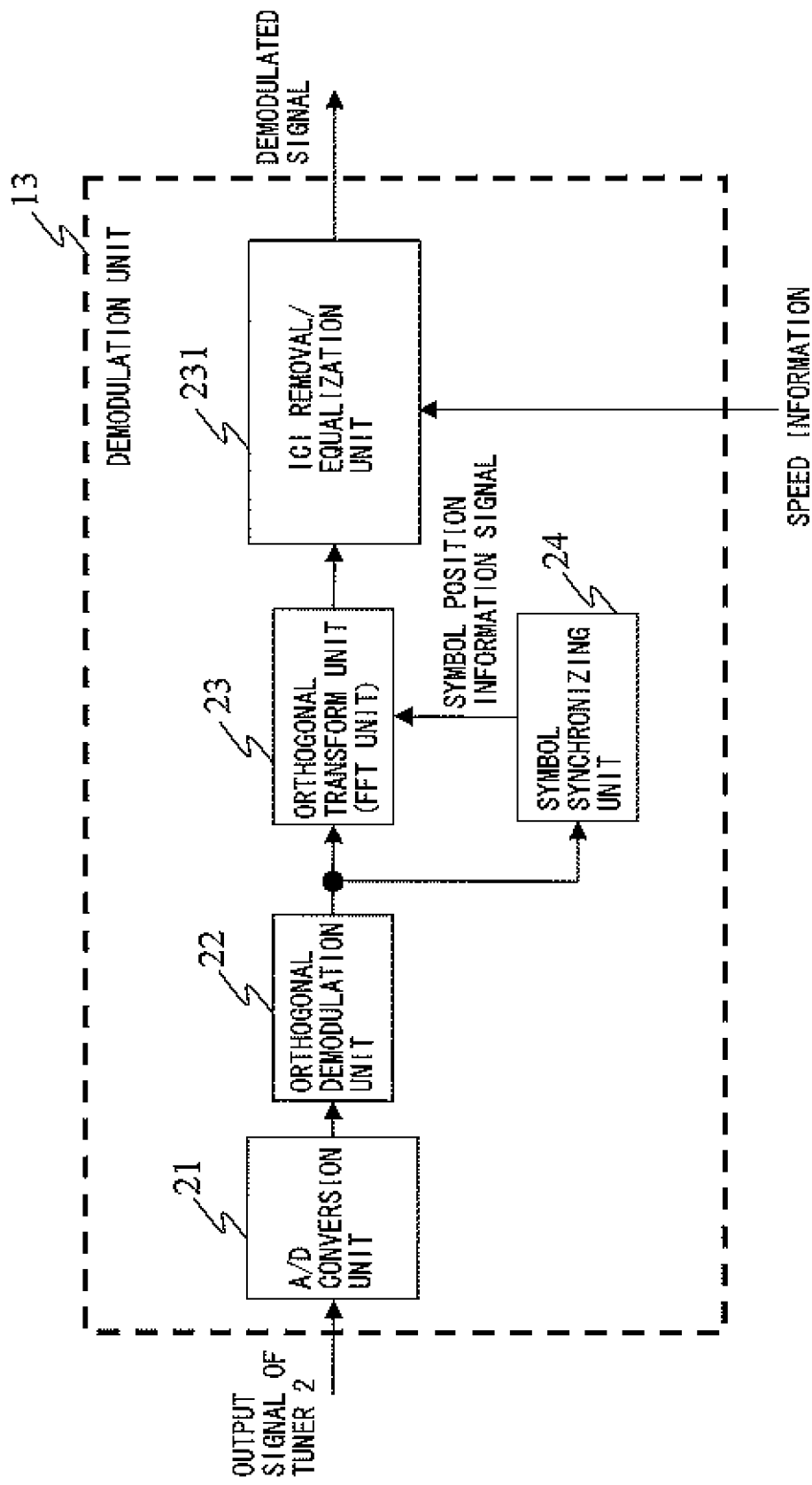
FIG. 28 is a block diagram showing an exemplary configuration of a demodulation unit 13.
Figure 29:
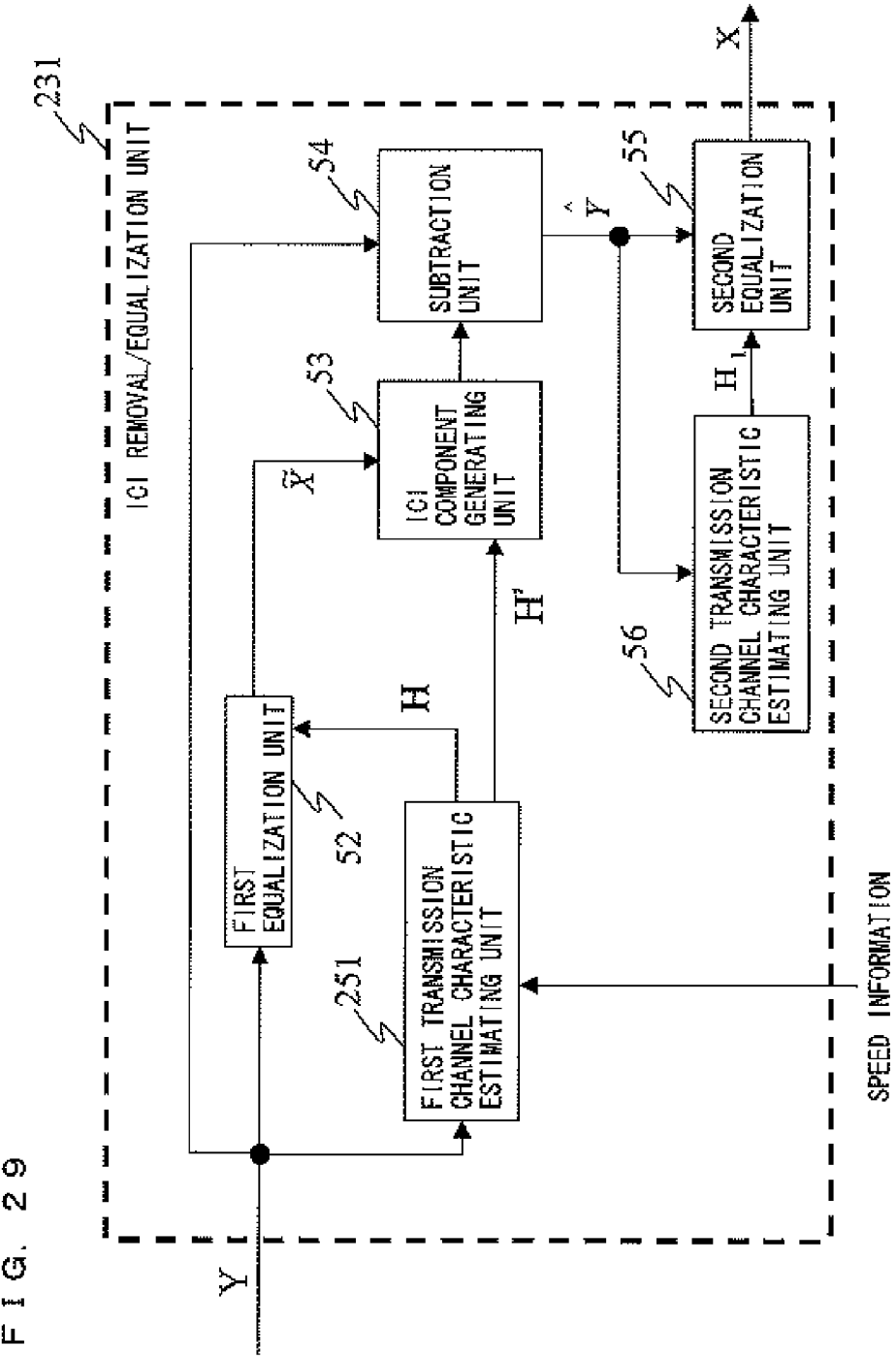
FIG. 29 is a block diagram showing an exemplary configuration of an ICI removal/equalization unit 231.
Figure 30:
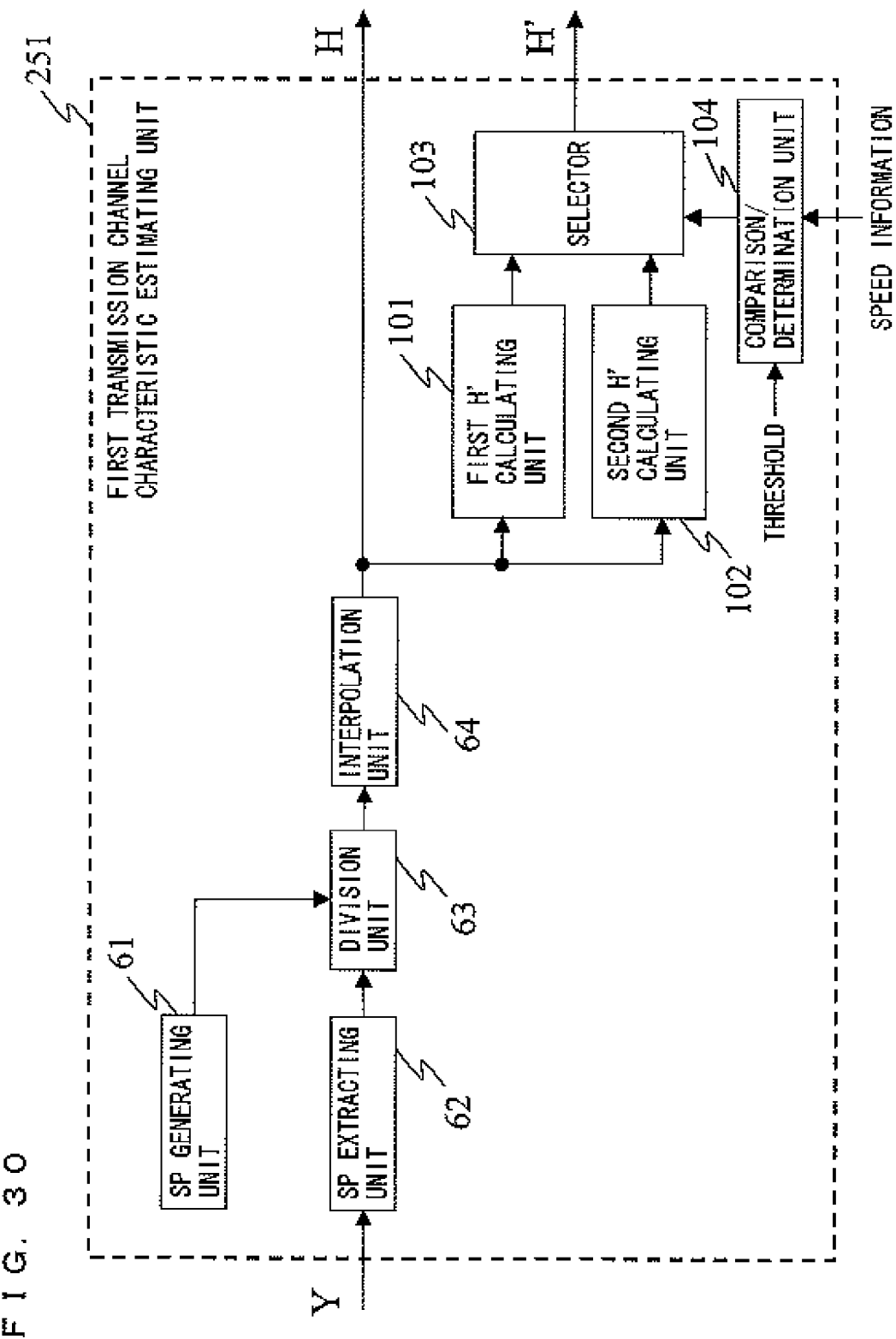
FIG. 30 is a block diagram showing an exemplary configuration of a first transmission channel characteristic estimating unit 251.
Figure 31:
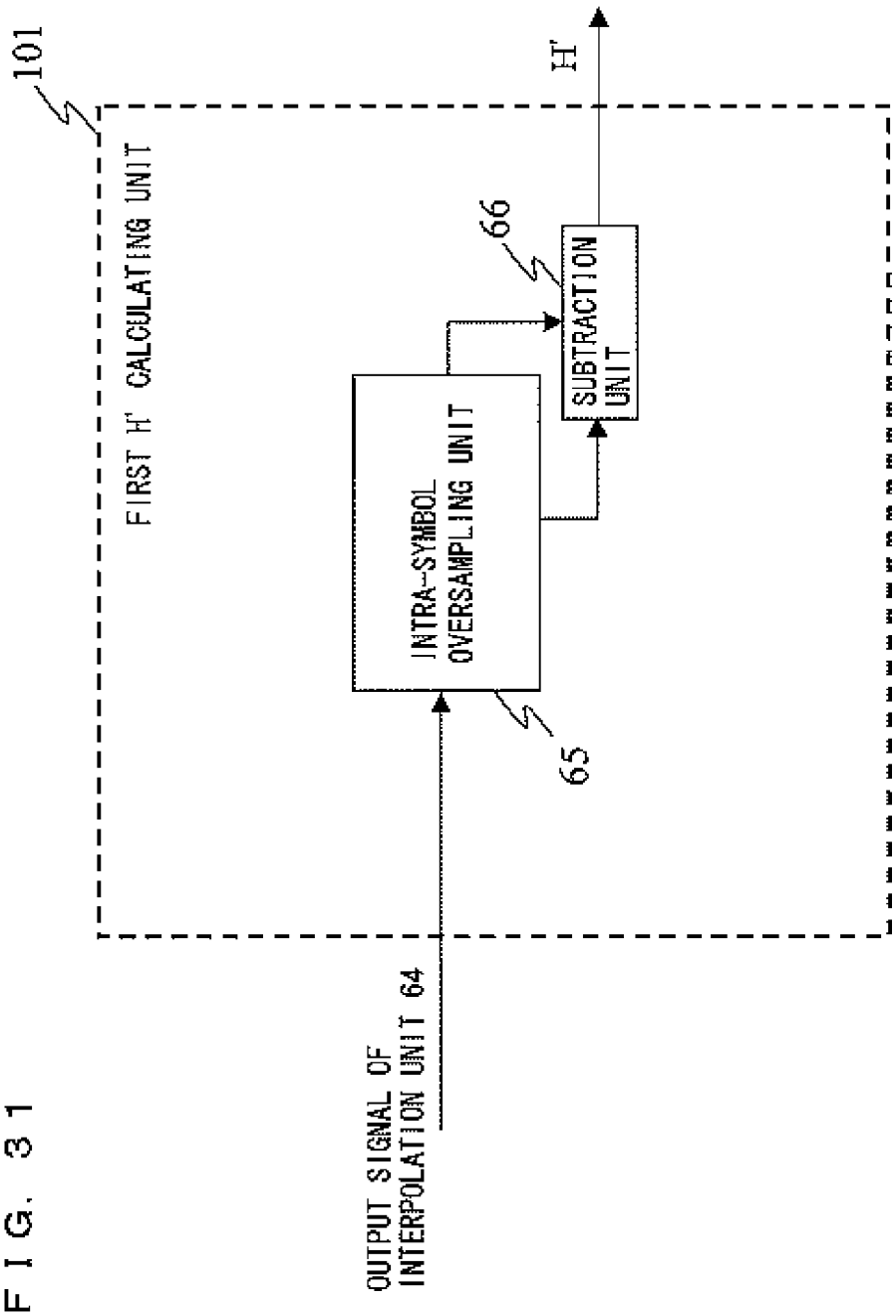
FIG. 31 is a block diagram showing an exemplary configuration of a first H' calculating unit 101.

FIG. 27 is a block diagram showing an exemplary configuration of an OFDM reception apparatus 300 according to a third embodiment. The OFDM reception apparatus 300 of the third embodiment has the same configuration as that of the OFDM reception apparatus 100 of the first embodiment (see FIG. 1), except that the demodulation unit 11 is replaced with a demodulation unit 13. FIG. 28 is a block diagram showing an exemplary configuration or the demodulation unit 13. The demodulation unit 13 has the same configuration as that of the demodulation unit 11 of the first embodiment (see FIG. 2), except that the ICI removal/equalization unit 31 is replaced with an ICI removal/equalization unit 231. FIG. 29 is a block diagram showing an exemplary configuration of the ICI removal/equalization unit 231. The ICI removal/equalization unit 231 has the same configuration as that of the ICI removal/equalization unit 31 of the first embodiment, except that the first transmission channel characteristic estimating unit 51 is replaced with a first transmission channel characteristic estimating unit 251. FIG. 30 is a block diagram showing an exemplary configuration of the first transmission channel characteristic estimating unit 251. The first transmission channel characteristic estimating unit 251 has the same configuration as that of the first transmission channel characteristic estimating unit 51 of the first embodiment (see FIG. 5), except that a second H' calculating unit 102, a selector 103 and a comparison/determination unit 104 are added, and the intra-symbol oversampling 65 and the subtraction unit 66 are integrated into a first H' calculating unit 101 (see FIG. 31). Note that, as described in the first embodiment, the interpolation unit 64 may be replaced with the interpolation unit 67 (see FIG. 10). Also, in FIGS. 27 to 30, parts similar to those of FIG. 1 to 3 and 5 are indicated by similar reference numerals and will not be described.

Figure 32:
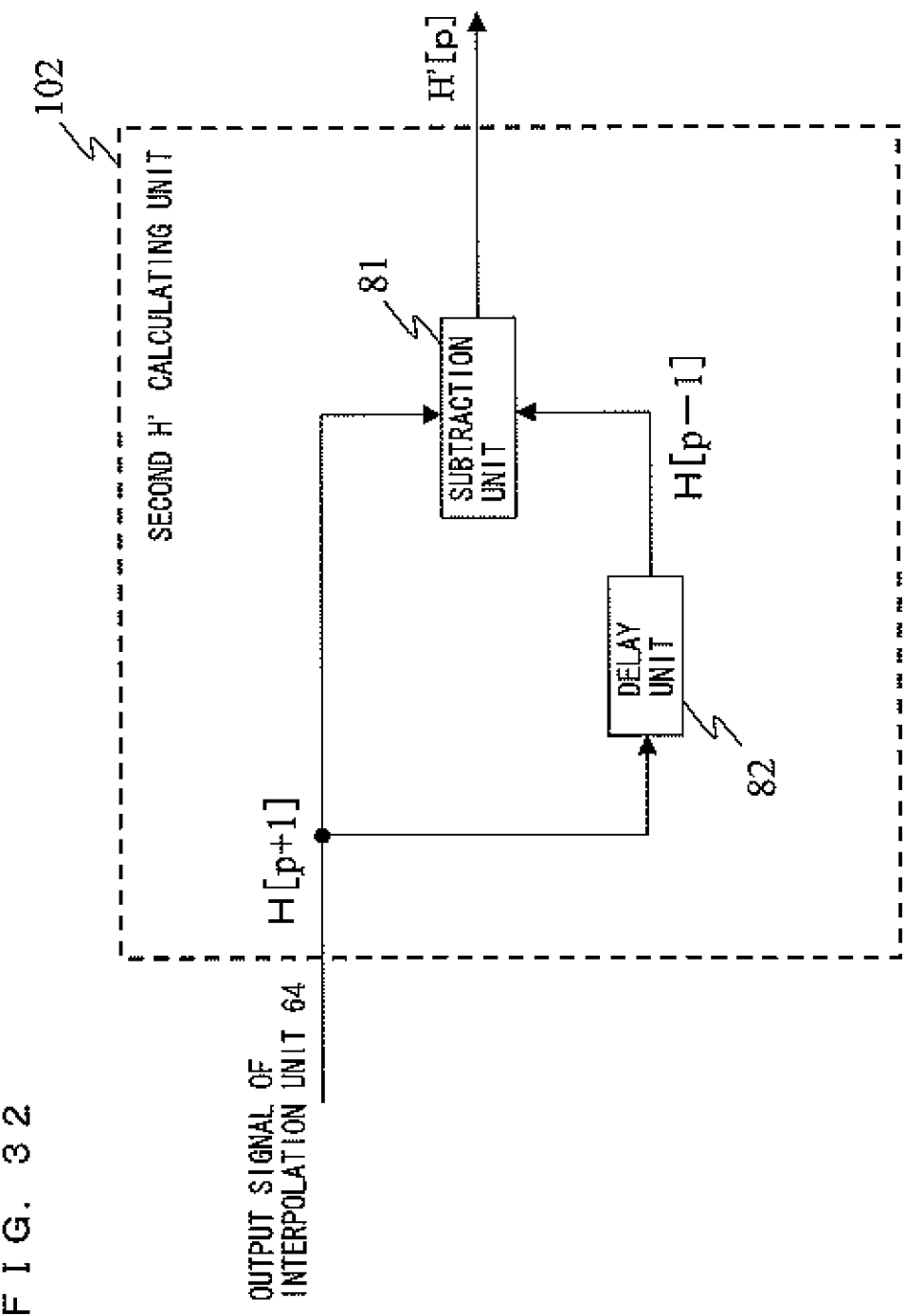
FIG. 32 is a block diagram showing an exemplary configuration of a second H' calculating unit 102.

As shown in FIG. 30, the transmission channel characteristic values H output from the interpolation unit 64 are input to the outside (the first equalization unit 52) of the first transmission channel characteristic estimating unit 251, the first H' calculating unit 101, and the second H' calculating unit 102. The first H' calculating unit 101 use the intra-symbol oversampling unit 65 and the subtraction unit 66 to calculate H' obtained by an oversampling process, as described in the first embodiment. The second H' calculating unit 102 calculates the first differentiations H' of the transmission channel characteristic values H using Expression 1 as in the technique of Document 1 (see. FIG. 56). In other words, the second H' calculating unit 102 calculates H' by a difference operation of two-symbol interval without performing an oversampling process. FIG. 32 is a block diagram showing an exemplary configuration of the second H' calculating unit 102. As shown in FIG. 32, the second H' calculating unit 102 includes a subtraction unit 81 and a delay unit 82. The delay unit 82 delays by two symbols the transmission channel characteristic value H[p+1] input from the interpolation unit 64 to output H[p−1]. The subtraction unit 81 uses H[p+1] input from the interpolation unit 64 and H[p−1] input from the delay unit 82 to perform the operation process of Expression 1, thereby calculating H'[p]. In this manner, the second H' calculating unit 102 calculates H' obtained by a difference operation of the two-symbol interval. Note that the second H' calculating unit 102 may calculate H' by a difference operation of an interval of two or more symbols.

The comparison/determination unit 104 receives speed information indicating the moving speed of the OFDM reception apparatus 300, from the outside of the OFDM reception apparatus 300. The comparison/determination unit 104 compares the moving speed indicated by the input speed information with a predetermined threshold to determine whether the moving, speed is higher or lower than the predetermined threshold, and outputs the result of determination.

The selector 103 receives H' obtained by the oversampling process calculated by the first H' calculating unit 101, H' obtained by the two-symbol interval difference operation calculated by the second H' calculating unit 102, and the result of determination by the comparison/determination unit 104. The selector 103, when the result of determination by the comparison/determination unit 104 is "low", outputs H' obtained by the two-symbol interval difference operation calculated by the second H' calculating unit 102 to the ICI component generating unit 53 (see FIG. 29). On the other hand, the selector 103, when the result of by the comparison/determination unit 104 is "high", outputs H' obtained by the oversampling process calculated by the first H' calculating unit 101 to the ICI component generating unit 53. In other words, the selector 103, when the OFDM reception apparatus 300 is moving with high speed, outputs H' obtained by the oversampling process, and when the OFDM reception apparatus 300 is moving with low speed, outputs H' obtained by the two-symbol interval difference operation (conventional art).

The ICI component generating unit 53 generates an ICI component using H' obtained by the oversampling process or H' obtained by the two-symbol interval difference operation, which are input from the selector 103.

Here, referring back to FIG. 13, the necessity of switching of H' input to the ICI component generating unit 53, depending on the moving speed will be described. As shown in FIG. 13, in a region where the Doppler frequency is low (fD=0 to 100 Hz) due to low moving speed, the difference operation (2TS interval difference) method of the conventional art can achieve accuracy well close to that of ideal differentiation. Moreover, the difference operation (2Ts interval difference) method of the conventional art does not perform oversampling, so that there is no interpolation error caused by a filtering process involved in oversampling, and the nod se band is narrow due to filter characteristics that suppress the gain in a high frequency band. Therefore, when the mowing speed is low (low Doppler frequency) it is preferable to remove an ICI component using H' obtained by the two-symbol interval difference operation (2Ts interval difference), from the viewpoint of noise resistance. On the other hand, when the moving speed is high (high Doppler frequency), the accuracy of H' obtained, by the two-symbol interval difference operation (2Ts interval difference) is extremely lowered as described in the first embodiment. Therefore, when the moving speed is high, it is preferable to remove an ICI component using H' obtained, by the oversampling process.

With the configuration described above, the OFDM reception apparatus 300 of the third embodiment can switch methods of calculating the first differentiations H' of the transmission channel characteristic values H, depending on the moving speed. Thereby, the OFDM reception apparatus 300 or the third embodiment can suppress an influence of noise during low speed movement while obtaining an effect similar to that of the OFDM reception apparatus 100 of the first embodiment.

Note that, also in the third embodiment, as in the first embodiment, the oversampling interval is not limited to ¼ of the one-symbol interval. For example, as shown in FIG. 16, oversampling may be performed at intervals each of which is 1/K of the one-symbol interval (Ts). In this case, the first differentiation H'[p] of the transmission channel characteristic value H[p] is calculated by using Expression 6.

Also, in the third embodiment, the method of calculating the first differentiations H' of the transmission channel characteristic values H in the second. H' calculating unit 102 has been described as the 2Ts difference operation employing Expression 1. Alternatively, the H' generating method of the second H' calculating unit 102 may be a difference operation of more than 2Ts. For example, a 4Ts interval difference operation employing Expression 12 may be provided.

$$H'[p] = \frac{H[p+2] - H[p-2]}{4(N+N_G)} \quad (12)$$

Also, in the third embodiment, the first transmission channel characteristic estimating unit 251 that switches and outputs two kinds of H' (see FIG. 30) has been described. Alternatively, three or more kinds of H' may be generated using a first H' operating unit 101 to a i-th H' operating unit 101 (i is an integer of 3 or more), and a selector 105 may be used to switch and output the three or more kinds of H' (e.g., a first transmission channel characteristic estimating unit 252 shown in FIG. 33). In this case, a comparison/determination unit 106 determines in which of a plurality of levels the moving speed falls using first to (i−1)-th thresholds. The selector 105 switches and outputs the three or more kinds of H' in accordance with the result of determination by the comparison/determination unit 106.

Also, in the third embodiment, a plurality of H' calculating units are provided so as to calculate a plurality of kinds of H'. Alternatively, for example, a single H' calculating unit for switching differentiation intervals (2Ts, Ts/2, Ts/4, etc.) for calculating H', depending on the result of determination by the comparison/determination unit 104 or 106 may be provided so as to calculate a plurality of kinds of H'. In this case, the selectors 103 and 105 can be removed.

Also, the configuration of the ICI removal/equalization unit of the third embodiment is not limited to that of the ICI removal/equalization unit 231 of FIG. 29. For example, the configuration of the ICI removal/equalization unit of the third embodiment may be that of the ICI removal/equalization unit 32, 33 or 34 of the first embodiment of FIGS. 18 to 20, in which the first transmission channel characteristic estimating unit 51 is replaced, with the first transmission channel characteristic estimating unit 251 or 252 (see FIGS. 30 and 33).

Fourth Embodiment

A fourth embodiment is of a combination of the feature of the second embodiment and the feature of the third embodiment. Hereinafter, the fourth embodiment will be described in detail.

Figure 34:
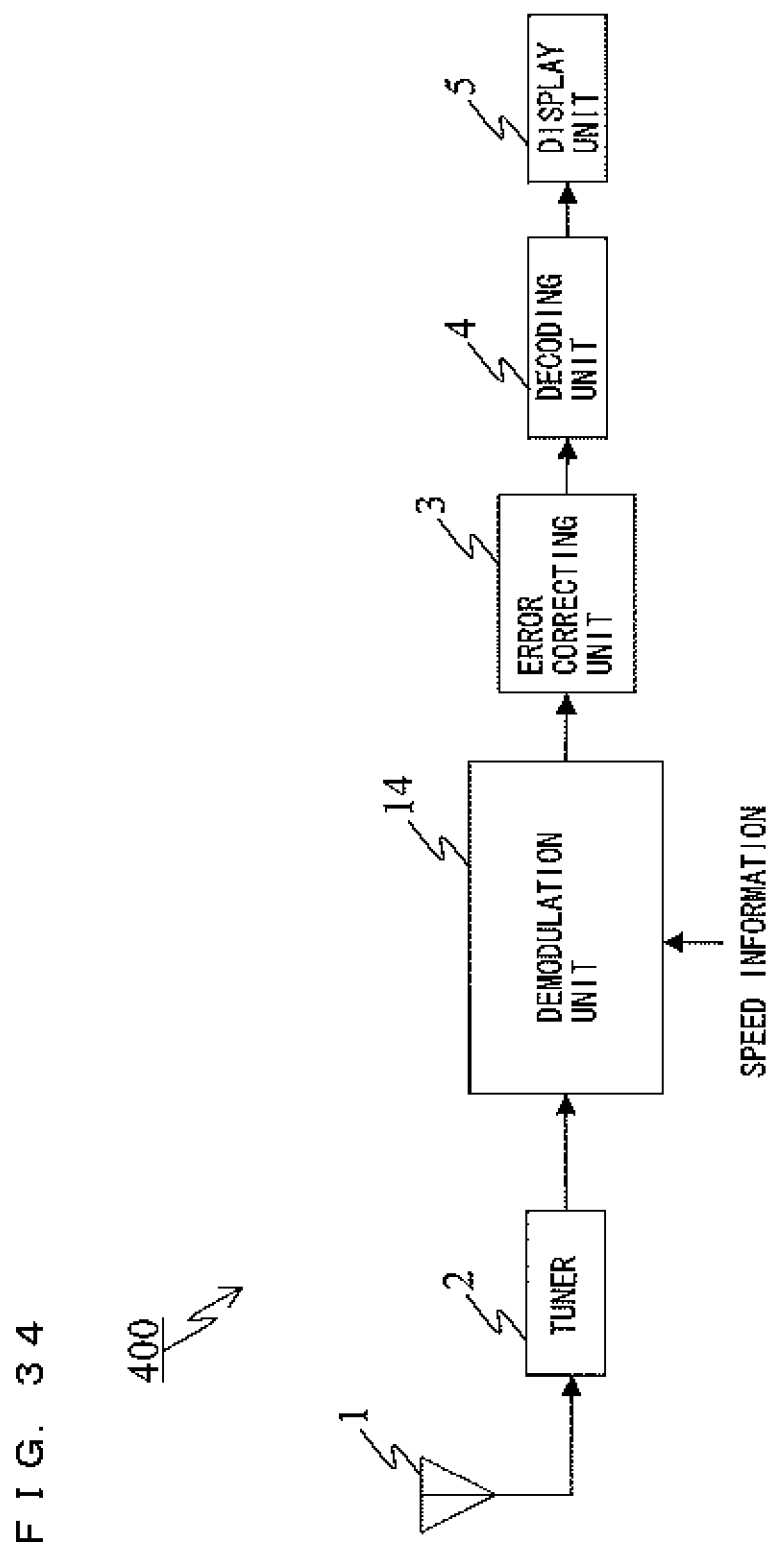
FIG. 34 is a block diagram showing an exemplary configuration showing an OFDM reception apparatus 400 according to a fourth embodiment.
Figure 35:
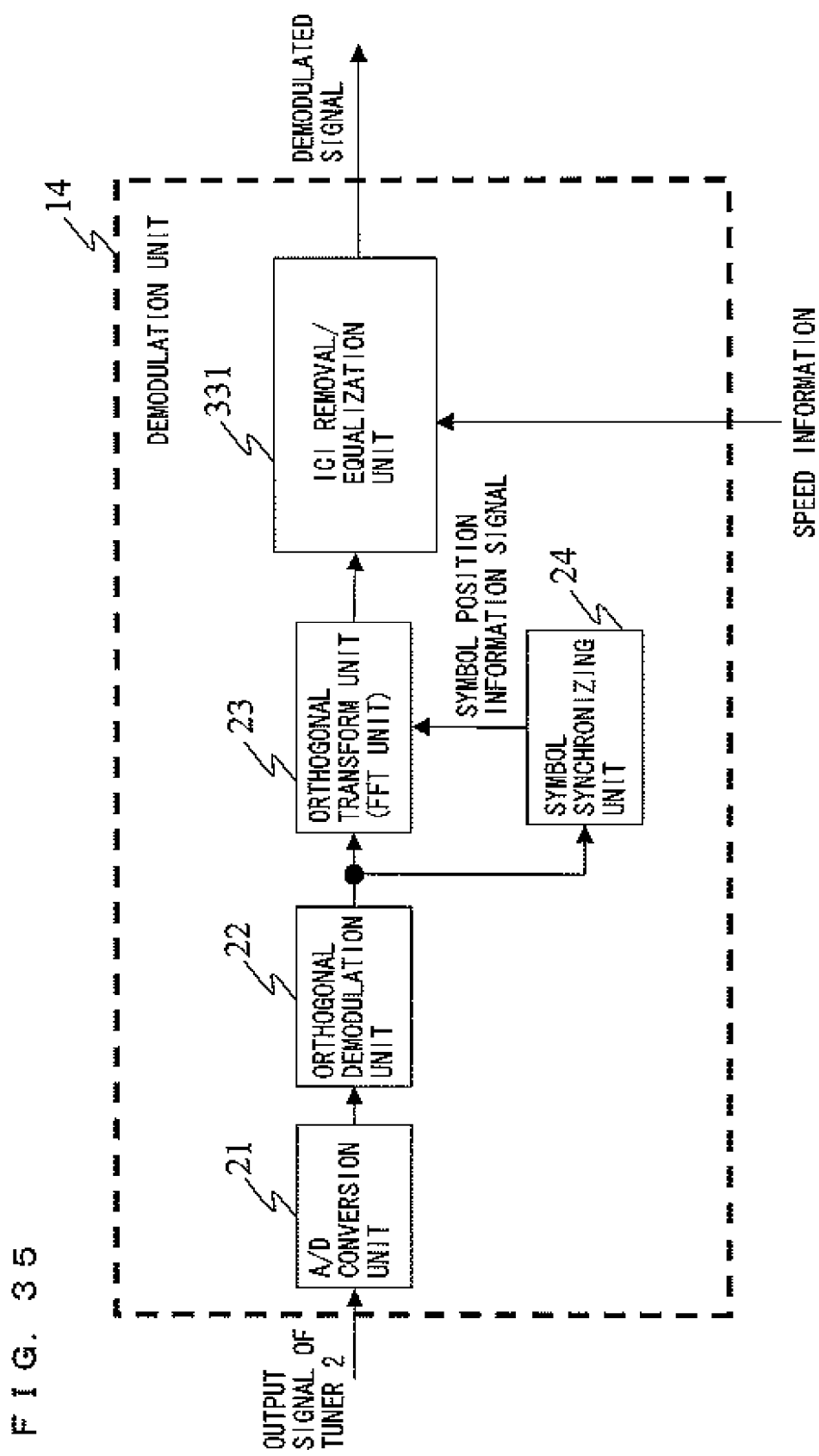
FIG. 35 is a block diagram showing an exemplary configuration of a demodulation unit 14.
Figure 36:
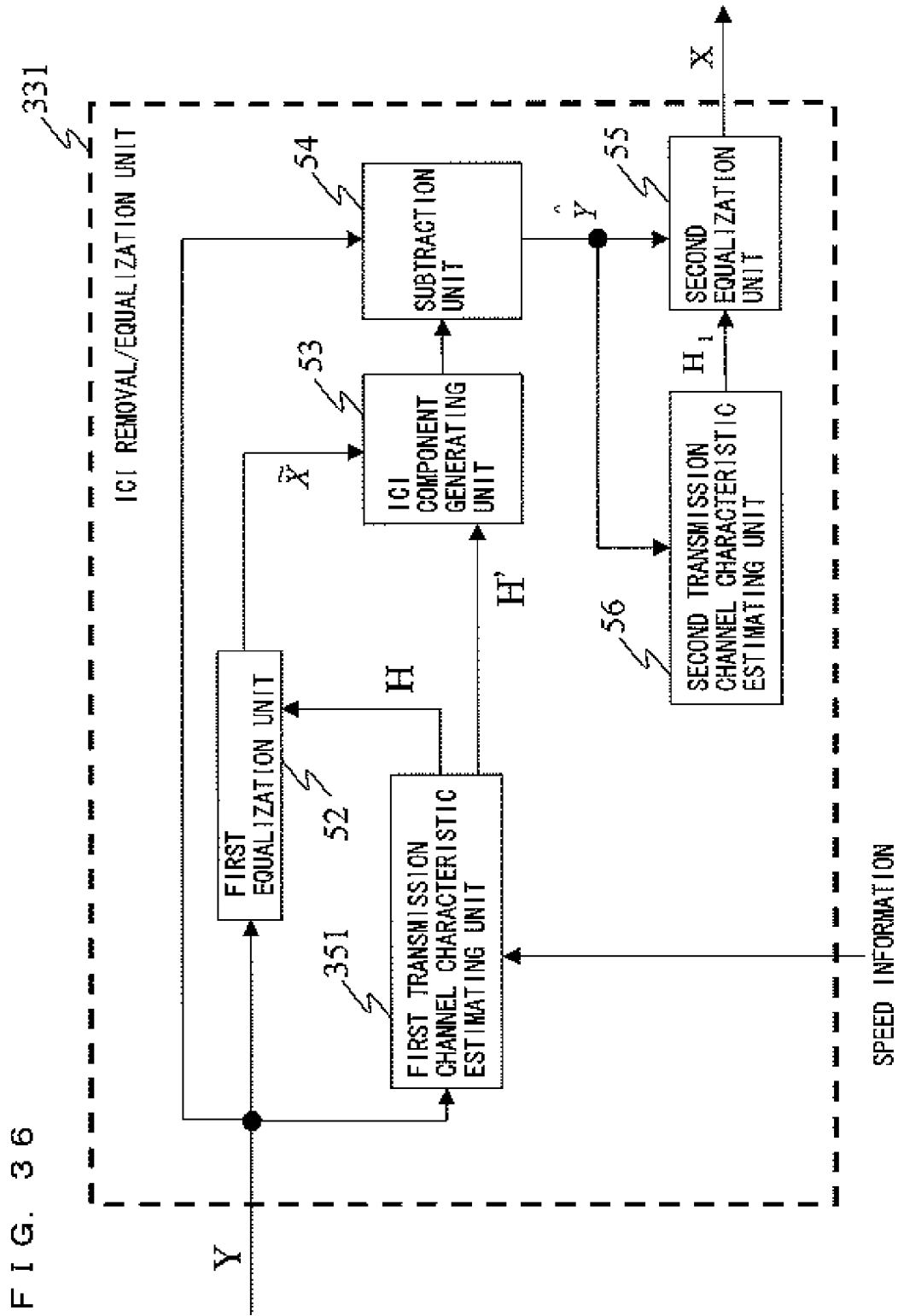
FIG. 36 is a block diagram showing an exemplary configuration of an ICI removal/equalization unit 331.
Figure 37:
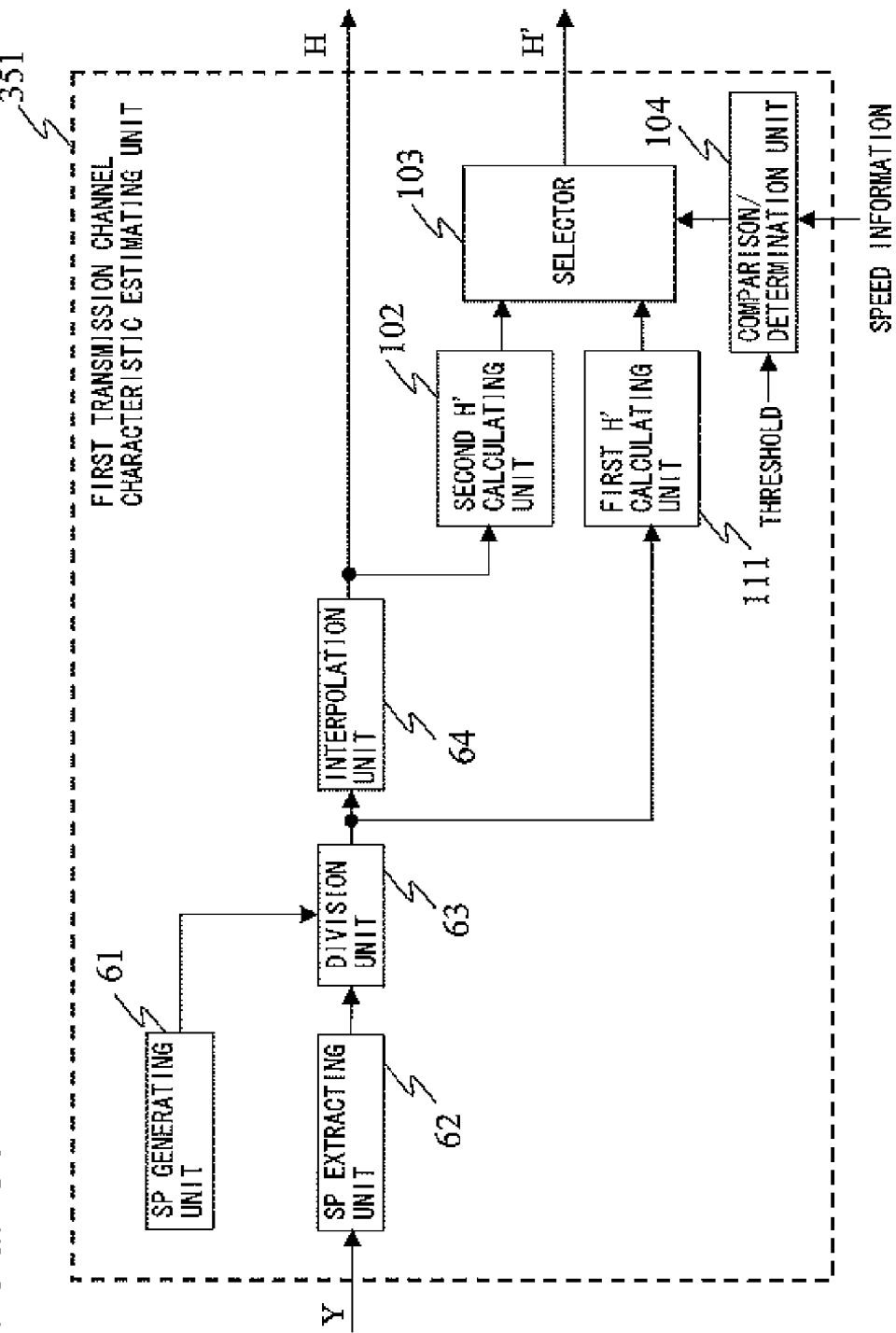
FIG. 37 is a block diagram showing an exemplary configuration of a first transmission channel characteristic estimating unit 351.

FIG. 34 is a block diagram showing an exemplary configuration of an OFDM reception apparatus 400 according to a fourth embodiment. The OFDM reception apparatus 400 of the fourth embodiment has the same configuration as that of the OFDM reception apparatus 300 of the third embodiment (see FIG. 27), except that the demodulation unit 13 is replaced with a demodulation unit 14. FIG. 35 is a block diagram showing an exemplary configuration of the demodulation unit 14. The demodulation unit 14 has the same configuration as that of the demodulation unit 13 of the third embodiment (see FIG. 28), except that the ICI removal/equalization unit 231 is replaced with an ICI removal/equalization unit 331. FIG. 36 is a block diagram showing an exemplary configuration of the ICI removal/equalization unit 331. The ICI removal/equalization unit 331 has the same configuration as that of the ICI removal/equalization unit 231 of the third embodiment (see FIG. 29), except that the first transmission channel characteristic estimating unit 251 is replaced with a first transmission channel characteristic estimating unit 351. FIG. 37 is a block diagram showing an exemplary configuration of the first transmission channel characteristic estimating unit 351. The first transmission channel characteristic estimating unit 351 has the same configuration as that of the first transmission channel characteristic estimating unit 251 of the third embodiment (see FIG. 30), except that the first H(calculating unit 101 is replaced with a first H' calculating unit 111, and an output signal of the division unit 63 is input to the first H' calculating unit 111. Note that, as described in the first embodiment, the interpolation unit 64 may be replaced with the interpolation unit 67 (see FIG. 9). Also, in FIGS. 34 to 37, parts similar to those of FIGS. 27 to 30 are indicated by similar reference numerals and will not be described.

Figure 38:
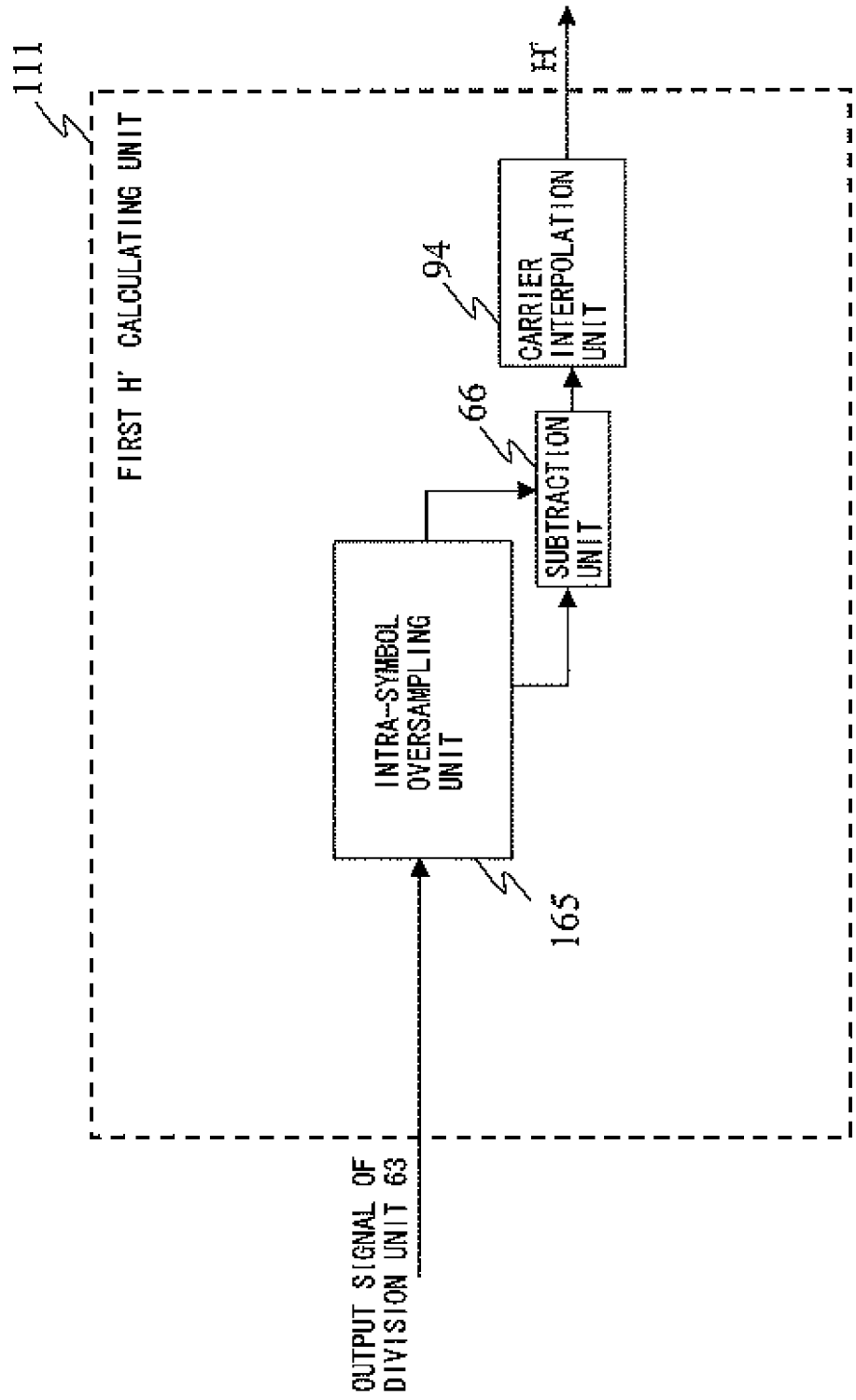
FIG. 38 is a block diagram showing an exemplary configuration of a first H' calculating unit 111.

As shown in FIG. 37, the first H' calculating unit 111 receives transmission channel characteristic values at SP signal positions from the division unit 63 and performs an oversampling process or the like, to calculate and output the first differentiations H' of transmission channel characteristic values H at the SP signal positions a rid data signal positions to the selector 103. FIG. 38 is a block diagram showing an exemplary configuration of the first H' calculating unit 111. As shown in FIG. 38, the first H' calculation unit 111 includes an intra-symbol oversampling unit 165, a subtraction unit 66, and a carrier interpolation unit 94. Note that the intra-symbol oversampling unit 165, the subtraction unit 66 and the carrier interpolation unit 94 included in the first H' calculating unit 111 are similar to the intra-symbol oversampling unit 165, the subtraction unit 66 and the carrier interpolation unit 94 included in the first transmission channel characteristic estimating unit 151 of the second embodiment of FIG. 24, respectively, and also perform similar operations.

A selector 103 outputs one of H' obtained by the oversampling process calculated by the first H' calculating unit 111 and H' obtained by the two-symbol interval difference operation calculated by the second H' calculating unit 102, to the ICI component generating unit 53 (see FIG. 36), depending on the result of determination by the comparison/determination unit 104, as described in the third embodiment.

With the configuration described above, the OFDM reception apparatus 400 of the fourth embodiment can switch the methods of calculating the first differentiations H' of the transmission channel characteristic values H, depending moving speed, as with the OFDM reception apparatus 300 of the third embodiment. Thereby, the OFDM reception apparatus 400 of the fourth embodiment can suppress an influence of noise during low speed movement while obtaining an effect similar to that of the OFDM reception apparatus 100 of the first embodiment. Also, in the OFDM reception apparatus 400 of the fourth embodiment, as in the OFDM reception apparatus 200 of the second embodiment, when the interpolation unit 67 is used instead of the interpolation unit 64 in the first transmission channel characteristic estimating unit 351 (see FIG. 10), the symbol interpolation unit 92 and the intra-symbol oversampling unit 165 (see FIG. 38) can share a common symbol delay memory for use in the filtering process in the symbol direction.

Note that, also in the fourth embodiment, as in the first embodiment, the oversampling into is not limited to ¼ of the one-symbol interval. For example, as shown in FIG. 16, oversampling may be performed at intervals each of which is 1/K of the one-symbol interval (Ts). In this case, the first differentiation H' [p] of the transmission channel characteristic value H[p] is calculated by using Expression 6.

Also, as described in the first embodiment with reference to FIG. 17, in the third embodiment, the intro-symbol over sampling unit 65 and the subtraction unit 66 (see FIG. 31) may be integrated, or in the fourth embodiment, the intra-symbol oversampling unit 165 and the subtraction unit 66 (see FIG. 38) may be integrated, into an intra-symbol oversampling/subtraction unit.

Also, in the third and fourth embodiments, as in the first embodiment, derivative approximation of calculating the first differentiations H' of the transmission channel characteristic values H is not limited to the use of a difference between transmission channel characteristic values at two points. For example, a derivative approximation process employing transmission channel characteristic values at four points may be performed as shown in Expression 7. Alternatively, a derivative approximation or employing transmission channel characteristic values at four or more points may be performed. Also in this case, the oversampling process and the difference operation process may be performed simultaneously.

Also, the configuration of the ICI removal/equalization unit of the fourth embodiment is not limited to the ICI removal/equalization unit 331 of FIG. 36. For example, the ICI removal/equalization unit of the fourth embodiment may have the same configuration as that of the ICI removal/equalization unit 32, 33 or 34 of the first embodiment of FIGS. 18 to 20, except that the first transmission channel characteristic estimating unit 51 is replaced with the first transmission channel characteristic estimating unit 351 (see FIG. 37 and FIG. 39 described below).

Figure 39:
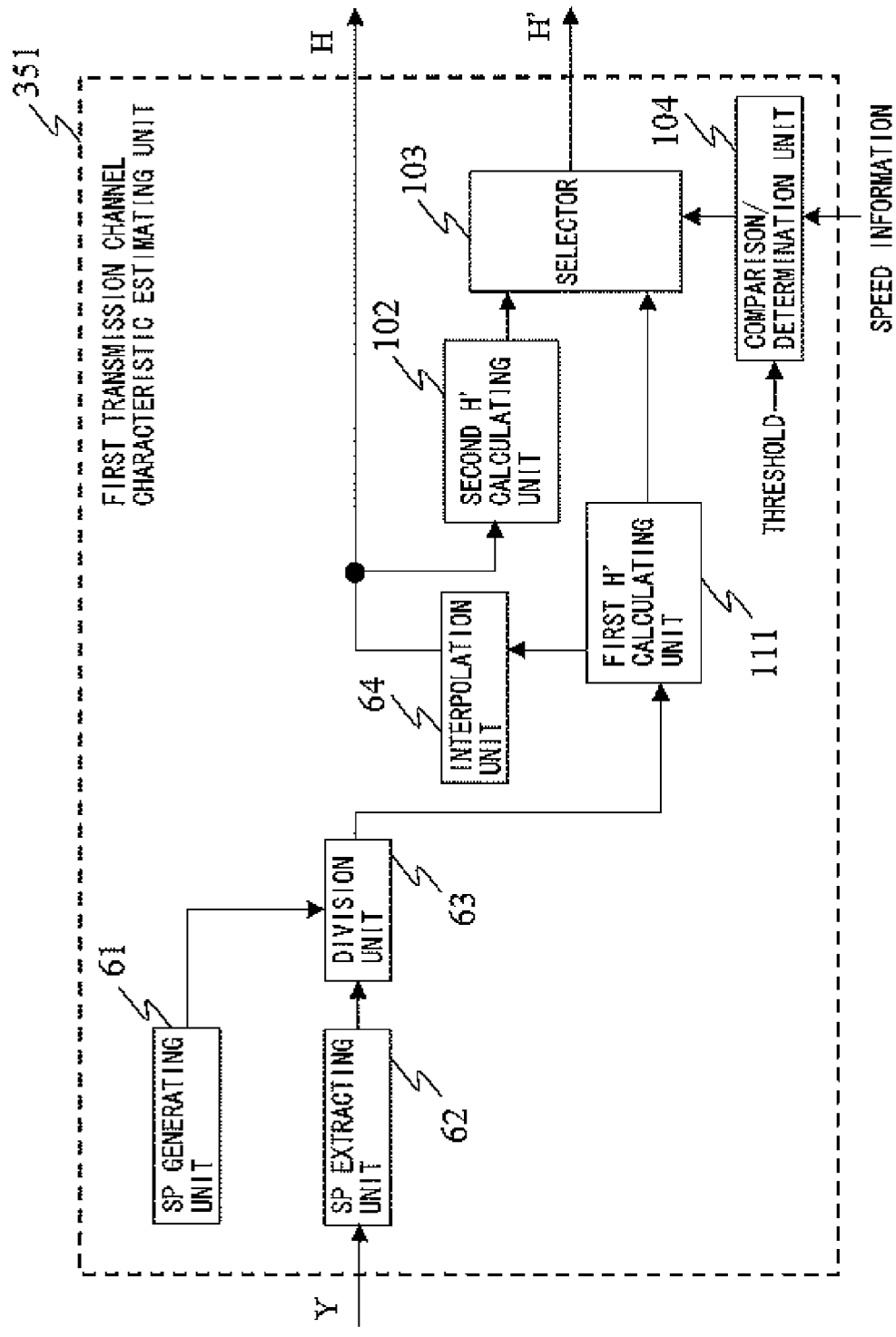
FIG. 39 is a block diagram showing another exemplary configuration of the ICI removal/equalization unit 331.

Also, as shown in FIG. 39, the interpolation unit 64 (see FIG. 7) may not receive an output signal of the division unit 63, and may receive the transmission channel characteristic values at the signal positions included in the signal sequences indicated by the open arrows in FIG. 6, from the intra-symbol oversampling unit 165 (see FIG. 38). In this case, the interpolation unit 64 uses the input transmission channel characteristic values to perform an interpolation process in the carrier direction, thereby calculating the transmission channel characteristic values H at all the signal positions. With such a configuration, the first transmission channel characteristic estimating unit 351 shown in FIG. 39 can calculate the transmission channel characteristic values H with high accuracy without comprising the interpolation unit 67 including the symbol interpolation unit 92 and the carrier interpolations unit 93-1 (see FIG. 9).

Figure 33:
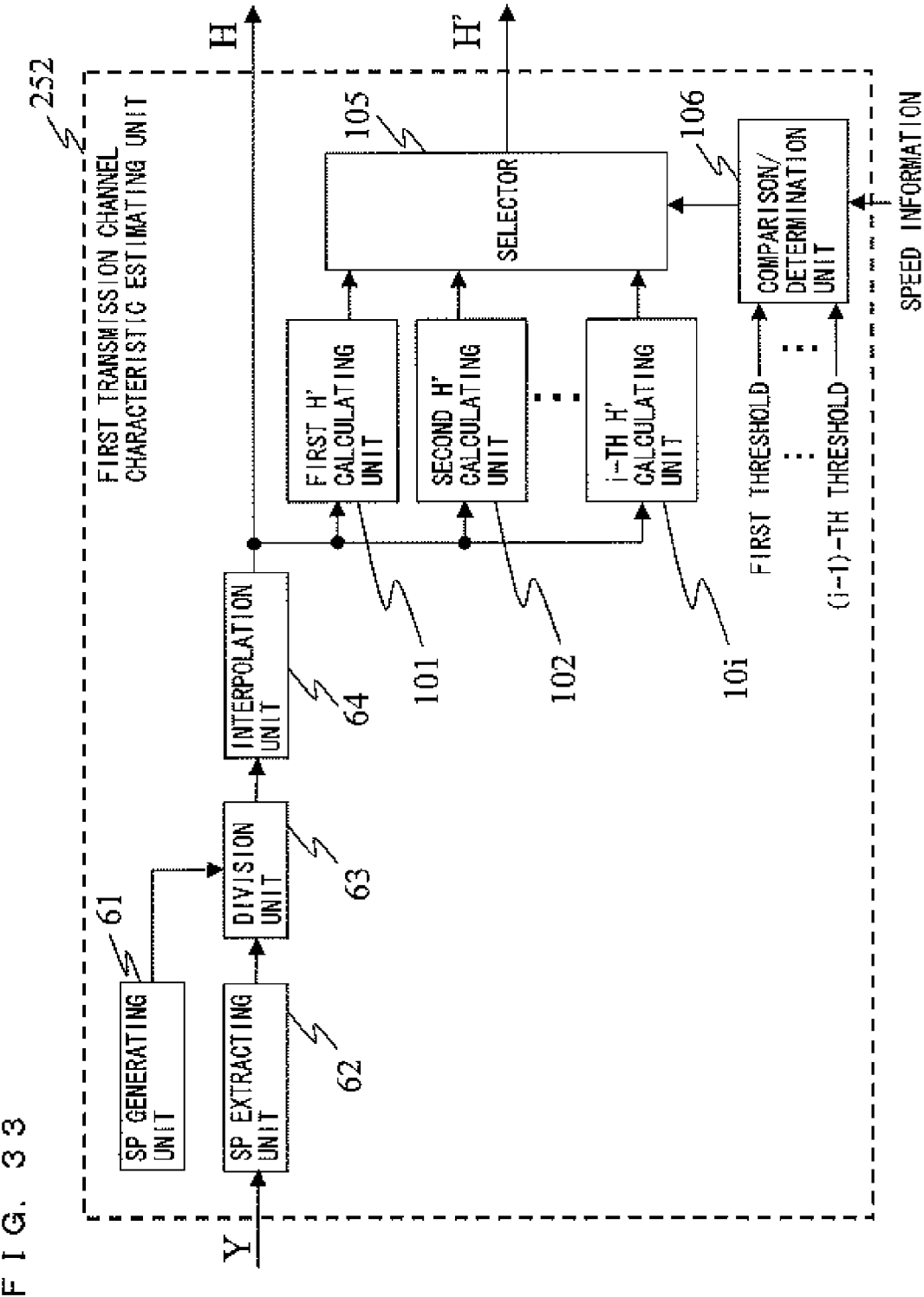
FIG. 33 is a diagram showing a block diagram showing an exemplary configuration of a first transmission channel characteristic estimating unit 252.

Also in the fourth embodiment, as is similar to the configurations of the third embodiment of FIG. 33, three or more H' operating units may be used to generate three or more kinds of H', and a selector may switch and output the three or more kinds of H', depending on the result of determination by the comparison/determination unit.

Also, in the fourth embodiment, a single H' calculating unit for switching differentiation intervals (2Ts, Ts/2, Ts/4, etc. for calculating H', depending on the result of determination by the comparison/determination unit, may be provided so as an calculate a plurality of kinds of H'. In this case, the H' calculating unit does not receive an output signal of the interpolation unit 64, and receives only an output signal of the division unit 63. In this case the selector 103 can be removed.

Also, in the third, and fourth embodiments, the speed information to the comparison/determination units 104 and 106 may be information indicating the moving speed of a mobile object, e.g., speed information obtained from a vehicle-speed pulse signal, a Global Positioning System (GPS) or the like. Also, in the third and fourth embodiments, the OFDM reception apparatuses 300 and 400 may measure the width of Doppler frequency spread using a received signal, and may use the spread width to calculate speed information. In this case, the speed information indicates net only an ICI component that is generated due to movement of a reception apparatus, but also an ICI component that is generated due to movement of a transmission apparatus, movement of a reflective object existing in a transmission channel, or the like.

Also, in the third and fourth embodiments, based on the speed information, a plurality of kinds of are calculated using a plurality of methods and an appropriate HT is selected, thereby performing an ICI component removal and equalization process. Alternatively, a configuration for performing an ICI component removal and equalization process may be provided for each of the plurality of kinds of H', and the configurations may be provided in parallel, and after the ICI component removal and equalization processes, an optimal signal may be selected from the resultant signals.

Also, in Document 1, a transmission channel characteristic value is represented by a Taylor series, and is approximated by truncating the Taylor series the first-differentiation term (Expression 10 of Document 1). Also in the first to fourth embodiments, it has been described that a transmission channel characteristic value is similarly approximated by truncating a Taylor series at the first-differentiation term. Alternatively, a transmission channel characteristic may be estimated by approximation using the second-differentiation term, the third-differentiation term, or higher-order differentiation terms in a Taylor series. In this case, even when not only the first-differentiation term, but also any order (second and higher orders) differentiation term are calculated, transmission channel characteristic values H oversampled at intervals each of which is smaller than the one-symbol interval may be applied. Moreover, when all order differentiation terms are calculated, transmission channel characteristic values H oversampled at intervals each of which is smaller than the one-symbol interval may be applied.

Fifth Embodiment

As is different from the first to fourth embodiments, a fifth embodiment particularly has a feature that the signal $Y^\char`\^$ excluding an ICI component is fed back to the transmission channel characteristic estimating unit for calculating transmission channel characteristic values H and the first differentiations H' of the transmission channel characteristic values H, thereby improving the accuracy of the ICI component. Hereinafter, the fifth embodiment will be described.

Figure 40:
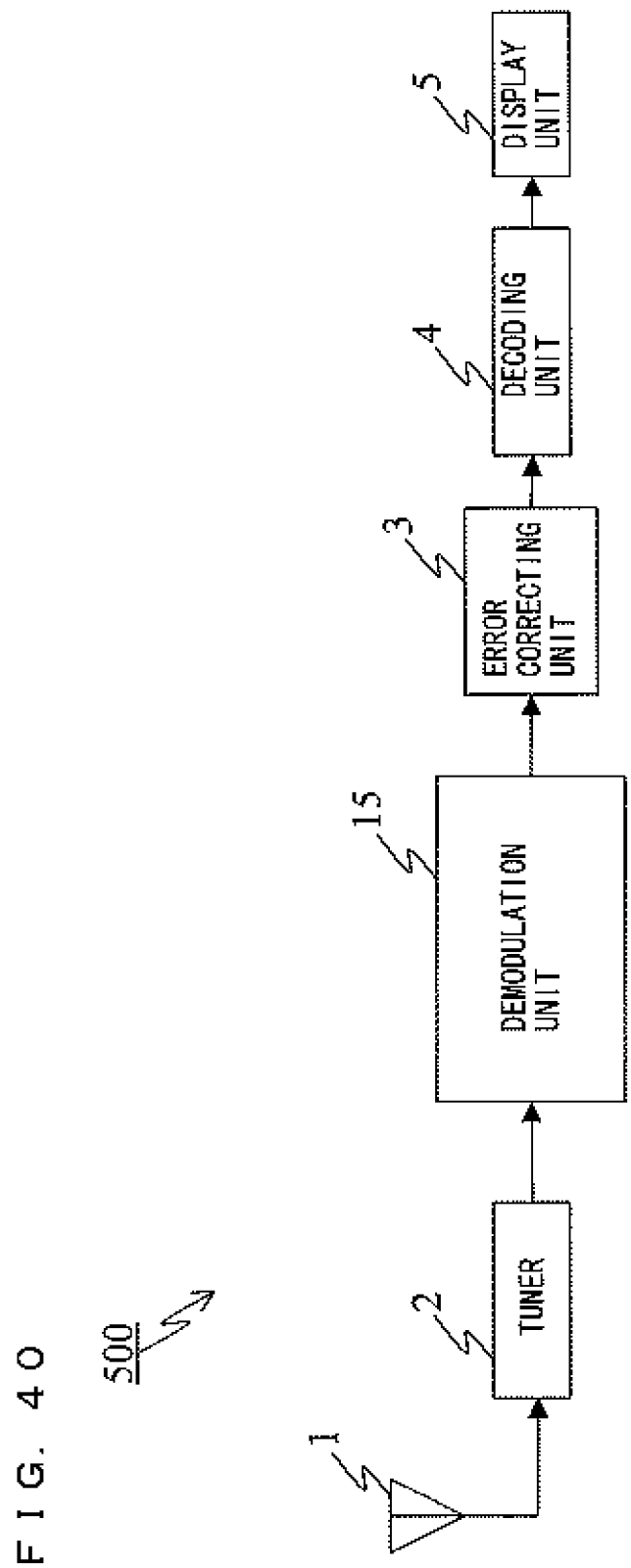
FIG. 40 is a block diagram showing an exemplary configuration of an OFDM reception apparatus 500 according to a fifth embodiment.
Figure 41:
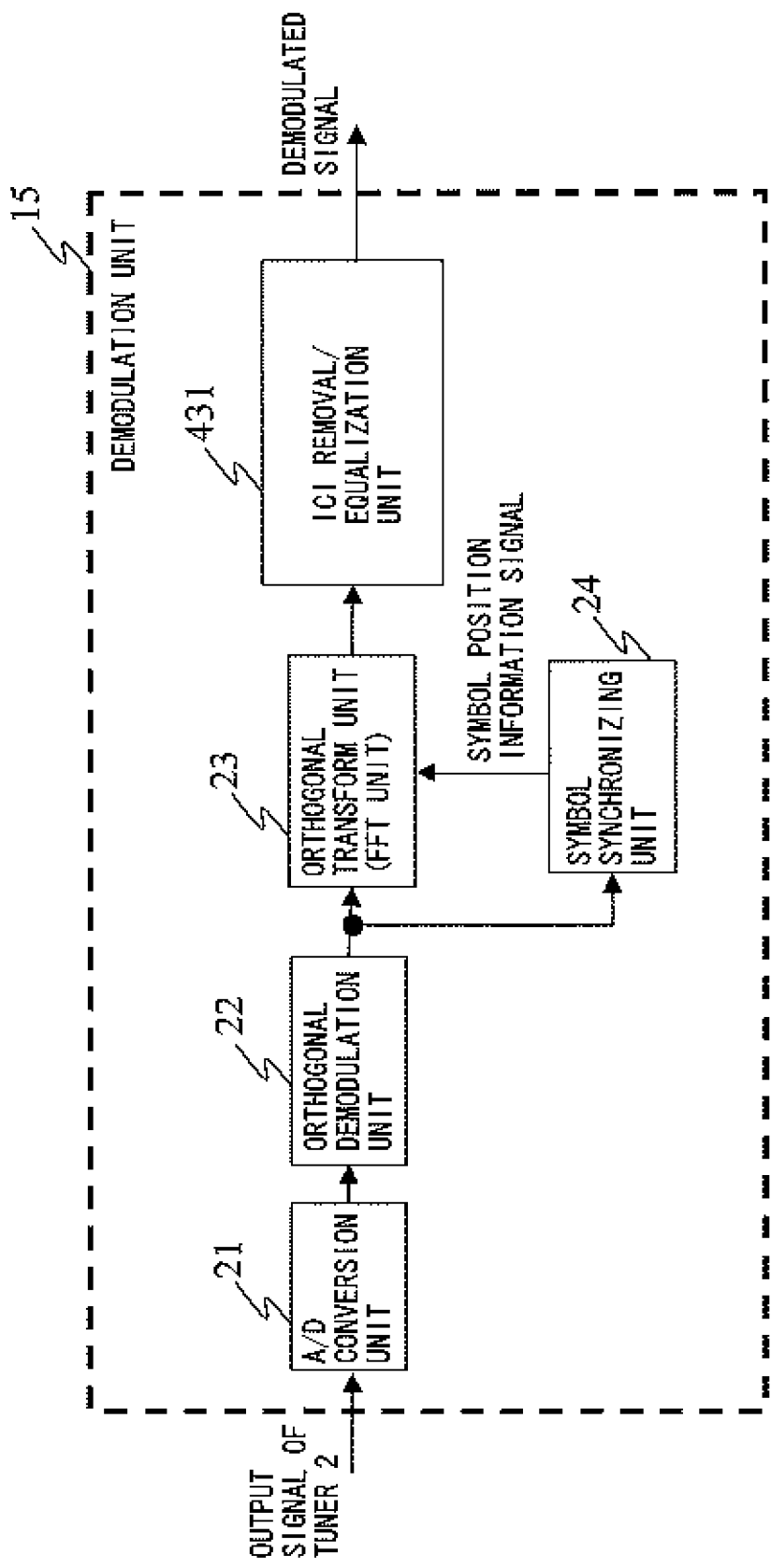
FIG. 41 is a block diagram showing an exemplary configuration of a demodulation unit 15.
Figure 43:
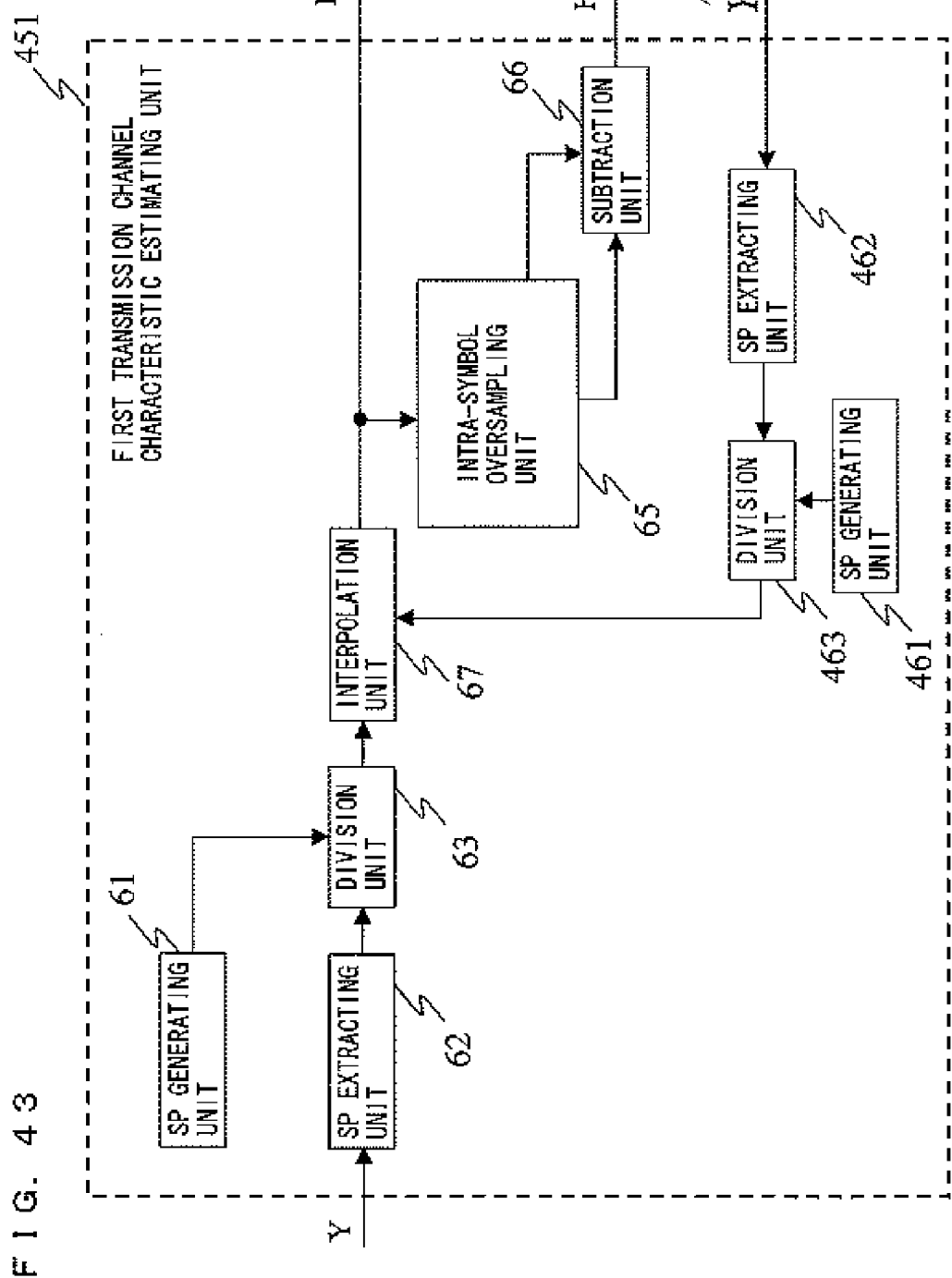
FIG. 43 is a block diagram showing an exemplary configuration of a transmission channel characteristic estimating unit 451.

FIG. 40 is a block diagram showing an exemplary configuration of an OFDM reception apparatus 500 according to the fifth embodiment. The OFDM reception apparatus 500 of the fifth embodiment has the same configuration as that of the OFDM reception apparatus 100 of the first embodiment (see FIG. 1), except that the demodulation unit 11 is replaced with a demodulation unit 15. FIG. 41 is a block diagram showing an exemplary configuration of the demodulation unit 15. The demodulation unit 15 has the same configuration as that of the demodulation unit 11 of the first embodiment (see FIG. 2), except that the ICI removal/equalization unit 31 is replaced with an ICI removal/equalization unit 431. FIG. 42 is a block diagram showing en exemplary configuration of the ICI removal/equalization unit 431. The ICI removal/equalization unit 431 has the same configuration as that of the ICI removal/equalization unit 32 of the first embodiment of FIG. 18, except that the first transmission channel characteristic estimating unit 51 is replaced with a transmission channel characteristic estimating unit 451, and an output signal (a signal $Y^\char`\^$ excluding an ICI component) of the subtraction unit 54 is fed back to the transmission channel characteristic estimating unit 451. FIG. 43 is a block diagram showing an exemplary configuration of the transmission channel characteristic as unit 451. The transmission channel characteristic estimating unit 451 has the same configuration as that of the first transmission channel characteristic estimating unit 51 of the first embodiment (see. FIG. 5), except that the interpolation unit 64 (see FIG. 7) is replaced with the interpolation unit 67 (see FIG. 9), and a division unit 463, an SP extracting unit 462 and an SP generating unit 461 are added. Note that, in FIGS. 40 to 43, parts similar to those of FIGS. 1, 2, 18 and 5 are indicated by similar reference numerals and will not be described.

Figure 44:
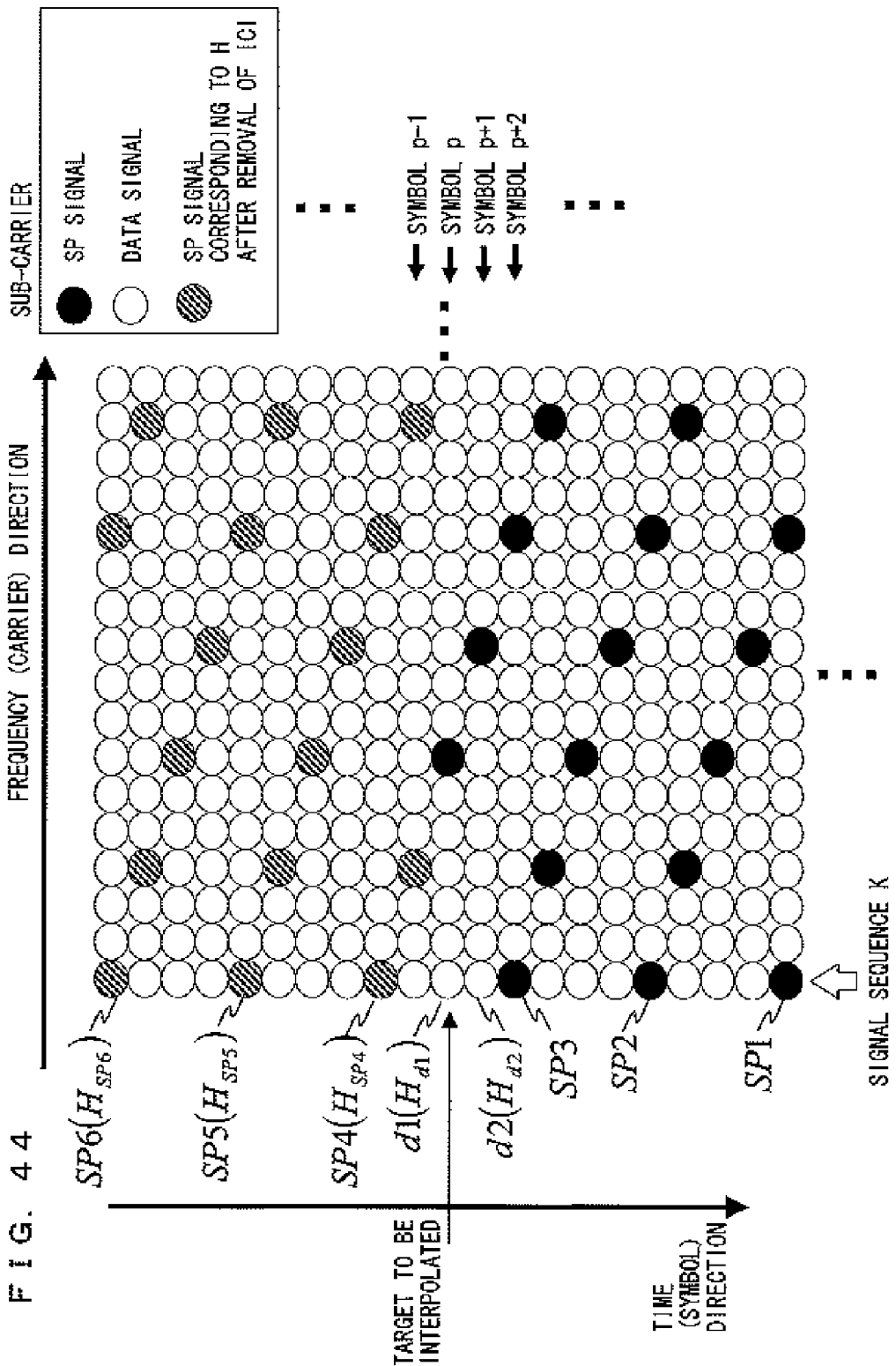
FIG. 44 is a diagram for describing an interpolation process performed by an interpolation unit 67 included in the transmission channel characteristic estimating unit 451.
Figure 45:
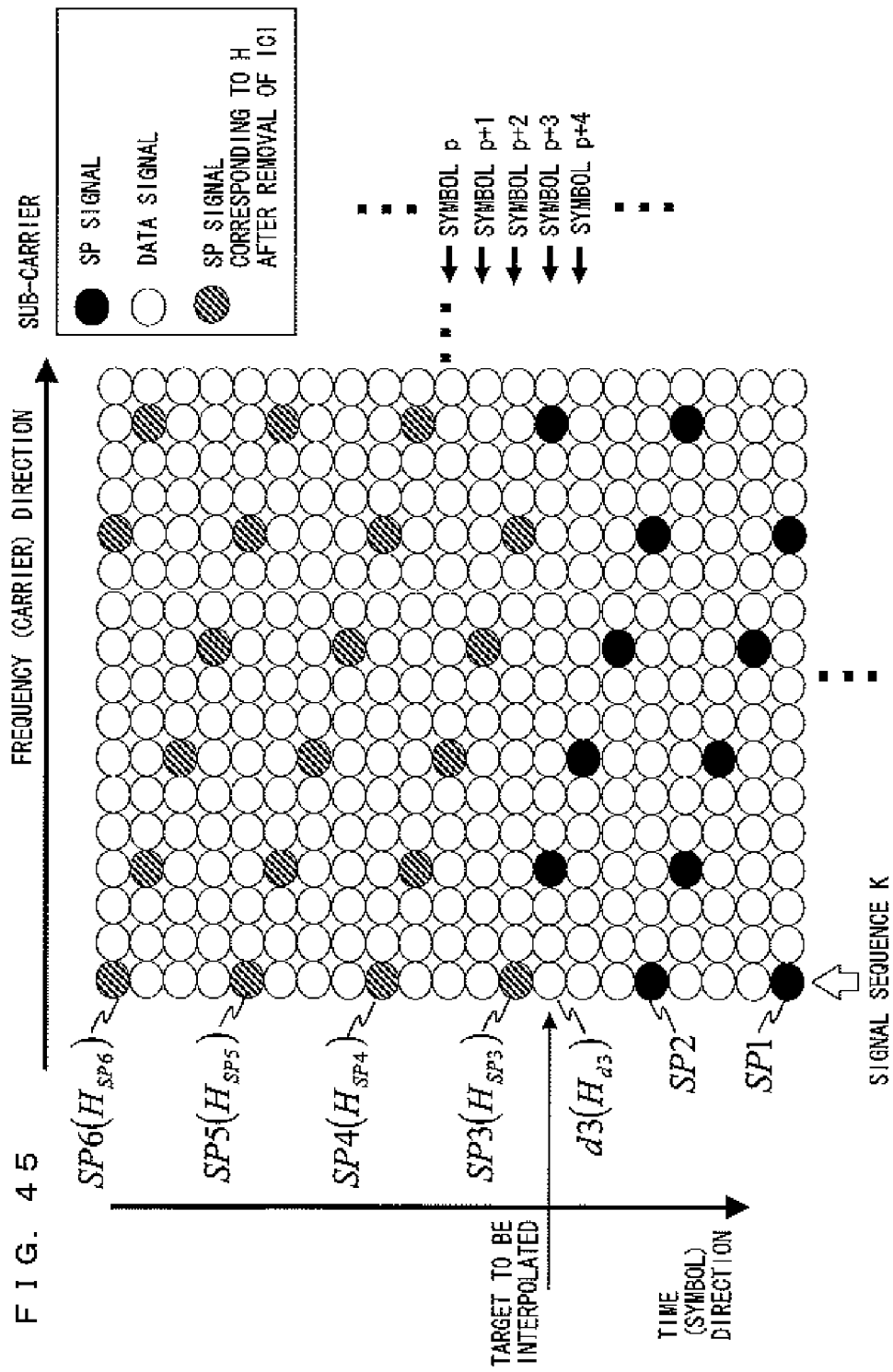
FIG. 45 is a diagram for describing the interpolation process per by the interpolation unit 67 included in the transmission channel characteristic estimating unit 451.

FIGS. 44 and 45 are diagrams for describing an interpolation process performed by the interpolation unit 67 included in the transmission channel characteristic estimating unit 451. In FIGS. 44 and 45, closed circles indicate SP signals, open circles indicate data signals, end hatched circles indicate SP signals corresponding to transmission channel characteristic values after removal of an ICI component. Also, SP1 to SP6 indicate SP signals. Also, to $H_{SP3}$ to $H_{SP6}$ indicate transmission channel characteristic values at the positions of SP3 to SP6 after removal of an ICI component. Hereinafter, an exemplary interpolation process of performing interpolation in the symbol direction and the carrier direction described with respect to FIG. 10, will be described with reference to FIGS. 42 to 45.

As shown in FIG. 42, the signal $Y^\char`\^$ after removal of the ICI component output from the subtraction unit 54 is input to the second equalization unit 55 and the transmission channel characteristic estimating unit 451. As shown in FIG. 43, in the transmission channel characteristic estimating unit 451, the SP extracting unit 462 receives the signal $Y^\char`\^$ after removal of the ICI component and extracts SP signals from the signal $Y^\char`\^$. Here, the SP signals extracted from the ICI component-removed signal $Y^\char`\^$ do con include the ICI component, and are hereinafter referred to as ICI-removed SP signals. The SP generating unit 461 generates SP signals, as with the SP generating unit 61. The division unit 463 divides the ICI-removed SP signals by the SP signals generated by the SP generating unit 461 to calculate transmission channel characteristic values at the positions of the ICI-removed SP signals. The interpolation unit 67 replaces a portion of the transmission channel characteristic values at the SP signal positions input from the division unit 63 with the transmission channel characteristic values at the ICI-removed SP signal positions, before performing an interpolation process with respect to the transmission channel characteristic values H of all signal positions.

Hereinafter, the interpolation process of the interpolation unit 67 comprising the symbol interpolation unit 92 and the carrier interpolation unit 93-1 (see FIG. 9) will be described in detail, illustrating a signal sequence K arranged in the symbol direction indicated by an open arrow in FIGS. 44 and 45. Initially, in FIG. 44, a case where a transmission channel characteristic value $H_{d1}$ at the position of a data signal d1 belonging to a symbol p (p is an integer) of the signals included in the signal sequence K is to be interpolated, will be considered. Here, SP signals that have been input from the division unit 63 to the interpolation unit 67 before the data signal d1 corresponding to the transmission channel characteristic value $H_{d1}$ to be interpolated, are SP4 to SP6. Transmission channel characteristic values at the positions of SP4 to SP6 that were input in the past have already been replaced with the ICI component-removed transmission channel characteristic values $H_{SP4}$ to $H_{SP6}$, respectively, by the symbol interpolation unit 92. The symbol interpolation unit 92 uses the transmission channel characteristic values to $H_{SP4}$ to $H_{SP6}$ at the SP4 to SP6 positions after removal, of the ICI component, and transmission channel characteristic values before removal of the ICI component at the SP1 to SP3 positions, to perform an interpolation process in the symbol direction. Thereby, the symbol interpolation unit 92 calculates the transmission channel characteristic value $H_{d1}$ to be interpolated. Note that, for the sake of convenience, the symbol interpolation unit 92 uses six transmission channel characteristic values to perform an interpolation process. However, the number of transmission channel characteristic values used in an interpolation process by the symbol interpolation unit 92 is not limited to this. Next, similarly, a transmission channel characteristic value $H_{d2}$ at the position of a data signal d2 is calculated.

Next, a case where a transmission channel characteristic value $H_{d3}$ at the position of a data signal d3 is to be interpolated, will be described with reference to FIG. 45. As shown in FIG. 45, the symbol interpolation unit 92 replaces a transmission channel characteristic value at the position of SP3 that has been input from the division unit 63 to the interpolation unit 67 before the data signal d3 corresponding to the transmission channel characteristic value $H_{d3}$ to be interpolated, with the ICI component-removed transmission channel characteristic value $H_{SP3}$. Thereafter, the symbol interpolation unit 92 similarly uses the transmission channel characteristic value $N_{SP3}$ and the like after removal of the ICI component and transmission channel characteristic values before removal of the ICI component, to perform an interpolation process in the symbol direction. Thereby, the symbol interpolation unit 92 calculates the transmission channel characteristic value $H_{d3}$ to be interpolated.

By repeatedly performing the process described above, the symbol interpolation unit 92 calculates all transmission, channel characteristic values for the signal sequence K. Also, similarly, the symbol interpolation unit 92 performs an interpolation process in the symbol direction with respect to all signal sequences including SP signals that are signal sequences arranged in the symbol direction. Thereafter, the carrier interpolation unit 93-1 performs an interpolation process in the carrier direction to calculate transmission channel characteristic values H at all signal positions.

As described above, the OFDM reception apparatus 500 of the fifth embodiment extracts transmission channel characteristic values at SP signal positions of the ICI component-removed signal Y˜, and replaces a portion of the transmission channel characteristic values at the SP signal positions used for calculation of an ICI component with the extracted transmission channel characteristic values. Thereby, the transmission channel characteristic estimating unit 451 included in the OFDM reception apparatus 500 of the fifth embodiment can calculate transmission channel characteristic values H and the first differentiation H' of the transmission channel characteristic values H with higher accuracy than that of the first transmission channel characteristic estimating unit 51 included in the OFDM reception apparatus 100 of the first embodiment (see FIG. 5). As a result, the OFDM reception apparatus 500 can calculate an ICI component with higher accuracy than that of the OFDM reception apparatus comprising the removal/equalization unit 32 (see FIG. 18), thereby making it possible to remove the ICI component with higher accuracy. In addition, in the OFDM reception apparatus 500, the second equalization unit 55 performs an equalization process using highly accurate transmission channel characteristic values H, so that the equalization process can be performed with higher accuracy than that of the OFDM reception apparatus 100 comprising the ICI removal/equalization unit 32. As a result, the OFDM reception apparatus 500 can achieve a higher level of mobile reception performance than that of the OFDM reception apparatus 100 comprising the ICI removal/equalization unit 32.

Note that it has been assumed in the fifth embodiment that a delay in the ICI component removing process is an ideal delay. Alternatively, for example, a case where a process delay is three symbols re when the interpolation unit 67 performs interpolation, ICI components are removed, and the interpolation unit 67 replaces the transmission channel characteristic values at the SP signal positions of the signal Y˜ after removal of ICI components (feedback process), will be described (see FIG. 42). In this case, when an interpolation process is performed with respect to the transmission channel characteristic value $H_{d1}$ at the position of the data d1 of FIG. 44, the transmission channel characteristic value at the SP4 position cannot be replaced with the ICI component-removed transmission channel characteristic value $H_{SP4}$. Therefore, in this case, the symbol interpolation unit 92 uses the transmission channel characteristic values $H_{SP5}$ and $H_{SP6}$ at the SP5 and SP6 positions after removal of components, and the transmission channel characteristic values at the SP1 to SP4 positions before removal of ICI components, to perform an interpolation process in the symbol direction. In this manner, the symbol interpolation unit 92 replaces transmission channel characteristic values that can be replaced, depending on a delay required for a feedback process, before performing an interpolation process. Here, as has already been described, the number of transmission channel characteristic values for use in an interpolation process by the symbol interpolation unit 92 is not limited to this.

Also in the fifth embodiment, as in the first embodiment, the oversampling interval is not limited to ¼ of the one-symbol interval. For example, as shown in FIG. 16, oversampling may be performed at intervals each of which is 1/K of the one-symbol interval (Ts). In this case, the first differentiation H' [p] of the transmission channel characteristic value H[p] is calculated by using Expression 6.

Also, as described in the first embodiment with reference to FIG. 17, the intra-symbol oversampling unit 65 and the subtraction unit 66 may be integrated into an intra-symbol oversampling/subtraction unit 68.

Figure 46:
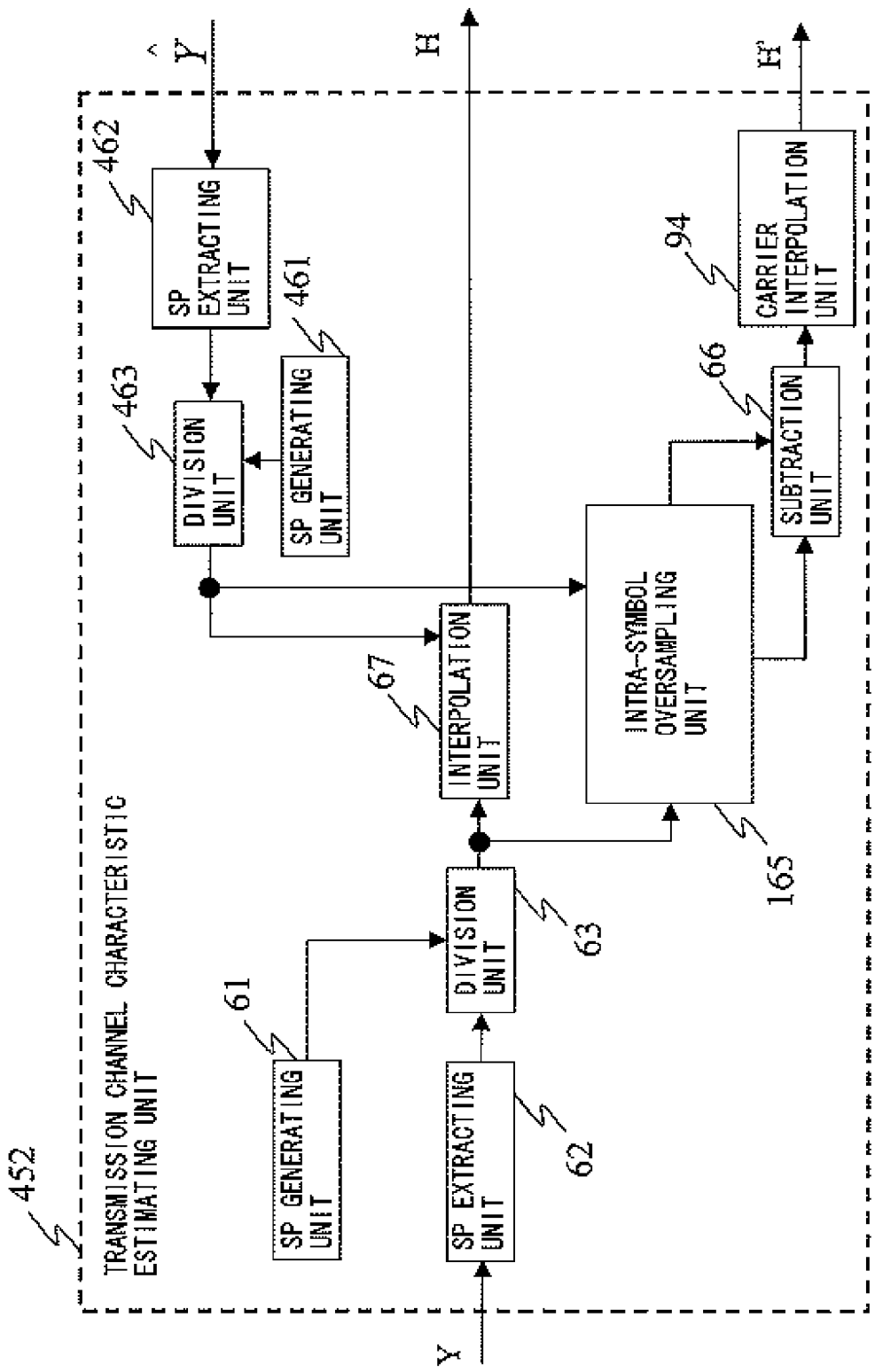
FIG. 46 is a block diagram showing an exemplary configuration of a transmission channel characteristic estimating unit 452.

Also, in the OFDM reception apparatus 500 of the fifth embodiment, a transmission channel characteristic estimating unit 452 shown in FIG. 46 may be provided instead of the transmission channel characteristic estimating unit 451 of FIG. 43. As shown in FIG. 46, the transmission channel characteristic estimating unit 452 has the same configuration as that of the transmission channel characteristic estimating unit 451, except that the intra-symbol oversampling unit 65 and the subtraction unit 66 are removed, and the intra-symbol oversampling unit, the subtraction unit 66 and the carrier interpolation unit 94 included in the first transmission channel characteristic estimating unit 151 described in the second embodiment (see FIG. 24) are added. As described in the second embodiment, the intra-symbol oversampling unit 165 receives an output signal of the division unit 63 and then performs an oversampling process. In this oversampling process, the intra-symbol oversampling unit 165 receives, from the division unit 463, transmission channel characteristic values calculated from SP signals after removal of the ICI component. Thereafter, as described above with reference to FIGS. 44 and 45, the intra-symbol oversampling unit 165 replaces a portion of the transmission channel characteristic values at the SP signal positions with the transmission channel characteristic values input from the division unit 463, before performing an oversampling process.

Figure 47:
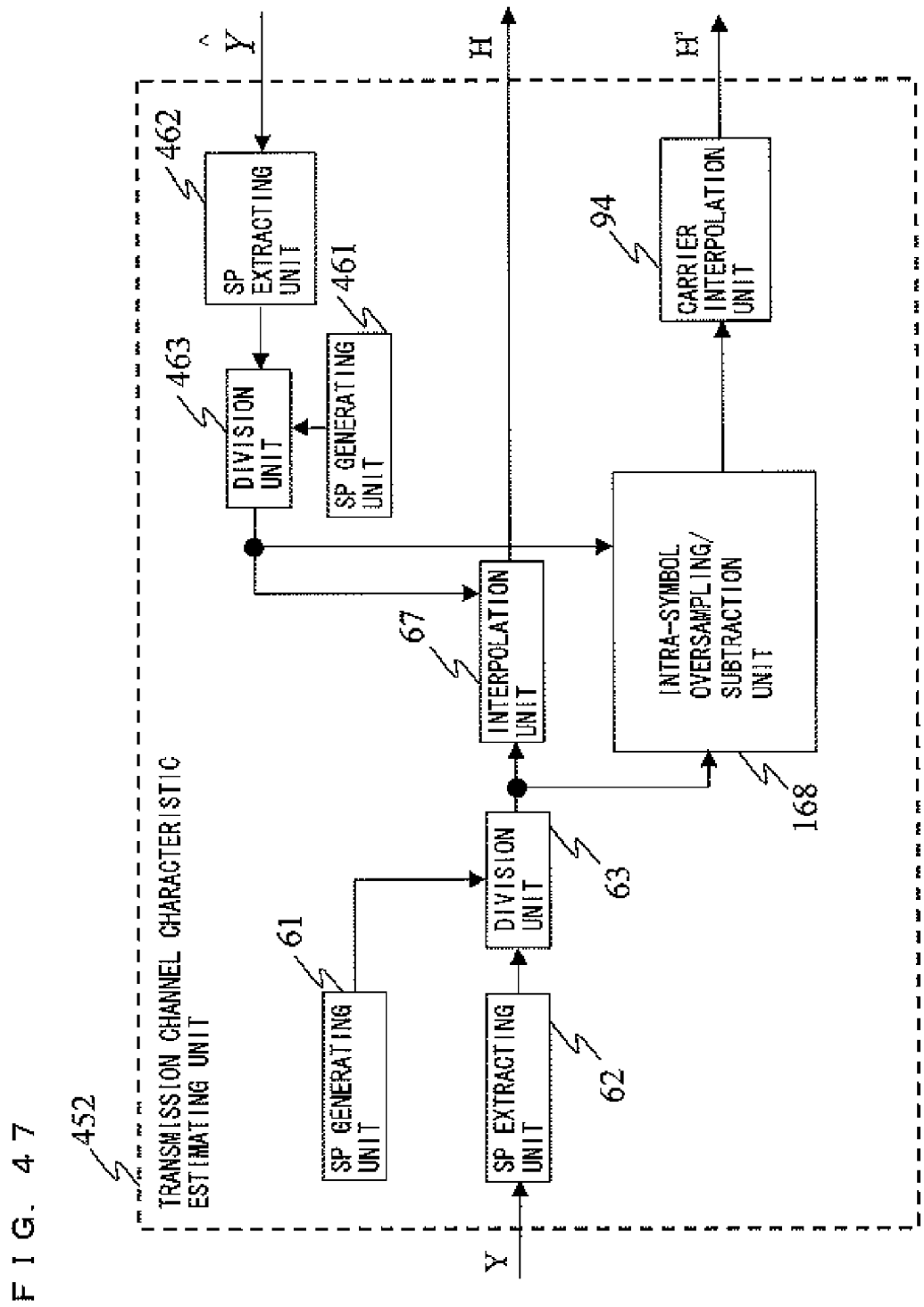
FIG. 47 is a block diagram showing another exemplary configuration of the transmission channel characteristic estimating unit 452.

Also, as described in the first embodiment with reference to FIG. 17, the intra-symbol oversampling unit 165 and the subtraction unit 66 included in the transmission channel characteristic estimating unit 452 of FIG. 46 may be integrated into an intra-symbol oversampling/subtraction unit 168 (see FIG. 47).

Figure 48:
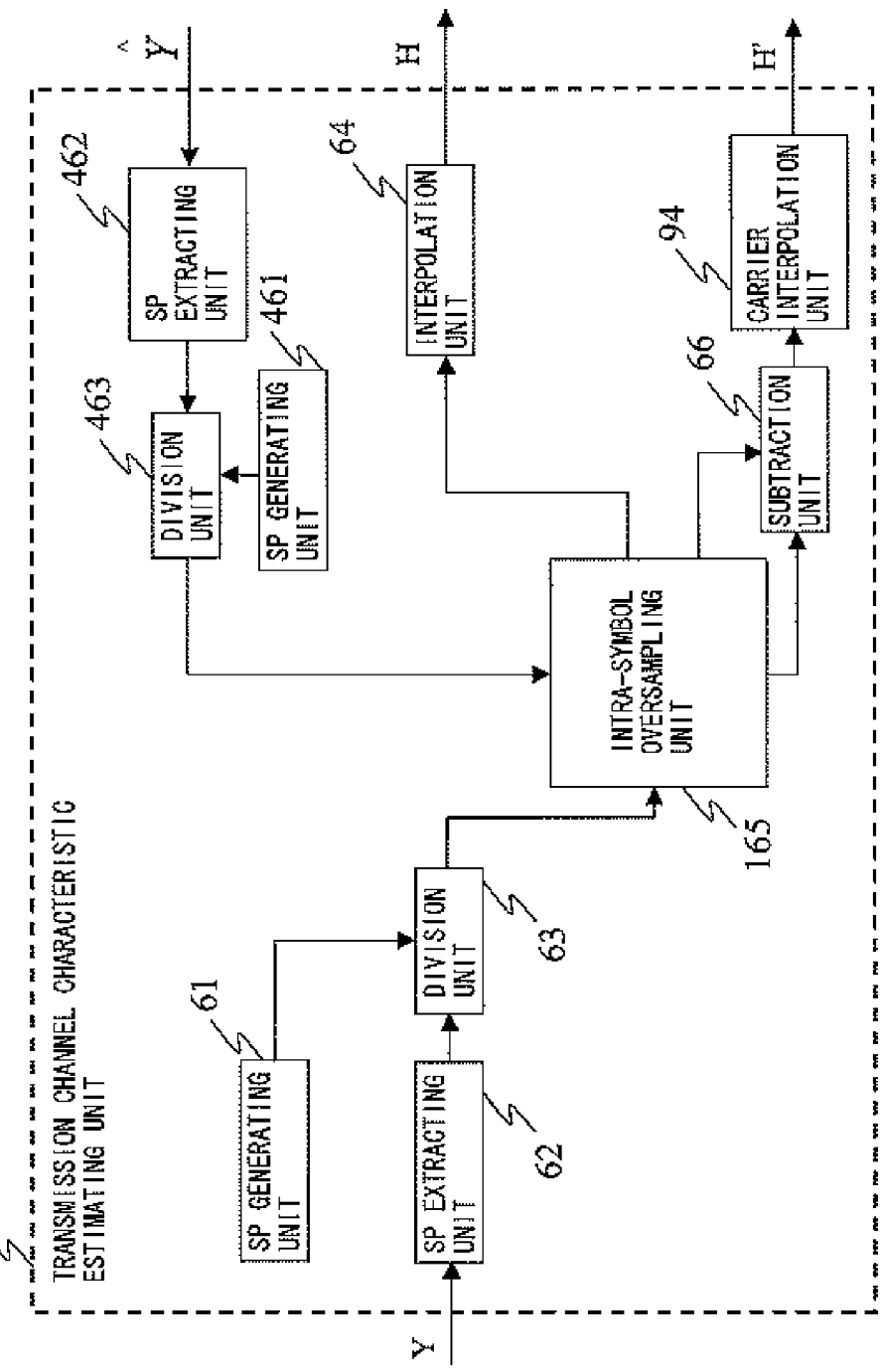
FIG. 48 is a block diagram showing an exemplary configuration of a transmission channel characteristic estimating unit 454.

Also, as in the first transmission channel characteristic estimating unit 153 described in the second embodiment (see FIG. 26), the interpolation unit 67 may be removed from the transmission channel characteristic estimating unit 452 (see FIG. 46), and a carrier interpolation unit 64 may be added that receives the transmission channel characteristic values at the signal positions of the signal sequences indicated by the open arrows of FIG. 6, from the intra-symbol oversampling unit 165 (a transmission channel characteristic estimating unit 454 shown in FIG. 48).

Figure 49:
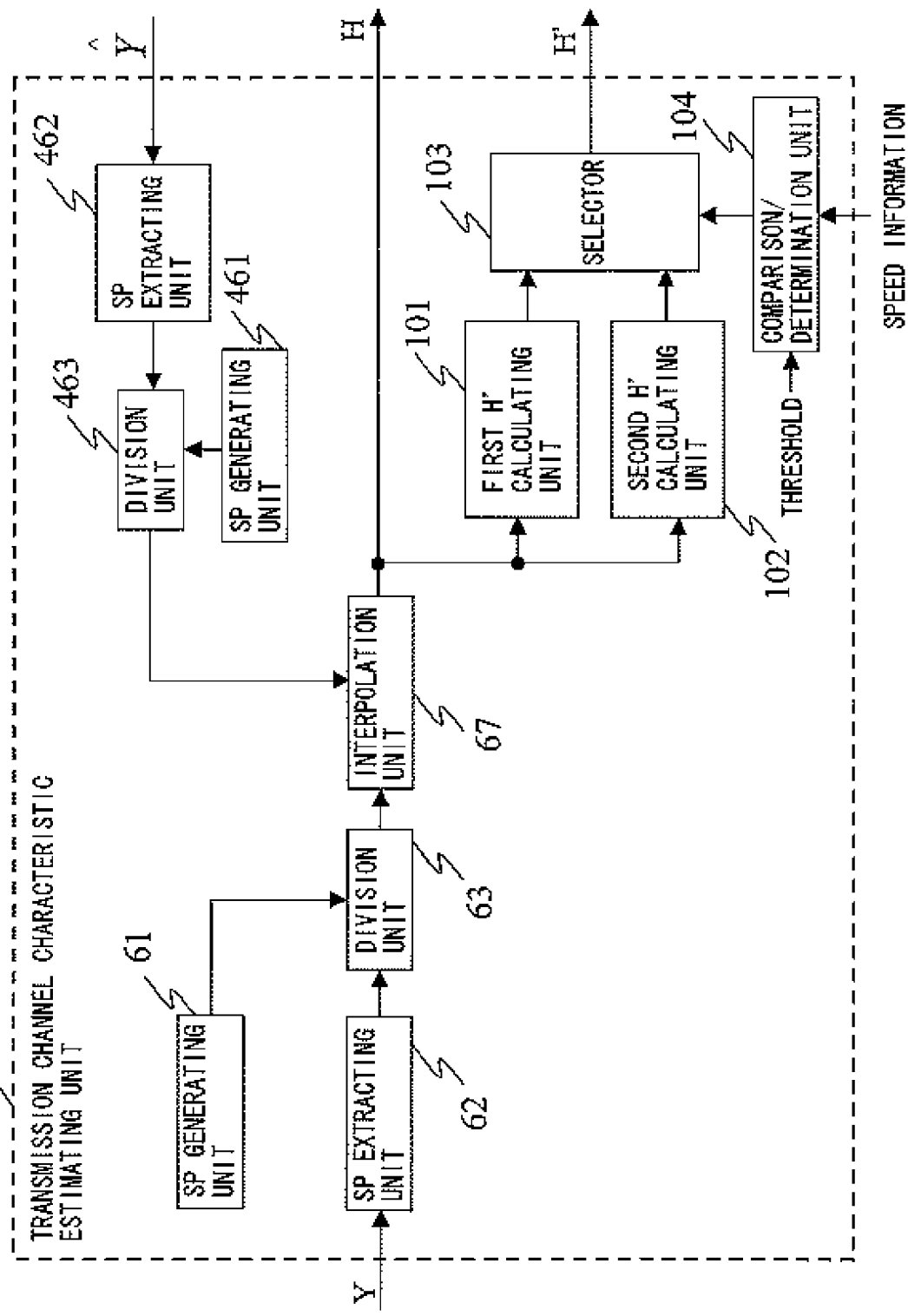
FIG. 49 is a block diagram showing an exemplary configuration of a transmission channel characteristic estimating unit 455.

Also, in the OFDM reception apparatus 500 of the fifth embodiment, a transmission channel characteristic estimating unit 455 shown in FIG. 49 may be provided instead of the transmission channel characteristic estimating unit 451 of FIG. 43. As shown in FIG. 49, the transmission channel characteristic estimating unit 455 has the some configuration as that of the transmission channel characteristic estimating unit 451, except that the intra-symbol oversampling unit 65 and the subtraction unit 66 are removed, and the first H' calculating unit 101, the second H' calculating unit 102, the selector 103 and the comparison/determination unit 104 included in the first transmission channel characteristic estimating unit 251 of the third embodiment (see FIG. 30) are added.

Figure 50:
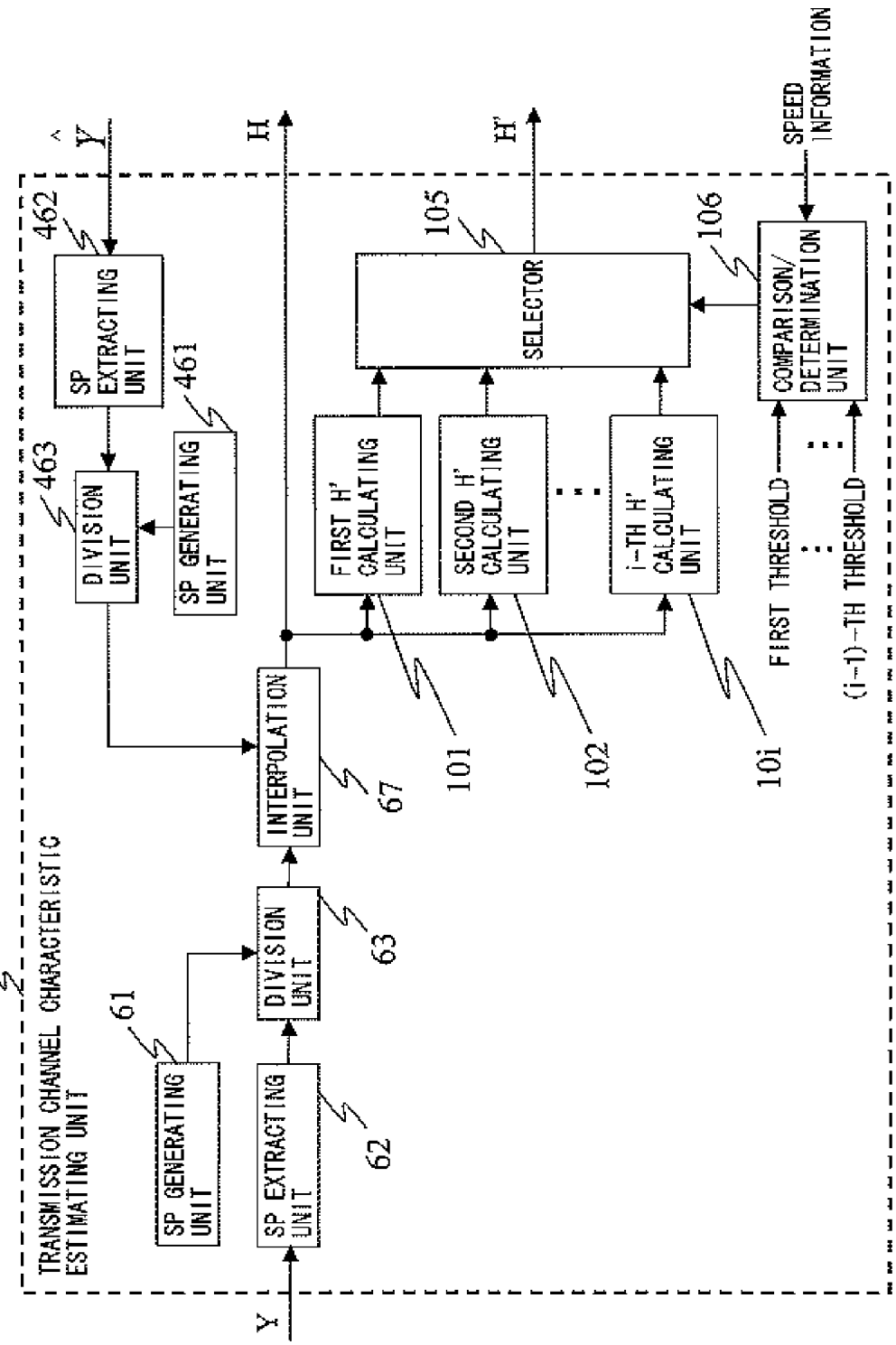
FIG. 50 is a block diagram showing an exemplary configuration of a transmission channel characteristic estimating unit 456.

Also, in the OFDM reception apparatus 500 of the fifth embodiment, a transmission channel characteristic estimating unit 456 shown in FIG. 50 may be provided instead of the transmission channel characteristic estimating unit 451 of FIG. 43. As shown in FIG. 50, the transmission channel characteristic estimating unit 456 has the same configuration as that of the transmission channel characteristic estimating unit 451, except that the intra-symbol oversampling unit 65 and the subtraction unit 66 are removed, and the first to i-th H' calculating units 101 to 10*i*, the selector 105 and the comparison/determination unit 106 included in the first transmission channel characteristic estimating unit 252 described in the third embodiment are added (see FIG. 33).

Figure 51:
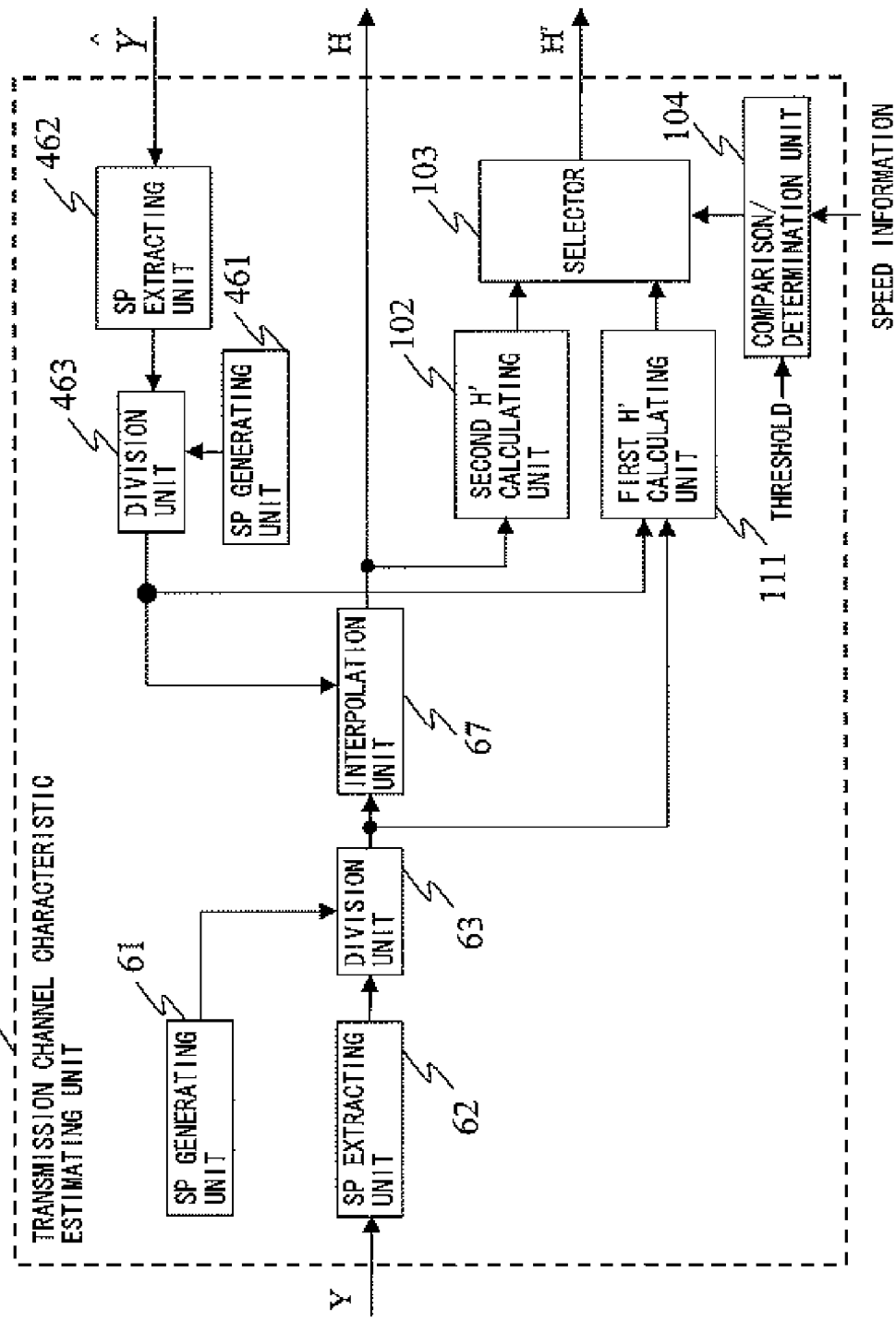
FIG. 51 is a block diagram showing an exemplary configuration of a transmission channel characteristic estimating unit 457.

Also, in the OFDM reception apparatus 500 of the fifth embodiment, a transmission channel characteristic estimating unit 457 shown in FIG. 51 may be provided instead of the transmission channel characteristic estimating unit 451 of FIG. 43. As shown in FIG. 51, the transmission channel characteristic estimating unit 457 has the same configuration as that of the transmission channel characteristic estimating unit 451, except that the intra-symbol oversampling unit 65 and the subtraction unit 66 are removed, and the first H' calculating unit 111, the second H' calculating unit 102, the selector 103 and the comparison/determination unit 104 included in the first transmission channel characteristic estimation unit 351 described in the fourth embodiment (see FIG. 37) are added. The second H' calculating unit 102 receives an output signal of the interpolation unit 67, and the first H' calculating unit 111 receives an output signal of the division unit 63 and an output signal of the division unit 463. The intra-symbol oversampling unit 165 (see FIG. 38) included in the first H' calculating unit 111 receives an output signal of the division unit 463 as described in the second embodiment, and then performs an oversampling process. In this oversampling process, the intra-symbol oversampling unit 165 receives transmission channel characteristic values calculated from SP signals after removal of the ICI component, from the division unit 463. Thereafter, as described with reference to FIGS. 44 and 45, the intra-symbol oversampling unit 105 replaces a portion of the transmission channel characteristic values of the SP signal positions with the transmission channel characteristic value inputs from the division unit 463, before performing an over sampling process.

Figure 52:
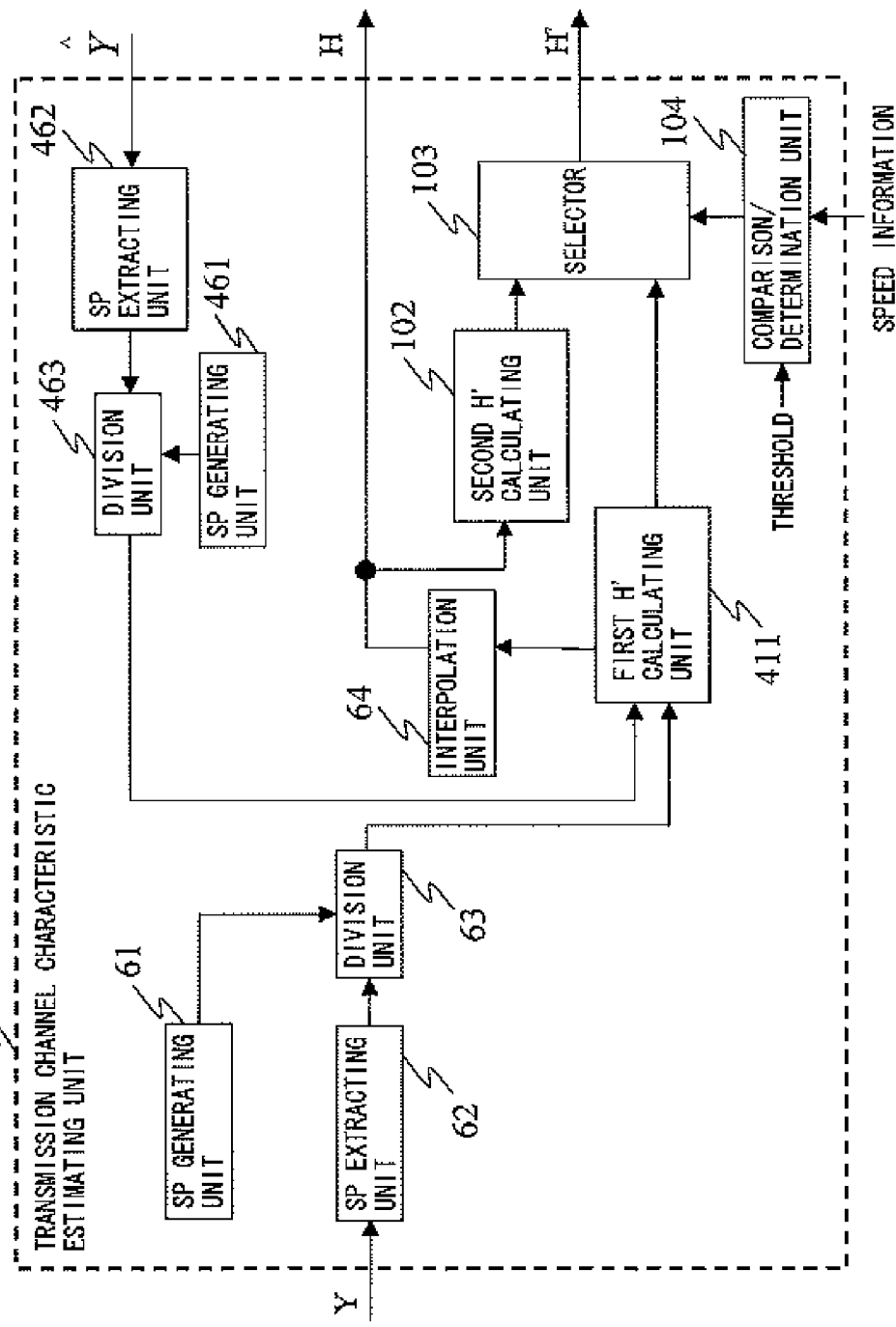
FIG. 52 is a block diagram showing an exemplary configuration of a transmission channel characteristic estimating unit 458.

Moreover, in the OFDM reception apparatus 500 of the fifth embodiment, a transmission channel characteristic estimating unit 458 shown in FIG. 52 may be provided instead of the transmission channel characteristic estimating unit 457 of FIG. 51. As shown in FIG. 52, the transmission channel characteristic estimating unit 458 has the same configuration as that of the transmission channel characteristic estimating unit 457, except that the interpolation unit 64 (see FIG. 9) is provided instead of the interpolation unit 67 (see FIG. 10). The interpolation unit 64 does not receive an output signal of the division unit 63 or the division unit 463, and receives the transmission channel characteristic values at the signal positions in the signal sequences indicated by the open arrows in FIG. 6, from the intra-symbol oversampling unit 165 included in the first H' calculating unit 111 (see FIG. 37). The operation of the interpolation unit 64 has been described in the fourth embodiment with reference to FIG. 38 and will not be described.

Figure 53:
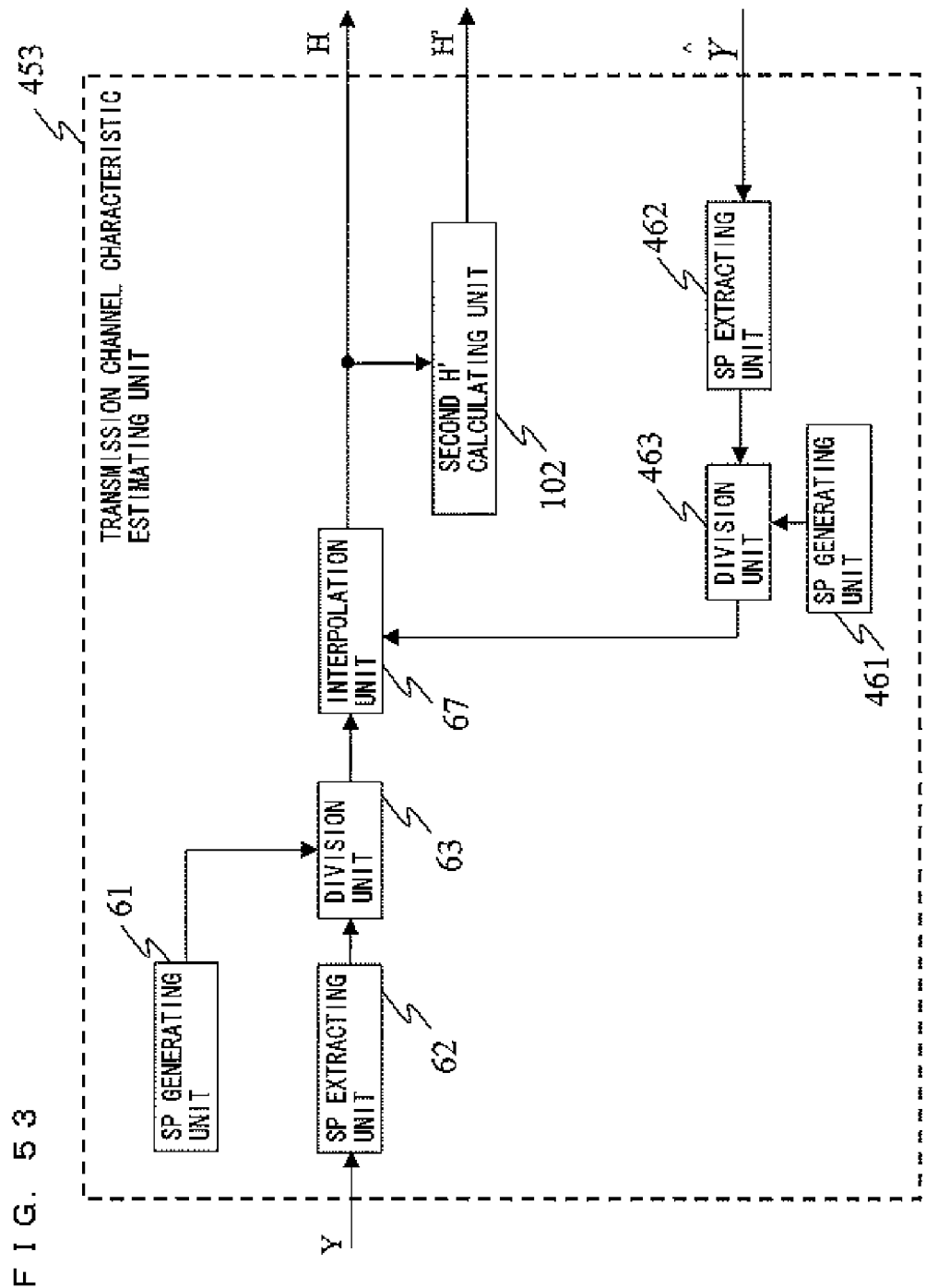
FIG. 53 is a block diagram showing an exemplary configuration of a transmission channel characteristic unit 453.

Also, in the OFDM reception apparatus 500 of the fifth embodiment, a transmission channel characteristic estimating unit 453 shown in FIG. 53 may be provided instead of the transmission channel characteristic estimating unit 451 of FIG. 43. As shown in FIG. 53, the transmission channel characteristic out unit 453 has the same configuration as that of the transmission channel characteristic estimating unit 451, except that the intra-symbol oversampling unit 65 and the subtraction unit 66 are replaced with the second H' calculating unit 102 of FIG. 32 described in the third embodiment. The second H' calculating unit 102 does not perform an oversampling process, and calculates H' using the two-symbol interval difference operation as in the technique of Document 1 (see FIG. 56). In this case, due to the oversampling process, the accuracy of the first differentiations H' of the transmission channel characteristic values H is not improved. However, as has already been described, in the interpolation unit 67, a portion of the transmission channel characteristic values at the SP signal positions is replaced with transmission channel characteristic values after removal of the ICI component, so that the accuracy of the transmission channel characteristic values H output by the interpolation unit 67 is improved. Therefore, the accuracy of the first differentiations H' of the transmission channel characteristic values H calculated by the second H' calculating unit 102 is also improved. Therefore, the accuracy of the ICI component calculated by the ICI component generating unit 53 is improved. Also, the accuracy of the equalization process of the second equalization unit 55 (see FIG. 42) is improved. As a result, in the OFDM reception apparatus 300 of the fifth embodiment, even when the transmission channel characteristic estimating unit 453 of FIG. 53 is provided, the accuracy of the ICI component removing/equalizing process can be sufficiently improved.

Also, in the transmission channel characteristic estimating units 451 to 453 and 455 to 457 described above (see FIGS. 43, 46, 47, 49 to 51 and 53), the interpolation unit 67 that performs an interpolation process in the symbol direction and the carrier direction (see FIG. 9) may be replaced with the interpolation unit 64 that performs an interpolation process only in the carrier direction (see. FIG. 7). However, when the into unit 67 is replaced with the interpolation unit 64, the accuracy of transmission channel characteristic values calculated by an interpolation process of the interpolation unit 64 is not improved in the transmission channel characteristic estimating units 451 to 453 and 455 to 457. This is because the interpolation unit 64 performs an interpolation process only in the carrier direction, and therefore, as can also be seen from FIG. 44, the replacing transmission channel characteristic values (see hatched circles) do not have an influence on the interpolation process. Also, when the interpolation unit 67 is replaced with the interpolation unit 64 the accuracy of only the first-differentiations of transmission channel characteristic values corresponding to a portion of the signals arranged in FIG. 44 is improved in the transmission channel characteristic estimating units 451, 453, 455 and 456. This is because, when the first differentiations of transmission channel characteristic values are calculated in signal sequences arranged in the symbol direction that do not include an SP signal, the replacing transmission channel characteristic values (see hatched circles) do not have an influence on the interpolation process.

Also, the transmission channel characteristic estimating units 451 to 458 (see FIGS. 43 and 46 to 53) may share a common SP generating unit, SP extracting unit, division unit and the like.

Figure 54:
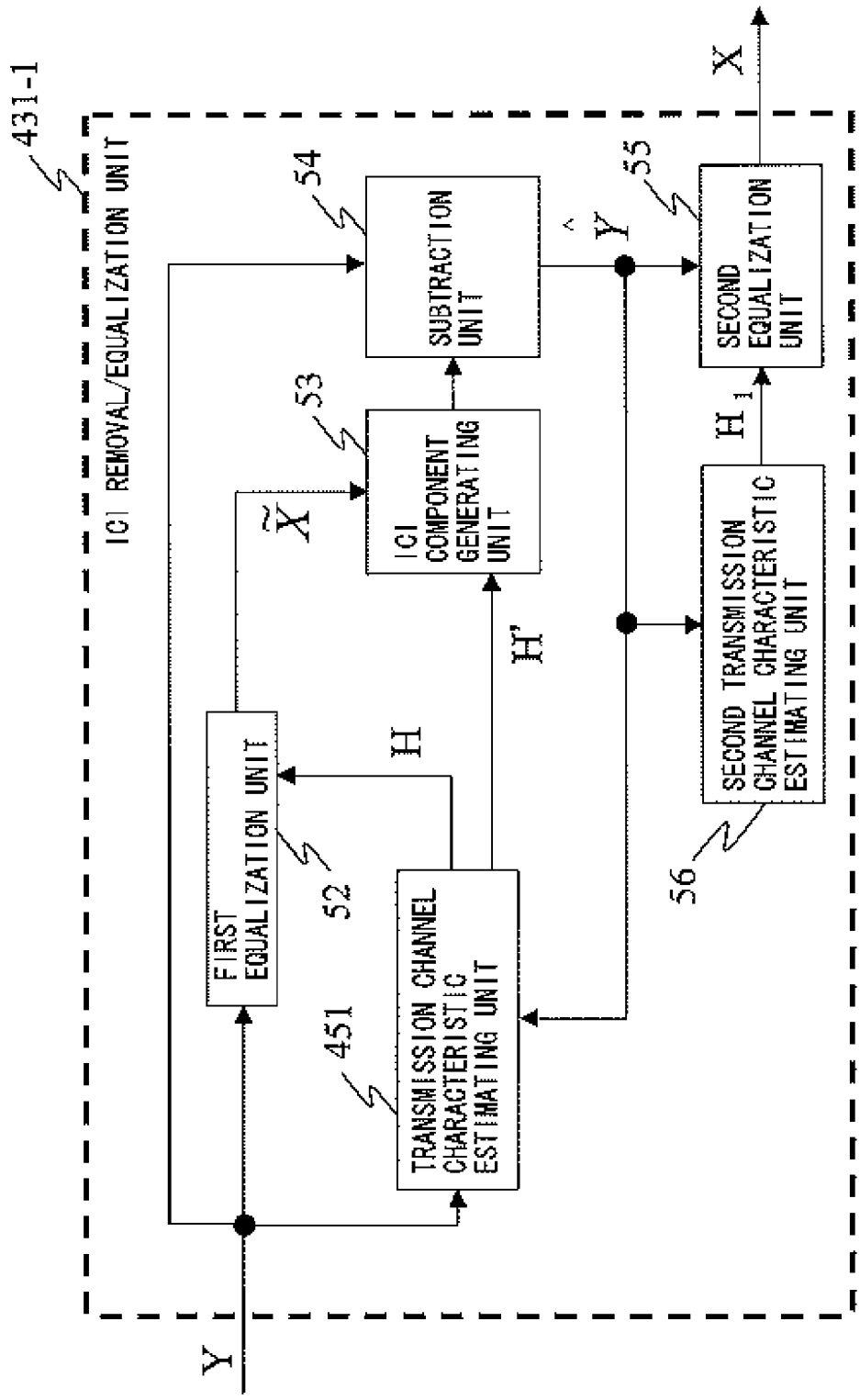
FIG. 54 is a block diagram showing an exemplary configuration of an ICI removal/equalization unit 431-1.

Also, in the fifth embodiment, th second equalization unit 55 configured to receive transmission channel characteristic values H from the transmission channel characteristic estimating unit 451 (see FIG. 42), so that an increase in circuit scale is suppressed. Alternatively, as in an ICI removal/equalization unit 431-1 shown in FIG. 54, the second transmission channel characteristic estimating unit 56 described in the first embodiment with reference to FIG. 3 may be added, and the second equalization unit 55 may receive transmission channel characteristic values $H_1$ from the second transmission channel characteristic estimating unit 56. With such a configuration, the second equalization unit 55 uses transmission channel characteristic values $H_1$ calculated from the signal $Y\hat{}$ after removal of the ICI component by the second transmission channel characteristic estimating unit thereby making it possible to perform an equalization process. As a result a more accurate ICI component removing/equalizing process can be achieved.

Figure 55:
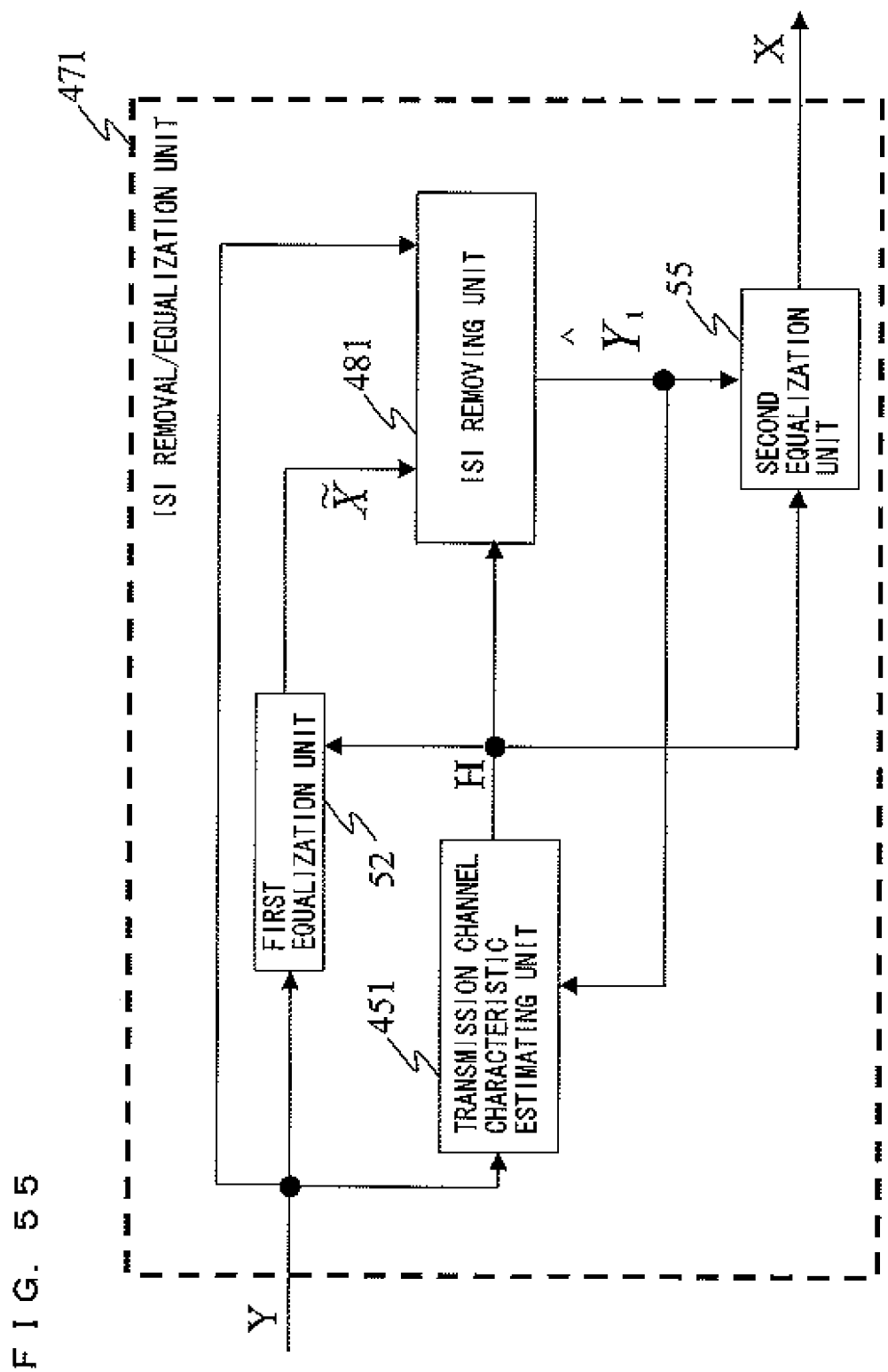
FIG. 55 is a block diagram showing an exemplary configuration of an ISI removing/equalizing unit 471.

It has also been described in the fifth embodiment that the ICI component is removed by using a feedback process. However, a target to be removed is not limited to the ICI component, and any interference component between sign is included in an OFDM signal may be removed. For example, a target to be removed may be an Inter-Symbol Interference (ISI) component that is generated due to delayed waves. In this case, in the demodulation unit 15 (see FIG. 41), an ISI removing/equalizing unit 171 shown in FIG. 55 may be provided instead of the ICI removal/equalization unit 431 (see FIG. 42). As shown in FIG. 55, the ISI removing/equalizing unit 471 has the same configuration as that of the ICI removal/equalization unit 431, except that an ISI removing unit 481 is provided instead of the ICI component generating unit 53 and the subtraction unit 54. The ISI removing unit 481 uses transmission channel characteristic values H calculated by the transmission channel characteristic estimating unit 451, to remove the ISI component from the received signal Y. The transmission channel characteristic estimating unit 451 (see FIG. 43) receives a received signal $Y1\hat{}$ after removal of the ISI component, and performs the interpolation process described with reference to FIGS. 44 and 45, to calculate highly accurate transmission channel characteristic values H. Note that, in this case, the transmission channel characteristic estimating unit 451 does not need to comprise the intra-symbol oversampling unit 65 and the subtraction unit 66. Also, the ISI removing unit 481 has a commonly used configuration, which will not be described. Thereby, a highly accurate ISI component removing/equalizing process can be achieved.

It has also been described in the first to fifth embodiments that the n-th differentiations (first differentiations H' have been assumed above as a specific example) of transmission channel characteristic values H calculated by an oversampling process (see FIG. 11, etc.) are used to remove the ICI component. Alternatively, the n-th differentiations calculated by the oversampling process of the present invention can be employed in general techniques for performing an n-th differentiation operation of transmission channel characteristic values H. For example, the first differentiations H' calculated by the oversampling process of the present invention can be used in derivative approximation that is performed by a transmission channel characteristic change detector that utilizes the first differentiations of transmission channel characteristic values.

It has also been mainly described in the first, to fifth embodiments that the ICI component occur when an OFDM reception apparatus moves. The ICI component also occur when a transmission apparatus moves, a refractive object existing in a transmission channel moves, or the like. Also in this case, the OFDM reception apparatuses 100 to 500 of the first to fifth embodiments can exhibit the aforementioned effect.

The parts of the OFDM reception apparatuses 100 to 500 of the first to fifth embodiments can be each implemented as an integrated circuit (LSI). The parts may be mounted on respective separate chips, or a portion or the whole of the parts may be mounted on a single chip. LSI is called IC, system LSI, super LSI or ultra LSI, depending on the packaging density. The integrated circuit is not limited to LSI. The integrated circuit may be achieved by a dedicated circuit or a general-purpose processor. Further, a Field Programmable Gate Array (FPGA) which can be, programmed after LSI production or a reconfigurable processor in which connection or settings of circuit cells in LSI can be reconfigured after LSI production, may be used. Furthermore, if an integrated circuit technology which replaces LSI is developed by an advance in the semiconductor technology or the advent, of other technologies derived therefrom, the functional blocks may be packaged using such a technology. A biotechnology may be applicable.

The OFDM reception apparatuses 100 to 500 of the first to fifth embodiments can be each implemented by an in processing device, such as a general computer system or the like. For example, a computer system comprises a microprocessor, a ROM, a RAM, and the like. A program for allowing a computer system to execute the processes of the parts of the OFDM reception apparatuses 100 to 500 is stored in a predetermined information recording medium. The functions of the parts may be implemented by the computer system reading out and executing the program stored in the predetermined information recording medium. Note that the program includes a plurality of instruction codes indicating instructions with respect to a computer for achieving predetermined functions. Examples of the information recording medium storing the program include a flexible disk, a hard disk, a CD-ROM, an MO, a DVD, a DVD-ROM, a DVD-RAM, a BD (Blu-ray Disc), a semiconductor memory, and the like. The program may be supplied, via other communication media or communications lines to other information processing devices.

Also, the OFDM reception apparatuses 100 to 500 of the first to fifth embodiments may be implemented by using a reception method that performs at least a portion of the reception processes described in the first to fifth embodiments.

Various reception processes for achieving the first to fifth embodiments of the present invention have also been described above. Any parts, programs or methods that achieve the various reception processes may be used in combination as long as the first to fifth embodiments of the present invention can be achieved.

Also, ISDB-T which is Japanese domestic standards for digital terrestrial broadcasting, has been described in the first to fifth embodiments. However, communications standards to which the present invention is applicable is not limited to this. The present invention is applicable to, for example, DVB-T, DVB-H, DAB, DMB, DMB-TH, WiMAX and the like.

INDUSTRIAL APPLICABILITY

The present invention can be used in an OFDM reception apparatus or the like, and particularly, is useful, when an ICI component of a received signal is desirably effectively removed in an OFDM reception apparatus that performs mobile reception, for example.

The invention claimed is:

1. An Orthogonal Frequency Division Multiplexing (OFDM) reception apparatus for receiving an OFDM signal including a plurality of sub-carriers arranged in a symbol direction and a carrier direction, via a transmission channel, the OFDM reception apparatus comprising: an orthogonal transform unit for performing orthogonal transform with respect to the received OFDM signal from a time domain into a frequency domain, to generate an OFDM signal in the frequency domain; a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers; and an interference component removing unit for using the transmission channel characteristic value and the n-th differentiation calculated for each of the sub-carriers by the first transmission channel characteristic estimating unit, to remove an Inter-Carrier Interference (ICI) component that is an interference component between the sub-carriers adjacent to each other in the carrier direction, from the OFDM signal generated by the orthogonal transform unit, wherein the first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing in intervals each smaller than a two-symbol interval of the transmission channel characteristic values obtained by the oversampling to calculate the n-th differentiations, and the first transmission channel characteristic estimating unit includes: a Scattered Pilot (SP) extracting unit for extracting SP signals included in the plurality of sub-carriers from the OFDM signal generated by the orthogonal transform unit; a SP generating unit for generating SP signals; a division unit for dividing the SP signals extracted by the SP extracting unit by the SP signals generated by the SP generating unit, to calculate a transmission channel characteristic value of the OFDM signal generated by the orthogonal transform unit for each SP signal; an interpolation unit for performing an interpolation process using the transmission channel characteristic value calculated for each SP signal by the division unit, to calculate a transmission channel characteristic value of the OFDM signal generated by the orthogonal transform unit for each of the sub-carriers; an intra-symbol oversampling unit for performing a filtering process in the symbol direction with respect to the transmission channel characteristic value calculated for each of the sub-carriers by the interpolation unit, to perform oversampling at intervals each smaller than a one-symbol interval; a subtraction unit for performing a subtraction process using transmission channel characteristic values obtained by the oversampling, to calculate the n-th differentiation of the transmission channel characteristic value calculated for each of the sub-carriers by the interpolation unit; an H' calculating unit for performing a difference operation process using the transmission channel characteristic value calculated for each of the sub-carriers by the interpolation unit, to calculate an n-th differentiation of the transmission channel characteristic value for each of the sub-carriers; a comparison/determination unit for comparing speed information indicating moving speed of the OFDM reception apparatus with a predetermined threshold, to determine the moving speed; and a selector for selecting and outputting one of the n-th differentiations calculated by the H' calculating unit and the n-th differentiations calculated by the subtraction unit, based on a result of the determination by the comparison/determination unit.

2. An Orthogonal Frequency Division Multiplexing (OFDM) reception apparatus for receiving an OFDM signal including a plurality of sub-carriers arranged in a symbol direction and a carrier direction, via a transmission channel, the OFDM reception apparatus comprising: an orthogonal transform unit for performing orthogonal transform with respect to the received OFDM signal from a time domain into a frequency domain, to generate an OFDM signal in the frequency domain; a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers; and an interference component removing unit for using the transmission channel characteristic value and the n-th differentiation calculated for each of the sub-carriers by the first transmission channel characteristic estimating unit, to remove an Inter-Carrier Interference (ICI) component that is an interference component between the sub-carriers adjacent to each other in the carrier direction, from the OFDM signal generated by the orthogonal transform unit, wherein the first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing in intervals each smaller than a two-symbol interval of the transmission channel characteristic values obtained by the oversampling to calculate the n-th differentiations, and the first transmission channel characteristic estimating unit includes: a Scattered Pilot (SP) extracting unit for extracting SP signals included in the plurality of sub-carriers from the OFDM signal generated by the orthogonal transform unit; a SP generating unit for generating SP signals; a division unit for dividing the SP signals extracted by the SP extracting unit by the SP signals generated by the SP generating unit, to calculate a transmission channel characteristic value of the OFDM signal generated by the orthogonal transform unit for each SP signal; an interpolation unit for performing an interpolation process using the transmission channel characteristic value calculated for each SP signal by the division unit, to calculate a transmission channel characteristic value of the OFDM signal generated by the orthogonal transform unit for each of the sub-carriers; an intra-symbol oversampling unit for performing a filtering process in the symbol direction with respect to the transmission channel characteristic value calculated for each of the sub-carriers by the division unit, to perform oversampling at intervals each smaller than a one-symbol interval; a subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals; a carrier interpolation unit for performing an interpolation process in the carrier direction using the n-th differentiations of the transmission channel characteristic values calculated by the subtraction unit, to calculate the n-th differentiation of the transmission channel characteristic value of the OFDM signal generated by the orthogonal transform unit for each of the sub-carriers; an H' calculating unit for performing a difference operation process using the transmission channel characteristic value calculated for each of the sub-carriers by the interpolation unit, to calculate an n-th differentiation of the transmission channel characteristic value for each of the sub-carriers; a comparison/determination unit for comparing speed information indicating moving speed of the OFDM reception apparatus with a predetermined threshold, to determine the moving speed; and a selector for selecting and outputting one of the n-th differentiations calculated by the H' calculating unit and the n-th differentiations calculated by the carrier interpolation unit, based on a result of the determination by the comparison/determination unit.

3. An Orthogonal Frequency Division Multiplexing (OFDM) reception apparatus for receiving an OFDM signal including a plurality of sub-carriers arranged in a symbol direction and a carrier direction, via a transmission channel, the OFDM reception apparatus comprising: an orthogonal transform unit for performing orthogonal transform with respect to the received OFDM signal from a time domain into a frequency domain, to generate an OFDM signal in the frequency domain; a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers; and an interference component removing unit for using the transmission channel characteristic value and the n-th differentiation calculated for each of the sub-carriers by the first transmission channel characteristic estimating unit, to remove an Inter-Carrier Interference (ICI) component that is an interference component between the sub-carriers adjacent to each other in the carrier direction, from the OFDM signal generated by the orthogonal transform unit, wherein the first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing in intervals each smaller than a two-symbol interval of the transmission channel characteristic values obtained by the oversampling to calculate the n-th differentiations, and the first transmission channel characteristic estimating unit includes: a Scattered Pilot (SP) extracting unit for extracting SP signals included in the plurality of sub-carriers from the OFDM signal generated by the orthogonal transform unit; a SP generating unit for generating SP signals; a division unit for dividing the SP signals extracted by the SP extracting unit by the SP signals generated by the SP generating unit, to calculate a transmission channel characteristic value of the OFDM signal generated by the orthogonal transform unit for each SP signal; an intra-symbol oversampling unit for performing a filtering process in the symbol direction with respect to the transmission channel characteristic value calculated for each SP signal by the division unit, to perform oversampling at intervals each smaller than a one-symbol interval; a subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals; a carrier interpolation unit for performing an interpolation process in the carrier direction using the n-th differentiations of the transmission channel characteristic values calculated by the subtraction unit, to calculate the n-th differentiation of the transmission channel characteristic value of the OFDM signal generated by the orthogonal transform unit for each of the sub-carriers; an interpolation unit for performing an interpolation process in the carrier direction using the transmission channel characteristic values obtained by the oversampling, to calculate a transmission channel characteristic value of the OFDM signal generated by the orthogonal transform unit for each of the sub-carriers; an H' calculating unit for performing a difference operation process using the transmission channel characteristic value calculated for each of the sub-carriers by the interpolation unit, to calculate an n-th differentiation of the transmission channel characteristic value for each of the sub-carriers; a comparison/determination unit for comparing speed information indicating moving speed of the OFDM reception apparatus with a predetermined threshold, to determine the moving speed; and a selector for selecting and outputting one of the n-th differentiations calculated by the H' calculating unit and the n-th differentiations calculated by the carrier interpolation unit, based on a result of the determination by the comparison/determination unit.

4. An Orthogonal Frequency Division Multiplexing (OFDM) reception apparatus for receiving an OFDM signal including a plurality of sub-carriers arranged in a symbol direction and a carrier direction, via a transmission channel, the OFDM reception apparatus comprising: an orthogonal transform unit for performing orthogonal transform with respect to the received OFDM signal from a time domain into a frequency domain, to generate an OFDM signal in the frequency domain; a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers; and an interference component removing unit for using the transmission channel characteristic value and the n-th differentiation calculated for each of the sub-carriers by the first transmission channel characteristic estimating unit, to remove an Inter-Carrier Interference (ICI) component that is an interference component between the sub-carriers adjacent to each other in the carrier direction, from the OFDM signal generated by the orthogonal transform unit, wherein the first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing in intervals each smaller than a two-symbol interval of the transmission channel characteristic values obtained by the oversampling to calculate the n-th differentiations, the interference component removing unit includes: a first equalization unit for dividing the OFDM signal generated by the orthogonal transform unit by the transmission channel characteristic value calculated for each of the sub-carriers by the first transmission channel characteristic estimating unit, to remove a portion of the phase and amplitude distortions, thereby calculating a temporarily equalized OFDM signal; an ICI component generating unit for using the temporarily equalized OFDM signal and the n-th differentiations calculated by the first transmission channel characteristic estimating unit, to generate the ICI component; a first subtraction unit for subtracting the ICI component from the OFDM signal generated by the orthogonal transform unit, to calculate an OFDM signal excluding the ICI component; and a second equalization unit for dividing the OFDM signal excluding the ICI component by the transmission channel characteristic value calculated for each of the sub-carriers by the first transmission channel characteristic estimating unit, to remove phase and amplitude distortions of the OFDM signal excluding the ICI component, and the first transmission channel characteristic estimating unit includes: a first Scattered Pilot (SP) extracting unit for extracting SP signals included in the plurality of sub-carriers from the OFDM signal generated by the orthogonal transform unit; a first SP generating unit for generating SP signals; a first division unit for dividing the SP signals extracted by the first SP extracting unit by the SP signals generated by the first SP generating unit, to calculate a transmission channel characteristic value of the OFDM signal generated by the orthogonal transform unit for each SP signal; a second SP extracting unit for extracting SP signals from the OFDM signal excluding the ICI component; a second SP generating unit for generating SP signals; a second division unit for dividing the SP signals extracted by the second SP extracting unit by the SP signals generated by the second SP generating unit, to calculate a transmission channel characteristic value of the OFDM signal excluding the ICI component for each SP signal; an interpolation unit for performing an interpolation process using a portion of the transmission channel characteristic values calculated for the SP signals by the first division unit, and the transmission channel characteristic values for the SP signals calculated by the second division unit, to calculate a transmission channel characteristic value of the OFDM signal generated by the orthogonal transform unit for each of the sub-carriers; an intra-symbol oversampling unit for performing a filtering process in the symbol direction with respect to the transmission channel characteristic value calculated for each of the sub-carriers by the interpolation unit, to perform oversampling at intervals each smaller than a one-symbol interval; and a second subtraction unit for performing a subtraction process using transmission channel characteristic values obtained by the oversampling, to calculate the n-th differentiation of the transmission channel characteristic value calculated for each of the sub-carriers by the interpolation unit.

5. An Orthogonal Frequency Division Multiplexing (OFDM) reception apparatus for receiving an OFDM signal including a plurality of sub-carriers arranged in a symbol direction and a carrier direction, via a transmission channel, the OFDM reception apparatus comprising: an orthogonal transform unit for performing orthogonal transform with respect to the received OFDM signal from a time domain into a frequency domain, to generate an OFDM signal in the frequency domain; a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers; and an interference component removing unit for using the transmission channel characteristic value and the n-th differentiation calculated for each of the sub-carriers by the first transmission channel characteristic estimating unit, to remove an Inter-Carrier Interference (ICI) component that is an interference component between the sub-carriers adjacent to each other in the carrier direction, from the OFDM signal generated by the orthogonal transform unit, wherein the first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing in intervals each smaller than a two-symbol interval of the transmission channel characteristic values obtained by the oversampling to calculate the n-th differentiations, the interference component removing unit includes: a first equalization unit for dividing the OFDM signal generated by the orthogonal transform unit by the transmission channel characteristic value calculated for each of the sub-carriers by the first transmission channel characteristic estimating unit, to remove a portion of the phase and amplitude distortions, thereby calculating a temporarily equalized OFDM signal; an ICI component generating unit for using the temporarily equalized OFDM signal and the n-th differentiations calculated by the first transmission channel characteristic estimating unit, to generate the ICI component; a first subtraction unit for subtracting the ICI component from the OFDM signal generated by the orthogonal transform unit, to calculate an OFDM signal excluding the ICI component; and a second equalization unit for dividing the OFDM signal excluding the ICI component by the transmission channel characteristic value calculated for each of the sub-carriers by the first transmission channel characteristic estimating unit, to remove phase and amplitude distortions of the OFDM signal excluding the ICI component, and the first transmission channel characteristic estimating unit includes: a first Scattered Pilot (SP) extracting unit for extracting SP signals included in the plurality of sub-carriers from the OFDM signal generated by the orthogonal transform unit; a first SP generating unit for generating SP signals; a first division unit for dividing the SP signals extracted by the first SP extracting unit by the SP signals generated by the first SP generating unit, to calculate a transmission channel characteristic value of the OFDM signal generated by the orthogonal transform unit for each SP signal; a second SP extracting unit for extracting SP signals from the OFDM signal excluding the ICI component; a second SP generating unit for generating SP signals; a second division unit for dividing the SP signals extracted by the second SP extracting unit by the SP signals generated by the second SP generating unit, to calculate a transmission channel characteristic value of the OFDM signal excluding the ICI component for each SP signal; an interpolation unit for performing an interpolation process using a portion of the transmission channel characteristic values calculated for the SP signals by the first division unit, and the transmission channel characteristic values for the SP signals calculated by the second division unit, to calculate a transmission channel characteristic value of the OFDM signal generated by the orthogonal transform unit for each of the sub-carriers; an intra-symbol oversampling unit for replacing a portion of the transmission channel characteristic values calculated for the SP signals by the first division unit, with the transmission channel characteristic values for the SP signals calculated by the second division unit, and performing a filtering process in the symbol direction, to perform oversampling at intervals each smaller than a one-symbol interval; a second subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals; and a carrier interpolation unit for performing an interpolation process in the carrier direction using the n-th differentiations of the transmission channel characteristic values calculated by the second subtraction unit, to calculate the n-th differentiation of the transmission channel characteristic value of the OFDM signal generated by the orthogonal transform unit for each of the sub-carriers.

6. An Orthogonal Frequency Division Multiplexing (OFDM) reception apparatus for receiving an OFDM signal including a plurality of sub-carriers arranged in a symbol direction and a carrier direction, via a transmission channel, the OFDM reception apparatus comprising: an orthogonal transform unit for performing orthogonal transform with respect to the received OFDM signal from a time domain into a frequency domain, to generate an OFDM signal in the frequency domain; a first transmission channel characteristic estimating unit for calculating a transmission channel characteristic value indicating phase and amplitude distortions in the OFDM signal generated by the orthogonal transform unit for each of the sub-carriers, the phase and amplitude distortions occurring during propagation through the transmission channel, and calculating an n-th (n is a natural number) differentiation of the transmission channel characteristic value for each of the sub-carriers; and an interference component removing unit for using the transmission channel characteristic value and the n-th differentiation calculated for each of the sub-carriers by the first transmission channel characteristic estimating unit, to remove an Inter-Carrier Interference (ICI) component that is an interference component between the sub-carriers adjacent to each other in the carrier direction, from the OFDM signal generated by the orthogonal transform unit, wherein the first transmission channel characteristic estimating unit performs a filtering process in the symbol direction with respect to the transmission channel characteristic value calculated for each of the sub-carriers to perform oversampling at intervals each smaller than a one-symbol interval, and uses transmission channel characteristic values existing in intervals each smaller than a two-symbol interval of the transmission channel characteristic values obtained by the oversampling to calculate the n-th differentiations, the interference component removing unit includes: a first equalization unit for dividing the OFDM signal generated by the orthogonal transform unit by the transmission channel characteristic value calculated for each of the sub-carriers by the first transmission channel characteristic estimating unit, to remove a portion of the phase and amplitude distortions, thereby calculating a temporarily equalized OFDM signal; an ICI component generating unit for using the temporarily equalized OFDM signal and the n-th differentiations calculated by the first transmission channel characteristic estimating unit, to generate the ICI component; a first subtraction unit for subtracting the ICI component from the OFDM signal generated by the orthogonal transform unit, to calculate an OFDM signal excluding the ICI component; and a second equalization unit for dividing the OFDM signal excluding the ICI component by the transmission channel characteristic value calculated for each of the sub-carriers by the first transmission channel characteristic estimating unit, to remove phase and amplitude distortions of the OFDM signal excluding the ICI component, and the first transmission channel characteristic estimating unit includes: a first Scattered Pilot (SP) extracting unit for extracting SP signals included in the plurality of sub-carriers from the OFDM signal generated by the orthogonal transform unit; a first SP generating unit for generating SP signals; a first division unit for dividing the SP signals extracted by the first SP extracting unit by the SP signals generated by the first SP generating unit, to calculate a transmission channel characteristic value of the OFDM signal generated by the orthogonal transform unit for each SP signal; a second SP extracting unit for extracting SP signals from the OFDM signal excluding the ICI component; a second SP generating unit for generating SP signals; a second division unit for dividing the SP signals extracted by the second SP extracting unit by the SP signals generated by the second SP generating unit, to calculate a transmission channel characteristic value of the OFDM signal excluding the ICI component for each SP signal; an intra-symbol oversampling unit for replacing a portion of the transmission channel characteristic values calculated for the SP signals by the first division unit, with the transmission channel characteristic values for the SP signals calculated by the second division unit, and performing a filtering process in the symbol direction, to perform oversampling at intervals each smaller than a one-symbol interval; a second subtraction unit for performing a subtraction process using transmission channel characteristic values obtained by the oversampling, to calculate n-th differentiations of transmission channel characteristic values of sub-carriers included in sub-carrier sequences arranged in the symbol direction including SP signals; a carrier interpolation unit for performing an interpolation process in the carrier direction using the n-th differentiations of the transmission channel characteristic values calculated by the second subtraction unit, to calculate the n-th differentiation of the transmission channel characteristic value of the OFDM signal generated by the orthogonal transform unit for each of the sub-carriers; and an interpolation unit for performing an interpolation process in the carrier direction using the transmission channel characteristic values obtained by the oversampling, to calculate the transmission channel characteristic value of the OFDM signal generated by the orthogonal transform unit for each of the sub-carriers.

* * * * *